United States Patent [19]

Kindo et al.

[11] Patent Number: 5,448,502
[45] Date of Patent: Sep. 5, 1995

[54] DEVICES FOR JUDGING IMAGE ON THE BASIS OF GRAY WORLD ASSUMPTION, DISCRIMINATING COLOR CHART, DEDUCING LIGHT SOURCE AND REGULATING COLOR

[75] Inventors: Toshiki Kindo, Yokohama; Shin Yamada, Kawasaki; Toshikazu Fujioka, Kawasaki, all of Japan

[73] Assignee: Matsushita Electric Industrial Co., Ltd., Osaka, Japan

[21] Appl. No.: 903,229

[22] Filed: Jun. 22, 1992

[30] Foreign Application Priority Data

Jun. 20, 1991 [JP] Japan .................................. 3-148715
Jun. 20, 1991 [JP] Japan .................................. 3-148716
Aug. 12, 1991 [JP] Japan .................................. 3-201679

[51] Int. Cl.$^6$ ............................................. H04N 9/64
[52] U.S. Cl. ...................................... 364/526; 358/530; 362/5; 382/165; 356/421
[58] Field of Search ............... 364/526, 571.01, 571.03, 364/550, 554; 358/10, 29 C, 504, 515, 516, 530; 356/402, 405, 406, 425, 421; 382/9, 10, 17, 14, 28, 39; 395/126, 131; 362/5

[56] References Cited

U.S. PATENT DOCUMENTS

| 4,797,733 | 1/1989 | Takagi et al. | 358/29 |
| 4,843,458 | 6/1989 | Ito | 358/80 |
| 4,901,254 | 2/1990 | Dolezakek et al. | 364/526 |
| 4,962,540 | 10/1990 | Tsujiuchi et al. | 382/17 |
| 5,182,636 | 1/1993 | Kikuchi et al. | 358/29 C |
| 5,221,963 | 6/1993 | Hashimoto et al. | 358/29 C |

FOREIGN PATENT DOCUMENTS

| 2030142 | 5/1991 | Canada . |
| 0433672 | 6/1991 | European Pat. Off. . |
| 56-36291 | 4/1981 | Japan . |
| 250592 | 2/1990 | Japan . |

OTHER PUBLICATIONS

"Learning Internal Representations by Error Propagation" by D. E. Rumelhart et al; Parallel Distributed Processiong, vol. 1 Foundations; 1986; pp. 319–328.

Primary Examiner—Emanuel T. Voeltz
Assistant Examiner—Edward Pipala
Attorney, Agent, or Firm—Lowe, Price, LeBlanc & Becker

[57] ABSTRACT

An image judging device provided with a sampling unit for obtaining image data suitable for judging quality of an image by sampling image signals obtained by color separation, a calculation unit for calculating a statistic representing characteristics of a distribution of the sampled image data and a judgement unit for judging the quality of the image according to the calculated statistic. Thus, a statistical processing of the image data can be performed correctly. Further, an error rate, at which a wrong light source is deduced, can be decreased in comparison with a conventional device.

37 Claims, 24 Drawing Sheets

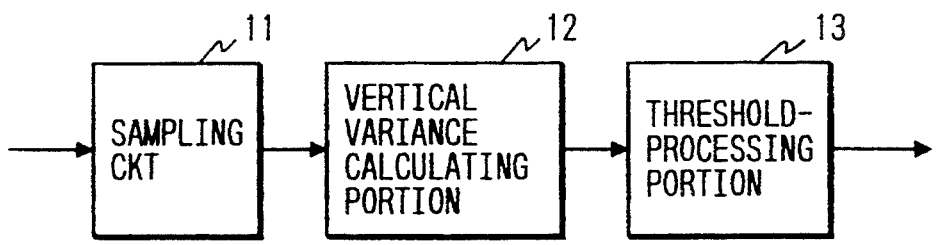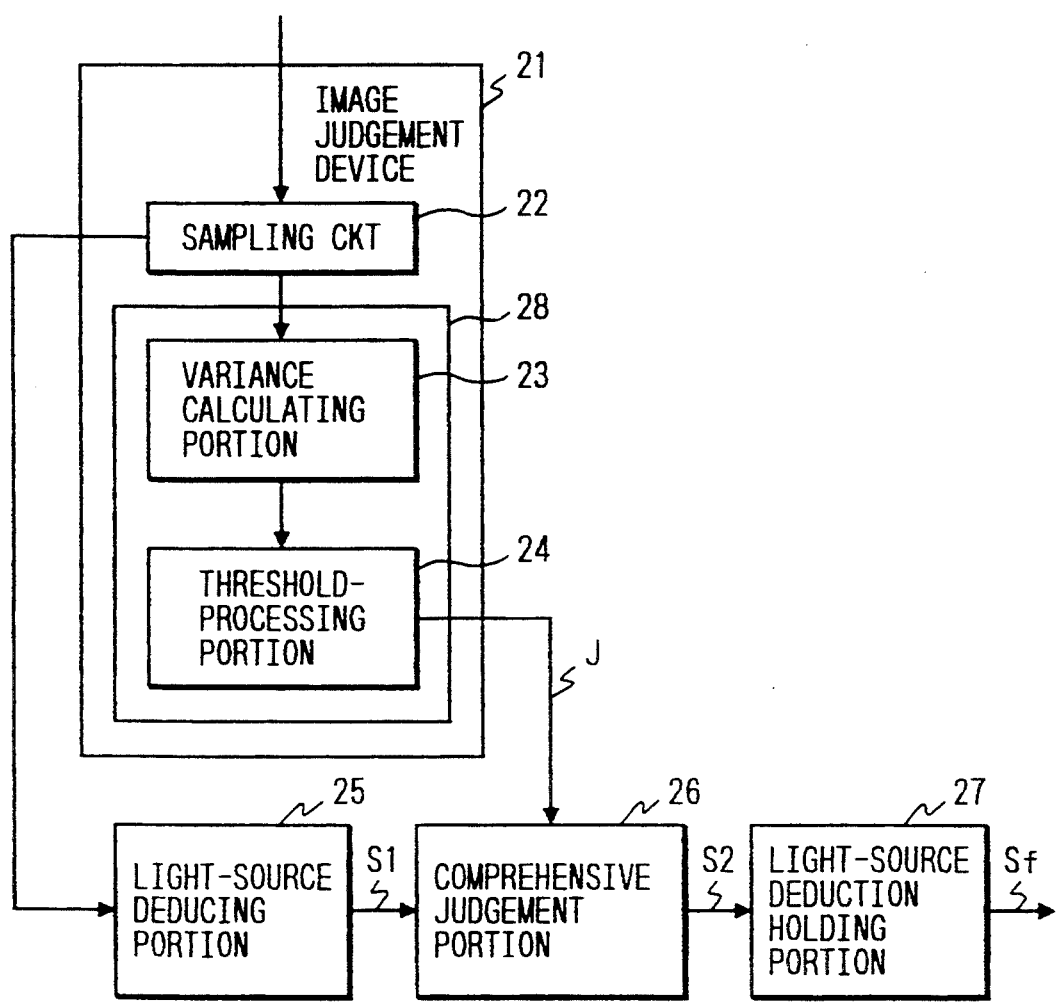

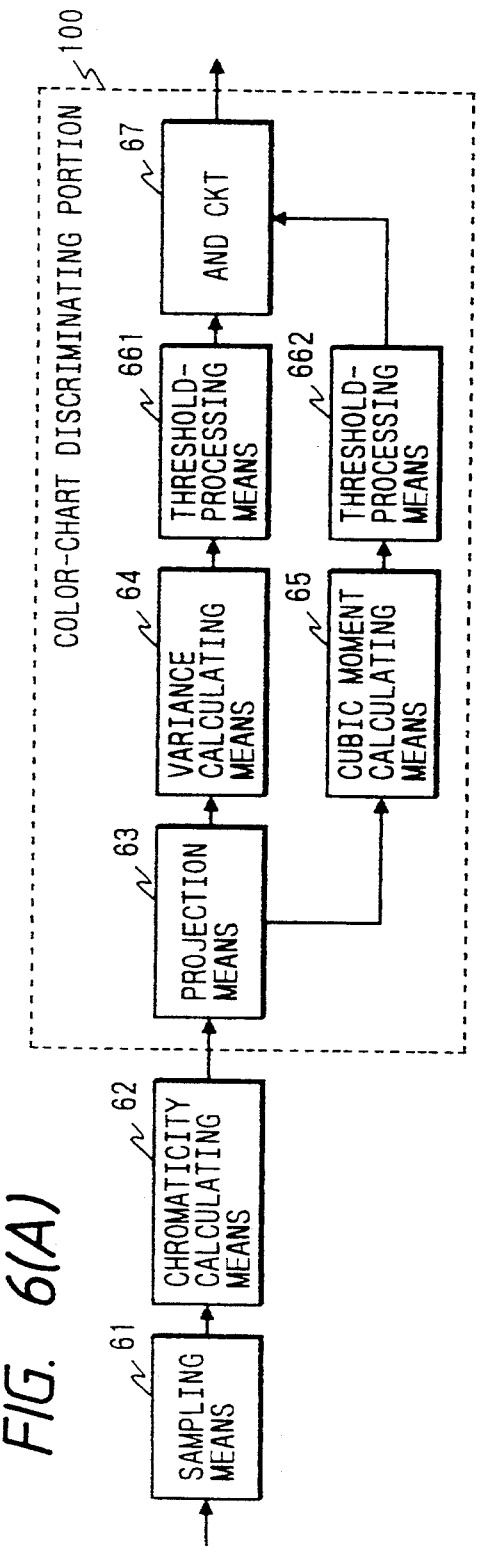
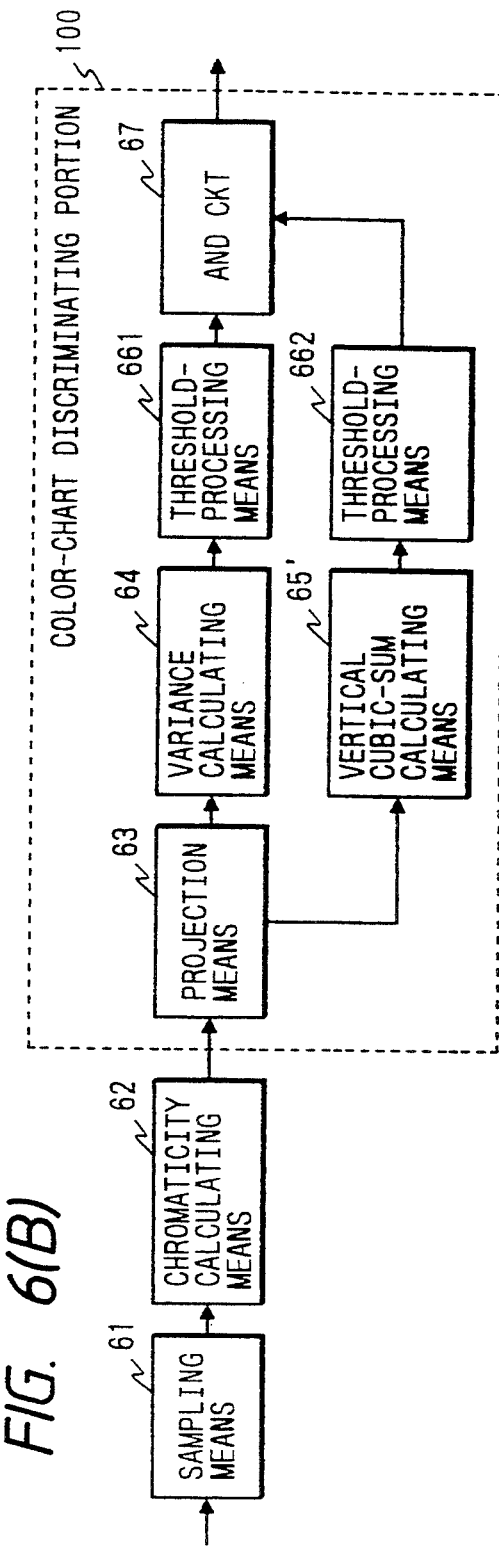

DEVICES FOR JUDGING IMAGE ON THE BASIS OF GRAY WORLD ASSUMPTION, DISCRIMINATING COLOR CHART, DEDUCING LIGHT SOURCE AND REGULATING COLOR

BACKGROUND OF THE INVENTION

1. Field of the Invention

This invention relates to an image judging device for judging quality of color reproduction, which is provided in a single-unit video camera-recorder, namely, a video camera or the like for achieving exact color reproduction. Further, this invention also relates to a color-chart discriminating device, a device for judging whether or not what is called a gray-world-assumption holds good for an input image (hereunder sometimes referred to as a GWA judgment device) and a device for deducing a light source, which are used for controlling a white balance control circuit. Furthermore, this invention also relates to a device for regulating color, which is used for achieving exact color reproduction.

2. Description of the Related Art

In recent years, with the spread of a video camera, means for following picture-taking conditions have become important more and more. Especially, it is very important for color reproduction to exactly deduce a light source used to take a picture. A means for deducing a light source by employing a plurality of photosensitive elements having different spectrum characteristics, as well as a means for deducing a light source by performing an image processing, has been well known as conventional source deducing means for deducing a light source. Lately, the latter source deducing means (hereunder sometimes referred to as AWB) has become mainly employed instead of the former source deducing means provided with the photosensitive elements, the design and costs of which are generally restricted.

The rationale of the technique of deducing a light source by performing an image processing (thus, the rationale of the AWB) is what is called Gray World Assumption (hereunder abbreviated as GWA), namely, an assumption that if colors of objects in a picture to be taken are mixed and thus averaged, an achromatic color (namely, a neutral color) is obtained as a resultant color. An example of a technique of regulating colors according to GWA is disclosed in the Japanese Unexamined Patent Publication (Kokai Tokkyo Koho) Official Gazette S56-36291. Further, the Japanese Unexamined Patent Publication Official Gazette H2-50592 discloses another example of the technique based on GWA and another assumption that a white part of a picture has high luminance.

However, the techniques based on GWA have a drawback in that frequently, a wrong light source is deduced and the balance of color in a picture is lost when GWA does not hold, for instance, in case where a part of a specific color has a large area in a picture. The present invention is created to eliminate such a drawback of the prior art.

It is, accordingly, an object of the present invention to an image judging device which can suitably regulate the balance of color in a picture even in case where a part of a specific color has a large area in the picture.

Such an image judging device, however, has encountered a problem that the image judging device judges that GWA does not hold good for a color chart often used to appraise an article of commerce and thus a deducing of a light source does not follow such a judgement even when an achromatic color is obtained as a result of mixing and averaging of colors of objects. This is due to the fact that generally, the variance (namely, the square of the standard deviation) of colors of a color chart in chromaticity space is extremely large. The present invention is accomplished to resolve such a problem encountered by the image judging device of the present invention.

It is, therefore, another object of the present invention to provide a color-chart discriminating device for discriminating a color chart from images of ordinary scenes.

Further, it is a further object of the present invention to provide an image judging device employing such a color-chart discriminating device.

Moreover, it is still another object of the present invention to provide a light-source deducing device employing such a color-chart discriminating device.

Furthermore, it is yet another object of the present invention to provide a light-source deducing device which can effectively deduce a light source in a picture even in case where a part of a specific color has a large area in the picture.

Additionally, it is a still further object of the present invention to provide a color regulating device employing such a light-source deducing device.

SUMMARY OF THE INVENTION

To achieve the foregoing object, in accordance with an aspect of the present Invention, there is provided an image judging device which comprises sampling means for obtaining image data suitable for judging quality of an image by sampling image signals obtained by color separation, calculation means for calculating a statistic representing characteristics of a distribution of the sampled image data and judgement means for judging the quality of the image according to the calculated statistic.

Further, in a preferred embodiment (to be described later), the calculation means calculates the vertical variance (to be described later) of the sampled image data with respect to a blackbody locus (hereunder sometimes referred to as a blackbody radiation curve) or a light-source line employed as an approximation of the blackbody locus in chromaticity space. Moreover, the judgment means judges the quality of the image by performing a threshold processing, namely, by comparing the calculated vertical variance with a threshold value.

With the above described configuration, a statistical processing of the image data can be performed correctly. Further, by applying the present invention to a GWA judgement (to be described later), the image judging device of the present invention can control a light-source deducing processing such that the light-source deducing processing is not performed in case where GWA does not hold (in such a case, there often occur errors in deducing a light source). As the result, an error rate, at which a wrong light source is deduced, can be decreased (namely, the number of times of deducing a wrong light source can be reduced) in comparison with a conventional device.

Further, as described above, means for calculating the variance is provided In the preferred embodiment as the calculation means. Moreover, means for performing a threshold processing is provided as the judgement means. Thus it can be judged whether or not GWA holds good for a taken picture. Consequently, the balance of color can be controlled or regulated correctly.

Furthermore, in case of the preferred embodiment, the vertical variance with respect to the blackbody radiation curve or the light source line employed as an approximation of the blackbody radiation curve is computed by the means for calculating the variance. Thereby, it can be determined more exactly whether or not GWA holds good.

To achieve the foregoing object, in accordance with another aspect of the present invention, there is provided a color-chart discriminating device which comprises sampling means for sampling an image signal IS, which is received from a charge coupled device (CCD) or the like, according to a predetermined suitable sampling rule, chromaticity conversion means for converting the sampled image signal into a chromaticity signal, projection means for converting a chromaticity signal into a signal representing displacement (V1, V2) of the chromaticity represented by the chromaticity signal from a line approximating a blackbody locus (namely, a locus of the chromaticity of radiation of a blackbody, which is employed as a light source, on a chromaticity plane or diagram represented by using the temperature of the blackbody as a parameter) and obtained by projecting the chromaticity onto the direction perpendicular to the line, variance calculating means for calculating the variance (hereunder sometimes referred to as image-signal variance) SGM of the displacement from the image data represented by the sampled image signals, cubic-moment calculating means for calculating a cubic moment from the displacement represented by the signal obtained by the projection means, threshold-processing means for comparing the image-signal variance with a threshold stored therein and outputting a judgement signal representing a result of the comparison and an AND circuit.

To achieve the foregoing object, in accordance with a further aspect of the present invention, there is provided a GWA judgement device which comprises another threshold-processing means, in which a threshold suitable for a GWA judgement is set, and an OR-circuit in addition to the composing elements of the color-chart discriminating device.

To achieve the foregoing object, in accordance with still another aspect of the present invention, there is provided a light-source deducing device which comprises a light-source deducing portion for receiving the image data represented by the sampled image signal from the sampling means or portion and for deducing a light source from the received image data, synthetic judgement (hereunder referred to comprehensive judgement) means or portion for receiving a light-source deduction control signal from the GWA judgement device or portion and also receiving a signal representing a result of deducing a light source from the light-source deducing portion and making a comprehensive judgement on the basis of information represented by these signals and deduction holding means or portion for storing a deduction (namely, a result of deducing a light source) therein, for receiving information, which represents a result of the comprehensive judgement, from the comprehensive judgement portion and outputting the stored deduction when the information received from the comprehensive judgement portion indicates that the judgement is impossible, in addition to the composing elements of the GWA judgement device.

Thus, the device of the present invention judges an input picture to be a color chart when the variance of the chromaticity is large and in contrast the cubic moment is small, whereby the device can discriminate a color chart from ordinary pictures. Further, there can be realized a device, which can perform the discrimination of a color chart, as well as a GWA judgement, and thus can deduce a light source not only in case where an input picture is an ordinary scene but also in case where an input picture is a color chart, after the discrimination of a color chart and the GWA judgement.

To achieve the foregoing object, in accordance with yet another aspect of the present invention, there is provided another color-chart discriminating device which comprises sampling means for sampling an image signal IS, which is received from an image pickup device such as a CCD, according to a predetermined suitable sampling rule, chromaticity conversion means for converting the sampled image signal into a chromaticity signal, statistic calculating means for calculating a statistic representing to what extent a color or chromaticity represented by an image signal is distributed along what is called a principal component axis (to be described later), image-variance calculating means for calculating the variance (hereunder sometimes referred to as the image variance) of the chromaticity represented by the image signal, first threshold-processing means for storing a first threshold therein, for comparing the statistic represented by an output signal of the statistic calculating means with the first threshold stored therein and for outputting a first judgement signal representing a result of the comparison made therein, second threshold-processing means for storing a second threshold therein, for comparing the image variance represented by an output signal of the image-variance calculating means with the second threshold stored therein and for outputting a second judgement signal representing a result of the comparison made therein and a logical product circuit (hereunder sometimes referred to as an AND circuit) for carrying out the logical AND between an output of the first threshold-processing means and an output of the second threshold-processing means.

To achieve the foregoing object, in accordance with a still further aspect of the present invention, there is provided another GWA judgement device which comprises a third threshold-processing means, in which a third threshold suitable for a GWA judgement is set, and an OR-circuit in addition to the composing elements of this color-chart discriminating device.

To achieve the foregoing object, in accordance with an additional aspect of the present invention, there is provided another light-source deducing device which comprises a light-source deducing portion for receiving the image data represented by the sampled image signal from the sampling means and for deducing a light source from the received image data, comprehensive judgement means or portion for receiving a light-source deduction control signal from this GWA judgement device or portion and also receiving a signal representing a result of deducing a light source from the light-source deducing portion and making a comprehensive judgement on the basis of information represented by these signals and deduction holding means or portion for storing a deduction therein, for receiving information, which represents a result of the comprehensive judgement, from the comprehensive judgement portion and outputting the stored deduction when the information received from the comprehensive judgement portion indicates that the judgement is impossible, in addition to the composing elements of this GWA judgement device.

Thus, the device of the present invention judges an input picture to be a color chart when the variance of the chromaticity is large and in contrast the degree of flatness (to be described later) is small, whereby the device can discriminate a color chart from ordinary pictures. Further, there can be realized a device, which can perform the discrimination of a color chart, as well as a GWA judgement, and thus does not stop deducing a light source not only in case where an input picture represents an ordinary scene but also in case where an input picture is a color chart, after the discrimination of a color chart and the GWA judgement.

To achieve the foregoing object, in accordance with a yet further aspect of the present invention, there is provided still another light-source deducing device which comprises a sampling circuit for sampling image data suitable for deducing a light-source from, which is represented by image signals IS obtained as a result of color separation, a light-source deducing portion for deducing a light source from the sampled image data, a GWA judgement portion for performing a GWA judgement, namely, judging from characteristics of the distribution of the image data whether or not GWA holds good for a taken picture, a comprehensive judgement portion for receiving a result of a first-order deduction of a light source from the light-source deducing portion and also receiving a result of the GWA judgement from the GWA judgement portion, a deduction holding portion for storing a deduction, namely, a result of deducing a light source, for receiving a second-order deduction of a light source from the comprehensive judgement portion and for outputting the stored deduction as a second-order result of deducing a light source when the deduction received from the comprehensive judgement portion indicates that the judgement is impossible.

This light-source deducing device according to the present invention is provided in a color regulating device of a video camera and an electronic image-pickup camera such as what is called an electronic still-picture camera or in a reproduction device such as a video tape recorder (VTR) for reproducing a picture taken by the camera.

Thus the device of the present invention can be controlled in such a manner that a deducing of a light source is not performed in case where GWA does not hold so that a wrong light source is often deduced. Consequently, an error rate, at which a wrong light source is deduced, can be decreased. Namely, the present invention can realize a light-source deducing device which has a small error rate in comparison with a conventional device. Moreover, a video camera, an electronic image-pickup camera or a VTR can be balanced for white by employing the light-source deducing device of the present invention in a color regulating device thereof. Thereby, colors of an input picture can be reproduced correctly, even in case where a part of a specific color has a large area in the input picture.

Furthermore, in a preferred embodiment (to be described later) of the present invention, a variance calculation portion and a threshold-processing portion are provided in the GWA judgement portion. Thus characteristics of the distribution of image data can be extracted as the variance of chromaticity in the direction perpendicular to a light-source line (to be described later) approximating a blackbody radiation curve (namely, a blackbody locus). Consequently, a deducing of a light source can be performed more correctly.

Moreover, in a preferred embodiment of the present invention, an axis-parameter calculating portion for determining an axis used for calculating a vertical variance (to be described later) with respect to the blackbody locus is provided in the GWA judgement portion. Thus a deducing of a light source can be effected more correctly.

Further, in a preferred embodiment of the present invention, a specific-color judgement portion capable of deducing a light source directly from image data is provided in the GWA judgement portion. Thus, even if the comprehensive judgement indicates that the GWA does not hold, a deducing of a light source can be performed more exactly by referring to a specific color, the corresponding image data of which is judged as present in the sampled image data by the specific-color judgement portion.

Additionally, in a preferred embodiment of the present invention, a neural network simulation means (hereunder sometimes referred to simply as a neural network) is provided in the comprehensive judgement portion. Thus, even when it is a very delicate problem to determine which of results of the GWA judgement and the specific-color judgement should be preferential, such a problem can be easily resolved according to input data by using the neural network simulation means.

BRIEF DESCRIPTION OF THE DRAWINGS

Other features, objects and advantages of the present invention will become apparent from the following description of preferred embodiments with reference to the drawings In which like reference characters designate like or corresponding parts throughout several views, and in which:

FIG. 1 is a schematic block diagram for illustrating the configuration of an image judging device embodying the present invention (hereunder sometimes referred to as a first embodiment of the present invention);

FIG. 2 is a schematic block diagram for illustrating the configuration of a light-source deducing device employing an image judging device according to the present invention (hereunder sometimes referred to as a second embodiment of the present invention);

FIG. 6(A) is a schematic block diagram for illustrating the configuration of a color-chart discriminating device according to the present invention (hereunder sometimes referred to as a fifth embodiment of the present invention);

FIG. 6(B) is a schematic block diagram for illustrating the configuration of another color-chart discriminating device according to the present invention (hereunder sometimes referred to as a sixth embodiment of the present invention);

DETAILED DESCRIPTION OF THE PREFERRED EMBODIMENTS

Figure 3:
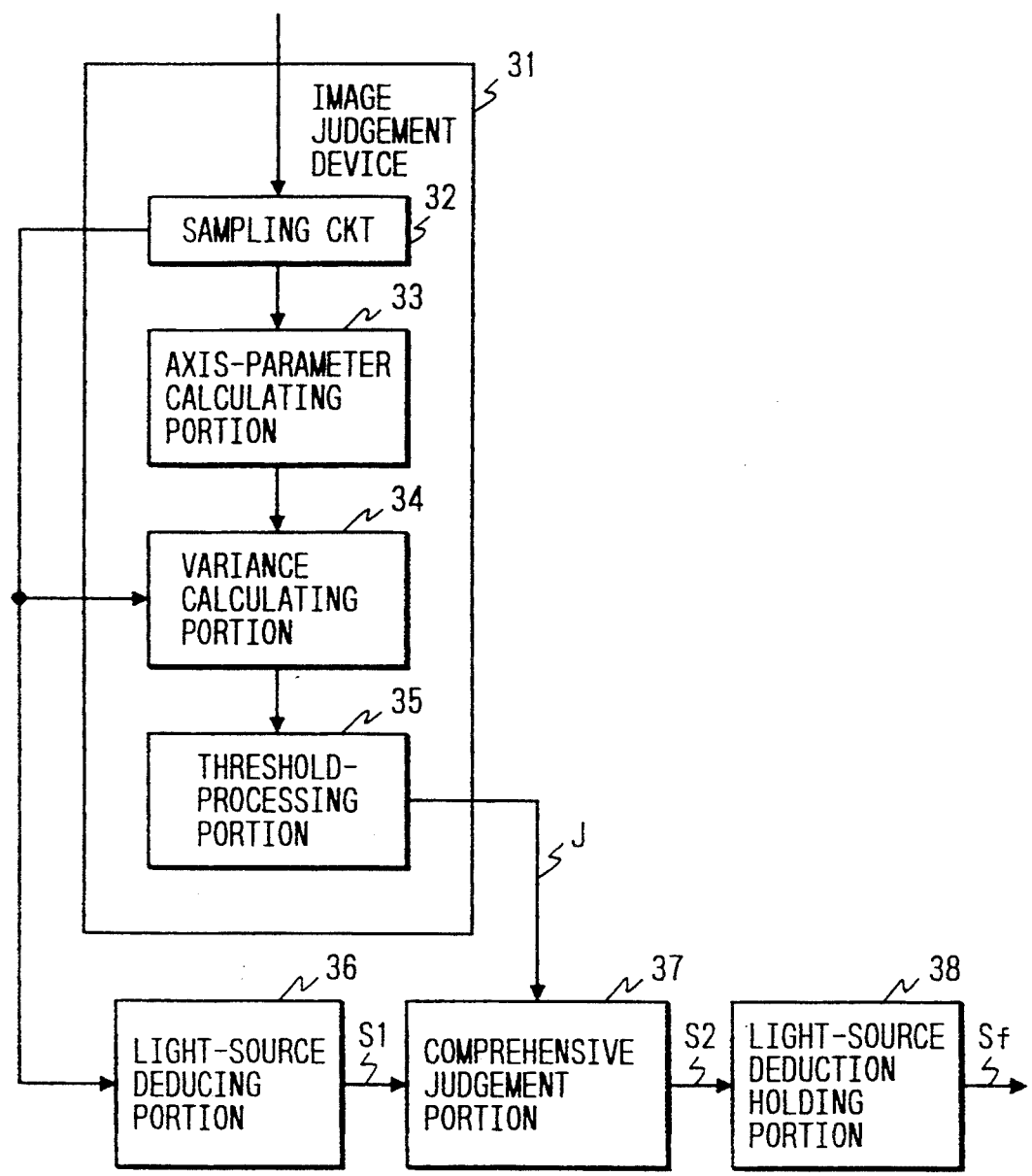
FIG. 3 is a schematic block diagram for illustrating the configuration of a light-source deducing device employing another image judging device according to the present invention (hereunder sometimes referred to as a third embodiment of the present invention)

Hereinafter, the preferred embodiments of the present invention will be described in detail by referring to the accompanying drawings.

First, the first to fourth preferred embodiments of the present invention will be described hereunder with reference to the drawings. However, the principle of the present invention, as well as results of our study based thereon, will be explained hereinbelow before describing the first to fourth embodiments detailedly.

The essential basis of AWB and GWA resides in a phenomenon that a color-mixing of colors degrades the chroma or saturation of each of the colors. Upon thorough investigation of this phenomenon, it turns out that an achromatic color (namely, gray or white) results from mixing all colors of a sufficient number. Based on this, a process employing GWA is performed on the following presumptions.

Namely, if objects, which are included in a picture, have a sufficient number of colors, an average color obtained as a result of mixing a sufficient number of colors should be achromatic. When the color of the object is achromatic, the color of the picture (namely, the average color of the entire picture) reflects or shows the color of a light source as it is. Namely, the light source can be deduced from the average color of the entire picture. Therefore, a color rendering of the light source can be corrected by regulating a color reproduction system in such a fashion that the average color of the entire picture becomes achromatic. Consequently, what is called white balance can be regulated.

Note that the technique employing GWA is a statistical technique (to be performed on a picture), as intimated by the expression "have a sufficient number of colors". Usually, this is not emphasized. Further, an intrinsic nature of this fact (namely, the fact that the technique employing GWA is statistical) is epitomized by a question "Can a white wall illuminated by a red light source be discriminated from a red wall illuminated by a white light source ?", which is often discussed in connection with limits to GWA. As is well known, it is necessary for applying a statistical technique to an object that such an object should allow of a statistical treatment. The question concerns a case where no statistical treatment can be applied to such an object, Therefore, in such a case, a light source cannot be deduced correctly by employing GWA. Namely, it is definite that the question is beyond the limit of application of GWA and is thus meaningless.

In case that GWA is employed as a presupposition, it is of no use to discuss conditions which are meaningless from the statistical point of view, while it is important to grasp the limit of application of GWA. Moreover, it is most important for securing accuracy of a deduction to effect a deducing of a light source within the limit of application of GWA when performing a process employing GWA. Thus the inventors of the present invention have made the following study, based on various data analyses.

Figure 5:
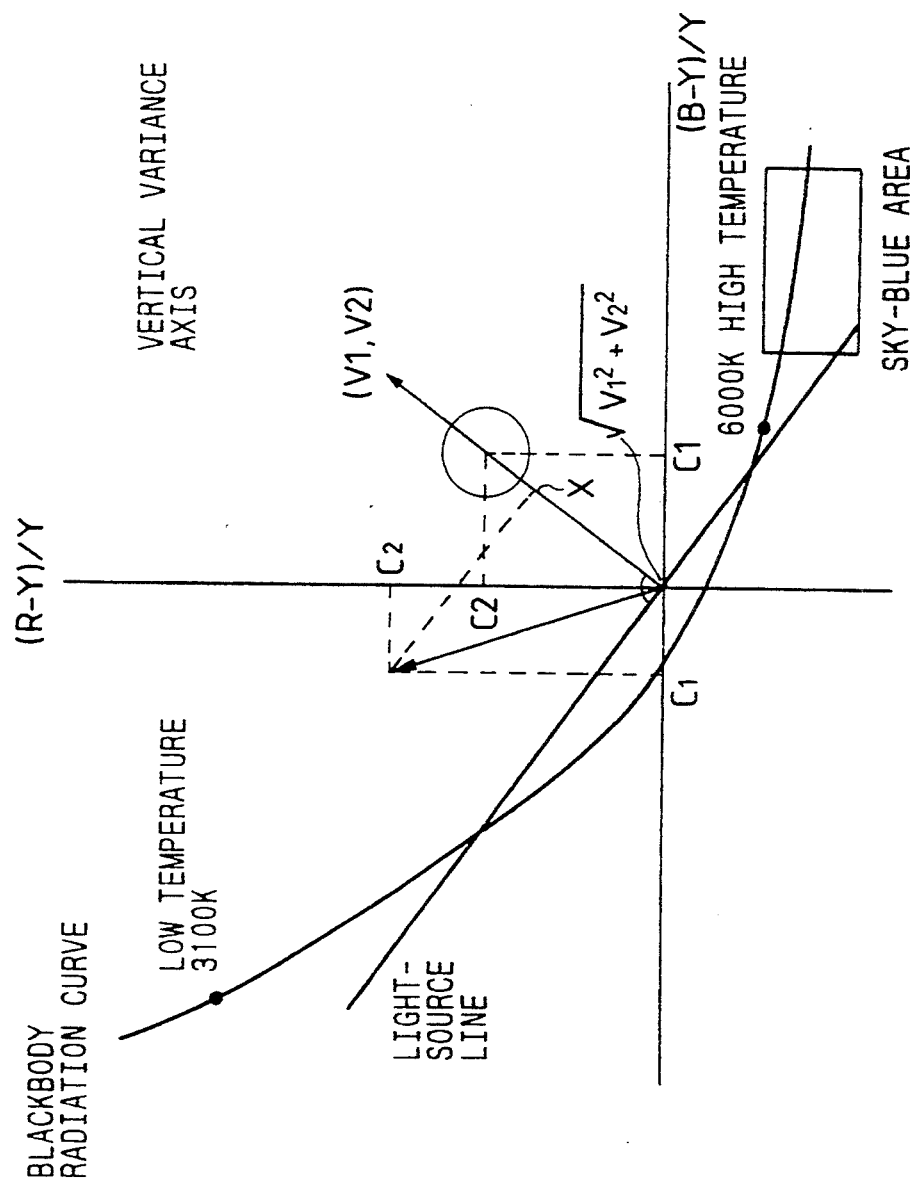
FIG. 5 is a graph for illustrating a blackbody radiation curve and a light-source line in chromaticity space.

Because chromaticity coordinates are represented by two independent variables and thus a two-dimensional coordinate system is employed for illustrating a chromaticity diagram, there are two variance axes for representing the distribution of chromaticity data. Mathematically, the two variance axes can be arbitrarily established. However, regarding a problem of white balance, a blackbody locus (namely, a locus of a color of light emitted by blackbody radiation, which varies with the temperature of the blackbody) in chromaticity space has a special significance as Illustrated in FIG. 5. Thus, in the chromaticity space, different directions are not equivalent to one another. Incidentally, for convenience of calculation, a light-source line is established as an approximation of the blackbody radiation curve (namely, the blackbody locus) as illustrated in FIG. 5.

Practically, there is a notable difference between a variance of the data in the tangential direction of the blackbody radiation curve (hereunder referred to as a horizontal variance) and another variance of the data in the direction perpendicular to the tangential direction of the blackbody radiation curve (hereunder referred to as a vertical variance). Usually, the horizontal variance is larger than the vertical variance. Further, in case of location (namely, in case of outdoor photographing), the horizontal variance considerably changes in magnitude thereof depending on whether or not the sky is in a picture. Incidentally, an azure area is indicated by a rectangular in the chromaticity space of FIG. 5. In contrast, such a phenomenon does not occur with regard to the vertical variance. Therefore, the vertical variance is stable and has a significance for various objects. Hereunder, the vertical variance will be sometimes referred to simply as the variance. Further, a parameter describing the (axis) direction corresponding to the vertical variance will be referred to as an axis parameter.

Further, as the expression "a sufficient number of colors" implies, GWA supposes that the distribution of colors of objects in a picture is a statistically natural distribution (for example, a normal distribution, the median of which corresponds to an achromatic color) and that at least any object in the picture has substantially the same distribution of colors. These assumptions are regarded as holding true with good precision, for instance, in a case where a picture of a distant outdoor view is taken. It is, however, apparent from a comparison of, for example, a bust shot (BS) of a person putting on clothes of high chroma or saturation with the distant outdoor view that the latter assumption (namely, any object has substantially the same distribution of colors) does not always hold good.

In case of a picture (for instance, the bust shot of a person wearing clothes of high chroma or saturation), for which GWA does not hold true, the average color of such a picture, which is obtained by performing a simple addition, is greatly affected by the colors of the clothes. This causes an error in deducing a light source.

Meanwhile, in case of a picture like the bust shot, some of block-average data (to be described later) indicate relatively high chroma or saturation. Thus, data are widely distributed on a hue plane. This results in increase in variance of the data. This phenomenon is noticeably presented in case of block-average data obtained by partitioning a picture and then performing an average operation on data of each of the blocks.

Practically, in case where the vertical variance is large, GWA often does not hold good. Therefore, the vertical variance is an effective index of an error. Incidentally, the vertical variance should be used in a GWA judgement with the intention of eliminating the effects of the sky in the picture. From this point of view, the preferred embodiments will be described hereinbelow by mainly using the vertical variance. This, however, does not mean that the horizontal variance is ineffective. Thus an error rate can be reduced in a light-source deducing operation by performing the following processing by using the vertical variance. Namely, if the vertical variance, which is an index indicating the limit of application of GWA, becomes larger than a predetermined value, it is expected that GWA does not hold true for a picture to be processed. In this case, a deducing of a light source is not effected but a current deduction (namely, a currently held result of deducing a light source) is kept, thereby restraining an occurrence of an error.

Against the forgoing result of our study, an objection might be made as follows. Namely, even if the variance is large, a light source can be deduced correctly in some case, for example, in case where the average color of time entire picture to be processed becomes an achromatic color. Such a case, however, happens when colors of large parts of the picture are complementary to each other. Further, naturally, such a situation is not assumed in case of performing a white balance processing based on GWA. If there are a large number of such objects or pictures, it is, of course, necessary to cope with them positively. So far, there has not been such a tendency for pictures.

Finally, a presumable ill effect of a processing performed by using the variance, as well as a method for eliminating such an ill effect, will be described hereinbelow. First, reduction in recoverability in case where an operation starts with deduction of a wrong light source can be cited as the presumable ill effect. At initial deduction, it is necessary to deduce a light source on any conditions of the device. Therefore, in case that, for instance, a close-up shot is a starting picture, the device is liable to make a wrong judgement or deduction. Moreover, noticeable stabilizing effects due to the variance are shown therein. Such a situation is beyond the limit of application of a statistic technique and is regarded as occurring more frequently in comparison with a ease of application of a conventional technique even if considering the fact that most of recoveries of a normal state occur by chance. However, such ill effects can be eliminated by inhibiting a GWA judgement based on the variance until the vertical variance becomes equal to or less than a threshold value at least once since an operation of the device is started.

Hereinafter, the first to fourth embodiments of the present invention, which are based on the results of the study explained hereinabove, will be described by referring to FIGS. 1 to 4.

1. First Embodiment

FIG. 1 is a schematic block diagram for illustrating the configuration of the first embodiment (namely, an image judgement device) of the present invention. In this figure, reference numeral 1 denotes a sampling circuit for obtaining image data suitable for an image judgement from data represented by image signals derived as a result of color separation; 12 a variance calculating portion for receiving the sampled image data and for calculating the vertical variance of colors represented by color signals with respect to a light-source line; and 13 a threshold-processing portion for receiving a color variance signal indicating the calculated variance from the variance calculating portion, for comparing the variance represented by the received variance signal with a threshold value preliminarily stored therein and for outputting a signal indicating that GWA holds good when the variance is smaller than the threshold value and outputting another signal indicating that GWA does not hold true when the variance is larger than the threshold value.

Next, an operation of the image judgement device having the above described configuration will be described hereinbelow.

First, image signals output from a color separation circuit (not shown) through pickup elements such as CCD elements are input to and sampled according to a predetermined suitable rule by the sampling circuit 11. Then, the sampled image data is sent therefrom to the variance calculating portion 12 which receives the input image data IS (namely, (RGB), (Y, R−Y, B−Y) or the like (incidentally, R, B and Y designates data indicated by red, blue and yellow video signals, respectively)) and sometimes evaluates the data and computes an image data variance SGM, which is a vertical variance with respect to the light-source line in a chromaticity space (for example, a chromaticity space represented by two independent variables (R−Y)/Y and (B−Y)/Y as illustrated In FIG. 5) and given by the following equation:

$$SGM = (1/N) \Sigma (X_1 - <X>)^2$$

where $<X>$ denotes an average value or mean of a variable (namely, displacement to be described later) X; and N the number of data.

Hereinafter, an operation of the variance calculating portion 12 will be described hereunder more particularly and practically by supposing that the input image data IS is indicated by (Y, R−Y, B−Y).

First, the image data IS is converted to chromaticity data CS=(C1, C2) by the following equations:

$$C1 = (B-Y)/Y$$

$$C2 = (R-Y)/Y.$$

Then, the chromaticity data CS indicated by a chromaticity signal is projected onto the direction perpendicular to the light source, which is indicated by a vector (V1, V2) (incidentally, V1 and V2 denote axis parameters), and the magnitude of a segment obtained by the projection, namely, the displacement X from the light-source line is obtained by the following equation:

$$X = C1 \cdot V1 + C2 \cdot V2$$

The variance of the displacement X thus calculated will be sometimes referred to as a vertical (image-data) variance.

Subsequently, the threshold-processing portion 13 receives the image data variance SGM from the vertical variance calculating portion 12 and compares the received variance with the threshold value $\theta$ and outputs a GWA judgement signal indicating GWA judgement data J as follows.

If SGM is less than $\theta$, J=OK (indicating that GWA holds good); and

Otherwise, J=NO (indicating that GWA does not hold good).

Incidentally, J is set as OK (namely, J=OK) until SGM becomes less than $\theta$ at least once since an operation of the device is started.

Thus, in case of the first embodiment, it can be judged from the vertical variance of image data calculated with respect to the light-source line whether or not GWA holds true. Consequently, a light source can be deduced with higher precision in comparison with the conventional device.

Incidentally, the vector (V1, V2) indicating the direction perpendicular to the light-source line may be approximately equivalent to (1, 1). Further, this vector (V1, V2) does not need determining strictly. The precision of the GWA-judgement changes to some extent according to the axis parameters. However, practical data analysis reveals that the influence of change in precision is not large.

Furthermore, the basis of the calculation of the vertical image-data variance does not depend on what signals (for instance, a RGB signal, Y, R−Y and B−Y signals) indicate image data.

Additionally, in this embodiment, the vertical variance is calculated after image data is converted to chromaticity data in two-dimensional chromaticity space. However, the variance can be computed by directly using three-dimensional image data by, for example, employing a light-source surface instead of the light-source line. In such a case, an algorithm may be tuned in such a manner to eliminate the effects of specific colors such as the color of the sky which has a large effect upon the deduction of the light source. In this case, the variance in the direction along the light-source line (namely, the horizontal variance) comes to have practical significance. Thus it is not necessary to restrict the statistic used for GWA judgement to the vertical variance.

Further, in place of the variance, an average or mean value or an N-dimensional moment may be employed as a statistic representing the characteristic of the distribution of the image data.

2. Second Embodiment

Next, the second embodiment (namely, a light-source deducing device employing the image judgement device (namely, the first embodiment)) of the present invention will be described hereinbelow. FIG. 2 is a schematic block diagram for illustrating the configuration of the second embodiment (namely, a light-source deducing device) of the present invention. In this figure, reference numeral 21 denotes an image judgement device. This device 21 is provided with a sampling circuit 22 for obtaining image data suitable for an image judgement from data represented by image signals derived as a result of color separation and a GWA judgement portion 28 for receiving the sampled image data and judging whether or not GWA holds good. Further, the portion 28 includes a variance calculating portion 28 for calculating the variance of colors represented by color signals and a threshold-processing portion 24 for receiving a color variance signal indicating the calculated variance from the variance calculating portion 28, for comparing the variance represented by the received variance signal with a threshold value preliminarily stored therein and for outputting a signal indicating that GWA holds good when the variance is smaller than the threshold value and otherwise outputting another signal indicating that GWA does not hold true. Reference numeral 25 designates a light-source deducing portion for receiving the sampled image data and deducing a light source; 26 a comprehensive judgement portion for receiving a first-order deduction (namely, a first-order result of deducing a light source) S1 and a GWA judgement signal indicating GWA judgement data J respectively from the light-source deducing portion 25 and the image judgement device 21, for processing the first-order deduction S1 according to the GWA judgement data J and for outputting a signal indicating a second-order deduction (namely, a second-order result of deducing a right source) S2; and 27 a deduction holding portion for holding the second-order deduction S2 received from the comprehension judgement portion 26.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 22. Then, the sampled image data is sent therefrom to both of the light-source deducing portion 25 and the variance calculating portion 22. The light-source deducing portion 25 receives the input image data IS (namely, (RGB), (Y, R−Y, B−Y) or the like) and sometimes evaluates the data and computes, for instance, an image-data average ISave. Subsequently, the portion 25 compares the average ISave with data representing the color of a light source stored therein and thereafter outputs data representing a light source having the color, which is most closely allied to the color indicated by the data compared and stored therein, as first-order deduction data S1. On the other hand, the portion 23 of the device 21 receives the input image data IS and sometimes evaluates the data and further calculates the image data variance SGM, which is the vertical variance with respect to the light-source line in a chromaticity space (for example, the chromaticity space represented by two independent variables (R−Y)/Y and (B−Y)/Y as illustrated in FIG. 5), similarly as in case of the first embodiment.

Meanwhile, the threshold-processing portion 24 receives the image-data variance SGM from the variance calculating portion 23 and then compares the variance SGM with the threshold value $\theta$ and outputs a GWA judgement signal indicating GWA judgement data J as follows.

If SGM is less than $\theta$, J=OK (indicating that GWA holds good); and

Otherwise, J=NO (indicating that GWA does not hold good).

Incidentally, J is set as OK (namely, J=OK) until SGM becomes less than $\theta$ at least once since an operation of the device Is started. The comprehensive judgement portion 26 receives the first order deduction S1 and the GWA judgement signal indicating the data J respectively from the light-source deducing portion 25 and the threshold-processing portion 24 and subsequently outputs a signal indicating a second-order deduction 52 as follows.

If J=OK, S2=S1; and

If J=NO, S2=IMPOSSIBLE (indicating that a judgement is impossible).

The deduction holding portion 27 receives the second-order deduction S2 from the comprehensive judgment portion 26 and outputs a final deduction (namely, a final result of deducing a light source) Sf and holds the second-order deduction S2 as a variable Sbuf. Namely, If S2 does not indicate that the judgement is impossible. Sf=S2; and Sbuf=S2.

If S2 indicates that the judgement is impossible,

Sf=Sbuf; and

Sbuf=Sbuf.

Thus, in case of the second embodiment, it is judged from the vertical variance of the image data with respect to the light-source line whether or not GWA holds good. Thereby, results of deducing a light source when GWA does not hold good (in such a case, the device Is liable to deduce a wrong light source) are discarded. Consequently, a light-source deducing device, in which an error in deducing a light source hardly occurs, can be realized.

3. Third Embodiment

Next, the third embodiment (namely, a light-source deducing device employing another image judgement device) of the present invention will be described hereinbelow. FIG. 3 is a schematic block diagram for illustrating the configuration of the second embodiment (namely, a light-source deducing device) of the present invention. In this figure, reference numeral S1 denotes an image judgement device. The device 31 is provided with a sampling circuit 32 for obtaining image data suitable for an image judgement from data represented by image signals derived as a result of color separation, an axis-parameter calculating portion 33 for calculating axis-parameters to determine the direction (hereunder sometimes referred to as a variance-axis direction), in which a (vertical) variance axis as illustrated in FIG. 5 extends, from the image data, a variance calculating portion 34 for receiving the sampled image data and data Indicating the direction of the blackbody radiation curve of FIG. 5 represented by a signal output from the portion 33 and for calculating the variance of colors represented by color signals and a threshold-processing portion 35 for receiving a color variance signal indicating the calculated variance from the variance calculating portion 34, for comparing the variance represented by the received variance signal with a threshold value preliminarily stored therein and for outputting a signal indicating that GWA holds good when the variance is smaller than the threshold value and otherwise outputting another signal indicating that GWA does not hold true. Reference numeral 36 designates a light-source deducing portion for receiving the sampled image data and deducing a light source; 37 a comprehensive judgement portion for receiving a first-order deduction (namely, a first-order result of deducing a light source) S1 and a GWA judgement signal indicating GWA judgement data J respectively from the light-source deducing portion 36 and the image judgement device 31, for processing the first-order deduction S1 according to the GWA judgement data J and for outputting a signal indicating a second-order deduction (namely, a second-order result of deducing a light source) S2; and 38 a deduction holding portion for holding the second-order deduction S2 received from the comprehension judgement portion 37.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 32. Then, the sampled image data is sent therefrom to both of the light-source deducing portion 36, the axis-parameter calculating portion 33 and the variance calculating portion 34. The light-source deducing portion 36 receives the input image data IS (namely, (RGB), (Y, R−Y, B−Y) or the like) and sometimes evaluates the data and computes, for instance, an image-data average ISave. Subsequently, the portion 36 compares the average ISave with data representing the color of a light source stored therein and thereafter outputs data representing a light source having the color, which is most closely allied to the color indicated by the data compared and stored therein, as first-order deduction data S1. On the other hand, the portion 33 of the device 31 receives image signals and calculates the axis-parameters to determine the variance axis direction of the blackbody radiation curve according to the image data average ISave or the like. The variance calculating portion 34 receives the input image data IS and sometimes evaluates the data and further calculates the image data variance SGM, which is the vertical variance with respect to the blackbody radiation curve in the chromaticity space. Further, the threshold-processing portion 38 receives the image-data variance SGM from the variance calculating portion 34 and then compares the variance SGM with the threshold value $\theta$ and outputs a GWA judgement signal indicating GWA judgement data J as follows.

If SGM is less than $\theta$, J=OK (indicating that GWA holds good); and

Otherwise, J=NO (indicating that GWA does not hold good).

Incidentally, J is set as OK (namely, J=OK) until SGM becomes less than $\theta$ at least once since an operation of the device is started. The comprehensive judgement portion 37 receives the first-order deduction S1 and the GWA judgement signal indicating the data J respectively from the light-source deducing portion 38 and the threshold-processing portion 35 and subsequently outputs a signal indicating a second-order deduction S2 as follows.

If J=OK, S2=S1; and

If J=NO, S2=IMPOSSIBLE (indicating that a judgement is impossible).

The deduction holding portion 38 receives the second-order deduction S2 from the comprehensive judgement portion 37 and outputs a final deduction (namely, a final result of deducing a light source) Sf and holds the second-order deduction S2 as a variable Sbuf. Namely, If S2 does not indicate that the judgement is impossible, Sf=S2; and
Sbuf=S2.

If S2=IMPOSSIBLE (namely, S2 indicates that the judgement is impossible), Sf=Sbuf; and
Sbuf=Sbuf.

Thus, in case of the third embodiment, the axis-parameter calculating portion 33 determines the variance axis direction from the blackbody radiation curve in the chromaticity space. Thus the vertical variance can be calculated with high precision. Further, it is judged from the vertical variance of the image data whether or not GWA holds good. Thereby, results of deducing a light source when GWA does not hold good (in such a case, the device is liable to deduce a wrong light source) are discarded. Consequently, a light-source deducing device, in which the number of errors occurring in deducing a light source is further smaller, can be realized.

4. Fourth Embodiment

Figure 4:
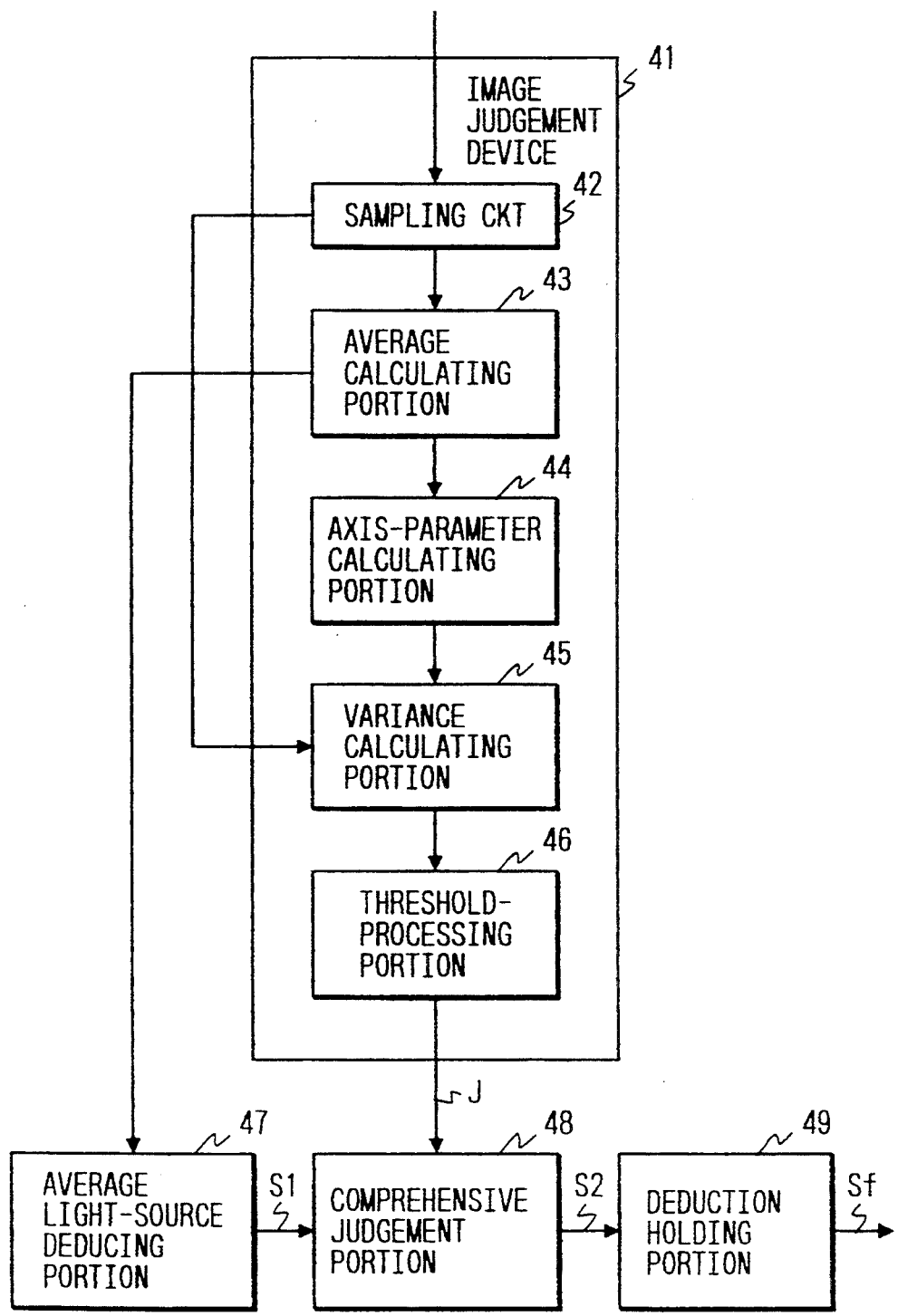
FIG. 4 is a schematic block diagram for illustrating the configuration of another light-source deducing device employing a further image judging device according to the present invention (hereunder sometimes referred to as a fourth embodiment of the present invention)

Next, the fourth embodiment (namely, a light-source deducing device employing still another image judgement device) of the present invention will be described hereinbelow. FIG. 4 is a schematic block diagram for illustrating the configuration of the fourth embodiment (namely, a light-source deducing device) of the present invention, In this figure, reference numeral 31 denotes an image judgement device. The device 41 is provided with a sampling circuit 42 for obtaining image data suitable for an image judgement from data represented by image signals derived as a result of color separation, an average calculating portion 43 for receiving the sampled image data and the average ISave of the received image data, an axis-parameter calculating portion 44 for receiving the average ISave from the average calculating portion 44 and for calculating axis-parameters to determine the variance-axis direction, a variance calculating portion 45 for receiving the sampled image data and data indicating the direction of the blackbody radiation curve of FIG. 5 represented by a signal output from the portion 44 and for calculating the variance of colors represented by color signals and a threshold-processing portion 46 for receiving a color variance signal indicating the calculated variance from the variance calculating portion 45, for comparing the variance represented by the received variance signal with a threshold value preliminarily stored therein and for outputting a signal indicating that GWA holds good when the variance is smaller than the threshold value and otherwise outputting another signal indicating that GWA does nor hold true. Reference numeral 47 designates an average light-source deducing portion for receiving the image data average $IS_{ave}$ from the portion 43 and for deducing a light source; 48 a comprehensive judgement portion for receiving a first-order deduction (namely, a first-order result of deducing a light source) S1 and a GWA judgement signal indicating GWA judgement data J respectively from the average light-source deducing portion 47 and the image judgement device 41, for processing the first-order deduction S1 according to the GWA judgement data J and for outputting a signal indicating a second-order deduction (namely, a second-order result of deducing a light source) S2; and 49 a deduction holding portion for holding the second-order deduction 52 received from the comprehension judgement portion 48.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 42. Then, the sampled image data is sent therefrom to the average calculating portion 43. The portion 43 receives the input image data IS (namely, (RGB)0 (Y, R−Y, B−Y) or the like) and sometimes evaluates the data and computes, for instance, an image-data average $IS_{ave}$. Subsequently, the average light-source deducing portion 47 receives the image-data average $IS_{ave}$ from the portion 43 and then compares the average $IS_{ave}$ with data representing the color of a light source stored therein and thereafter outputs data representing a light source having the color, which is most closely allied to the color indicated by the data compared and stored therein, as first-order deduction data S1. On the other hand, the portion 44 of the device 41 receives the image-data average $IS_{ave}$ from the portion 43 and detects a point, which is the closest point from the average $IS_{ave}$, on the blackbody radiation curve and calculates the axis-parameters to determine the direction along which a normal to the blackbody radiation curve (namely, a line perpendicular to the tangent line at such a point of the blackbody radiation curve) extends, as the variance axis direction of the blackbody radiation curve according to the image data average $IS_{ave}$ or the like. Then the portion 44 outputs the calculated axis-parameters. The variance calculating portion 45 receives the axis-parameters from the portion 44, as well as the input image data IS, and sometimes evaluates the data and further calculates the image data variance SGM, which is the vertical variance corresponding to the normal to the blackbody radiation curve in the chromaticity space. The rest of the operation of this embodiment is the same as in case of the third embodiment.

Thus, in case of the fourth embodiment, the axis-parameter calculating portion 44 detects the nearest point on the blackbody radiation curve to the image-data average $IS_{ave}$ and employs the direction, in which a normal (namely, the line perpendicular to the tangent line at the detected point of the blackbody radiation curve)extends, as the variance axis direction from the blackbody radiation curve in the chromaticity space and outputs the calculated axis-parameters. Thus the vertical variance can be obtained with higher precision. Further, it is judged from the vertical variance of the image data whether or not GWA holds good. Thereby, results of deducing a light source when GWA does not hold good (in such a case, the device is liable to deduce a wrong light source) are discarded. Consequently, a light-source deducing device, in which the number of errors occurring in deducing a light source is further smaller, can be realized.

Incidentally, in the third and fourth embodiments, the processing to be performed In the axis-parameter calculating portions 33 and 44 causes a fairly large calculation-load. However, the device may employ a simple and easy means which partitions the chromaticity space into suitable regions and detects a region, in which the image-data average is present, and determines the axis-parameters to be assigned to the detected region, instead of the portions 38 and 44.

Next, fifth to eighth embodiments of the present invention will be described with reference to FIGS. 6 to 14.

As stated in the description of the principle to the first to fourth embodiments of the present invention, even if the variance is large, a light source can be deduced correctly In some case, for example. In case where the average color of the entire picture to be processed becomes an achromatic color. An example of a picture of such a case is a color chart often used to appraise an article of commerce at the time of forwarding thereof and to test an article of commerce. Because of such purposes of using a color chart, it is required to discriminate a color chart from other ordinary pictures or images.

As a result of detailed analysis of a color chart, it has turned out that characteristics of a color chart reside in that generally, the vertical variance of a color chart is very large and that image data of a color chart are evenly distributed in the vicinity of an average value thereof. In case of ordinary objects, the distribution of image data in color space is "distorted" or biased when the variance is extremely large. In contrast, the well-balanced distribution of chromaticity is very peculiar to a color chart and reflects artificiality thereof. A statistic known as representing such a "distortion" is a three-dimensional or cubic moment M3 generally defined as follows.

$$M3 = \Sigma (X - <X>)^3 / N$$

where X denotes a value Indicated by data; $<X>$ the average of the data X; and N the number of data. According to results of analysis made by the inventors of the instant invention, the variance of a color chart is nearly two or more times as much as a variance threshold value, at which GWA is judged not to hold true. In case of a color chart, the magnitude of the absolute value of a cubic moment is very small in comparison with cases of ordinary pictures, for which GWA holds true. Further, the magnitude of the absolute value of a cubic moment of an ordinary picture is ten or more times that of the absolute value of a cubic moment of an ordinary picture having a large variance (see FIG. 15) mostly. Therefore, a color chart can be discriminated from other ordinary pictures with very high precision by judging the variance of the chromaticity data and the cubic moment (especially, the cubic moment) collectively.

Even if not using the absolute value of the cubic moment, a similar processing can be performed. However, the processing an be easily effected by using the absolute value. Hereinafter, for brevity of the description, the absolute value of the cubic moment will be referred to simply as a cubic moment.

Next, the configuration of the fifth embodiment will be described hereinbelow by referring to the drawings.

5. Fifth Embodiment

FIG. 6(A) is a schematic block diagram for illustrating the configuration of the fifth embodiment (namely, a color-chart discriminating portion) of the present invention. In this figure, reference numeral 61 designates sampling means for sampling an image signal IS, which is received from a CCD or the like, according to a predetermined suitable sampling rule; 62 chromaticity conversion means for converting the sampled image signal into a chromaticity signal; 63 projection means for projecting a chromaticity represented by a chromaticity signal onto a line extending in the direction indicated by a vector (V1, V2), which is perpendicular to the light-source line, and converting the chromaticity represented by the chromaticity signal into the magnitude of a component in the direction represented by the vector, namely, a displacement from the light-source line; 64 variance calculating means for calculating the image-signal variance SGM of the displacement from the image data represented by the sampled image signals; 65 cubic-moment calculating means for calculating a cubic moment M3 from the displacement Xi represented by a signal obtained by the projection means 63; 661 and 662 threshold-processing means for comparing the image-data variance (hereunder sometimes referred to as image-signal variance) with a threshold stored therein and outputting a judgement signal representing a result of the comparison; 67 an ordinary AND circuit; and 100 a color-chart judgement portion which is a nucleus of the device of the present invention.

Figure 7:
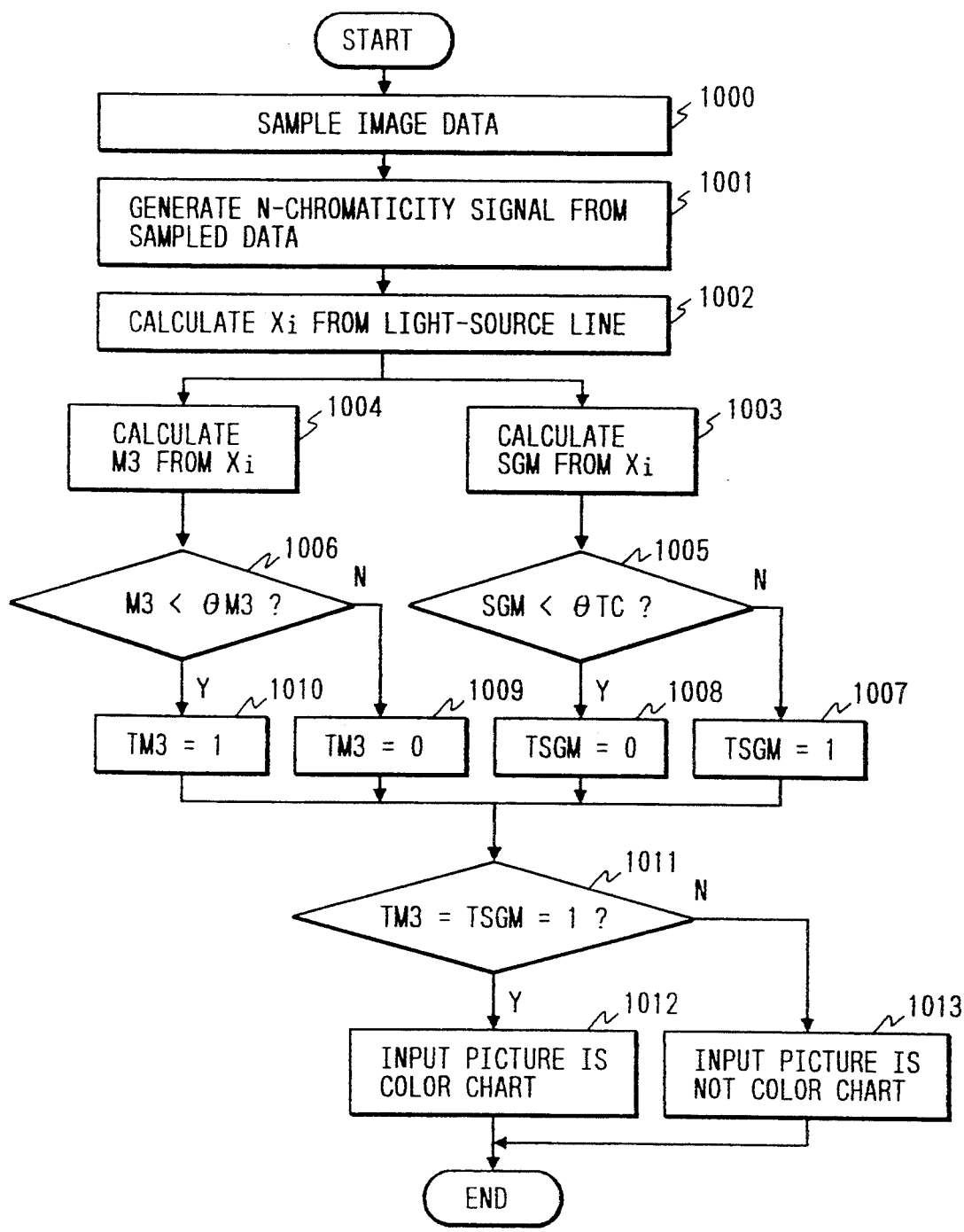
FIG. 7 is a flowchart of a program for illustrating an operation of the color-chart discriminating device (namely, the fifth embodiment) of FIG. 6.

Next, an operation of the device having the above described configuration will be described hereinbelow by referring to FIG. 7. Incidentally, image data IS represented by an input image signal is assumed to be (Y, R−Y, B−Y). Note that this does not mean that the present invention is limited only thereto.

Figure 8:
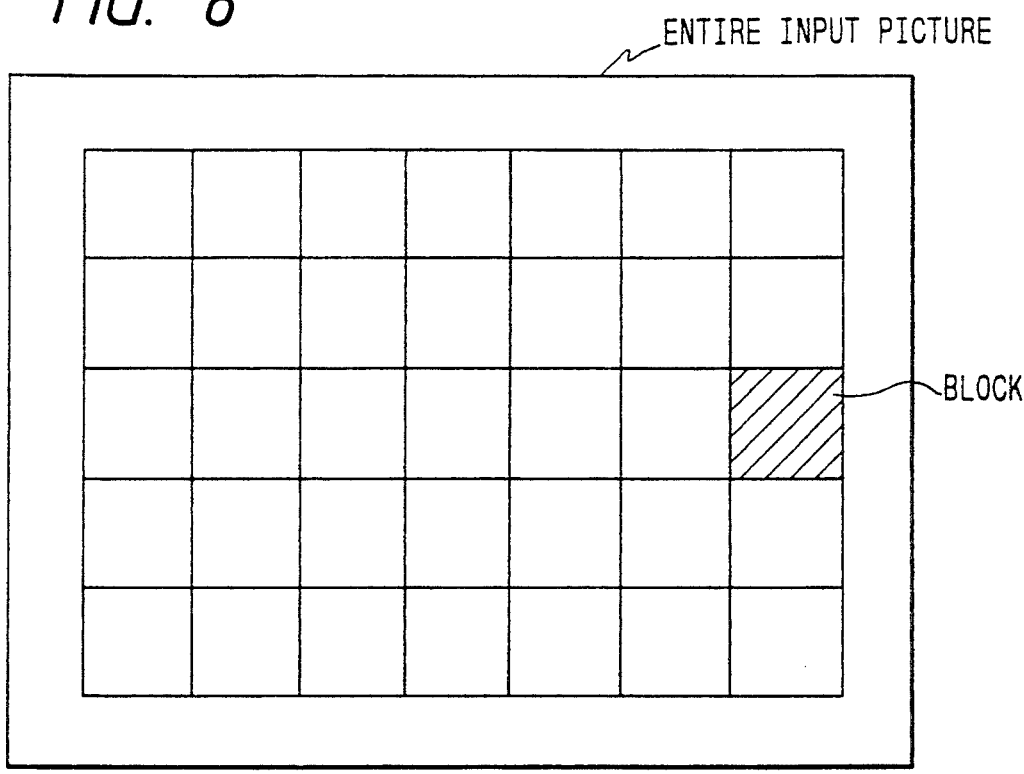
FIGS. 8 and 9 are diagrams for illustrating an example of a manner of sampling image data.

First, the data IS represented by image signals output from CCD elements or the like is input to and sampled according to a predetermined suitable rule by the sampling circuit 61. In case of this embodiment, an input picture is partitioned into m×n blocks as illustrated in FIG. 8 and subsequently a plurality of data points (incidentally, the number of data points is k (a positive integer)) are sampled from each block to calculate a block-average $<IS>_i$ (i=1, ..., N) of the sampled data as follows:

$$<IS>_i = \Sigma (Y_j, R-Y_j, B-Y_j)/k$$

Incidentally, N (=m×n) denotes the number of sampled data; k the number of data points sampled from each block. The chromaticity calculating means 62 receives the data $<IS>_i=(YY_i, BY_i, RY_i)$ sampled by the sampling means 61 and converts this data into chromaticity data $CS_i=(C1_i, C2_i)$ represented by a chromaticity signal as follows:

$C1_i = BY_i/YY_i$; and
$C2_i = RY_i/YY_i$

The projection means 68 receives the data $CS_i$ represented by the chromaticity signal and projects the received data onto the line extending in the direction (V1, V2) perpendicular to the light-source line and converts the received data into the magnitude of the component, namely, the displacement Xi from the light-source line, which is given by:

$$X_i = C1_i \cdot V1 + C2_i \cdot V2$$

Then, the variance calculating means 64 calculates the image-signal variance SGM of the displacement Xi (i=1, ..., N) obtained from the sampled data of the picture, The cubic moment calculating means 65 receives the displacement Xi from the projection means 63 and calculates the cubic moment M3 obtained by:

$$M3 \Sigma (X_i - <X>)^3/N$$

where $<X>$ designates the average of the displacement data projected on a line extending in the direction perpendicular to the light-source line. Further, the threshold-processing means 661 receives the image-signal variance SGM from the variance calculating means 64 and compares the received variance with an image variance threshold value $\theta$ TC and outputs a color-chart variance judgement signal indicating color-chart variance judgement data SGM as follows.

If SGM is less than $\theta$ TC, TSGM=0 (indicating that the input picture is not a color chart); and Otherwise, TSGM=1 (indicating the possibility of a color chart).

The threshold-processing means 662 receives the cubic moment M3 from the cubic moment calculating means 65 and compares the received moment with a cubic-moment threshold value $\theta$ M3 and outputs a color-chart cubic-moment judgement signal indicating color-chart cubic-moment judgement data $T_{M3}$ as follows.

If M3 is less than $\theta$ M3, $T_{M3}=1$ (indicating the possibility of a color chart); and Otherwise, $T_{SGM}=1$ (indicating that the input picture is not a color chart).

The AND circuit 67 receives the signal $T_{SGM}$ from the means 661 and the signal $T_{M3}$ from the means 662 and performs the logical AND between the data indicated by received signals $T_{SGM}$ and $T_{M3}$. Further, the circuit 67 outputs a color-chart judgement signal T representing the color-chart judgement as follows:

T=1 (indicating that the input picture is a color chart); and

T=0 (indicating that the input picture is not a color chart).

Thus a color-chart judgement is completed (namely, it is judged from the image signal whether or not the input picture is a color chart).

Incidentally, the vector (V1, V2) indicating the direction perpendicular to the light-source line may be approximately equivalent to (1, 1). Further, this vector (V1, V2) does not need determining strictly. The precision of the AWB-judgement changes to some extent according to the axis parameters. However, practical data analysis reveals that the influence of change in precision is not large.

Further, the basis of the calculation of the vertical image-data variance does not depend on what signals (for instance, a RGB signal, Y, R−Y and B−Y signals) indicate image data.

Furthermore, in this embodiment, the vertical variance is calculated after image data is converted to chromaticity data in two-dimensional chromaticity space. However, the variance can be computed by directly using three-dimensional image data by, for example, employing a light-source surface instead of the light-source line.

Additionally, in such a case, an algorithm may be tuned in such a manner to eliminate the effects of specific colors such as the color of the sky which has a large effect upon the deduction of the light source. In this case, the variance In the direction along the light-source line comes to has practical significance. Thus it is not necessary to restrict the statistic used for GWA judgement to the vertical variance. Moreover, the following condition for the judgement may be employed instead of the above described condition. Namely, if data CC defined by the following equation is equal to or less than a predetermined value, the data CC indicates that the input picture is a color chart.

$$CC = \alpha SGM - \beta \cdot |M3|$$

Incidentally, $0 < \alpha \ \beta$.

Furthermore, the projection means may be divided into two parts (or two projection means may be provided). An axis corresponding to the signal input to the variance calculating means 64, as well as an axis corresponding to the signal input to the cubic moment calculating means 65, may be different from each other.

Note that these may be similarly applied to the sixth to eighth embodiments.

6. Sixth Embodiment

Next, the configuration of the sixth embodiment will be briefly described hereinafter.

In the fifth embodiment, a cubic moment in the direction perpendicular to the light-source line is computed to discriminate a color chart from other ordinary pictures. Instead of such a technique, the sixth embodiment employs a simpler technique for discriminating a color chart by using a statistic in the direction along the axis, namely, a technique positively utilizing the property of a color chart that the average of the colors of the entire color chart becomes achromatic.

Note that the light source has substantially no effect on a color in the direction perpendicular to the light-source line in the chromaticity space because the color is changed along the light-source line. Therefore, the average $<X>$ of the data represented by the color or image signals, which are projected onto the line extending in the direction perpendicular to the light-source line, is maintained substantially as equal to 0. Consequently, the cubic moment MS can be approximated as follows:

$$M3 = \Sigma (Xi - <X>)^3 / N \sim \Sigma Xi^3 / N$$

The sixth embodiment of the present invention employs such a vertical cubic-sum M3' defined as described below, instead of the cubic moment M3 to discriminate a color chart from ordinary pictures. Namely, $$M3' = \Sigma Xi^3 / N$$

The configuration of this embodiment is similar to that of the fifth embodiment except that the cubic moment calculating means 65 is replaced with vertical cubic-sum calculating means 65' as illustrated In FIG. 6(B) and that the direction parameter of the projection means is changed as indicating a direction perpendicular to the light-source line.

Incidentally, the projection means may be divided into two parts (or two projection means may be provided). An axis corresponding to the signal input to the variance calculating means 64, as well as an axis corresponding to the signal input to the cubic-sum calculating means 65', may be different from each other.

7. Seventh Embodiment

Hereinafter, the seventh embodiment of the present invention will be described by referring to the drawings.

Figure 10:
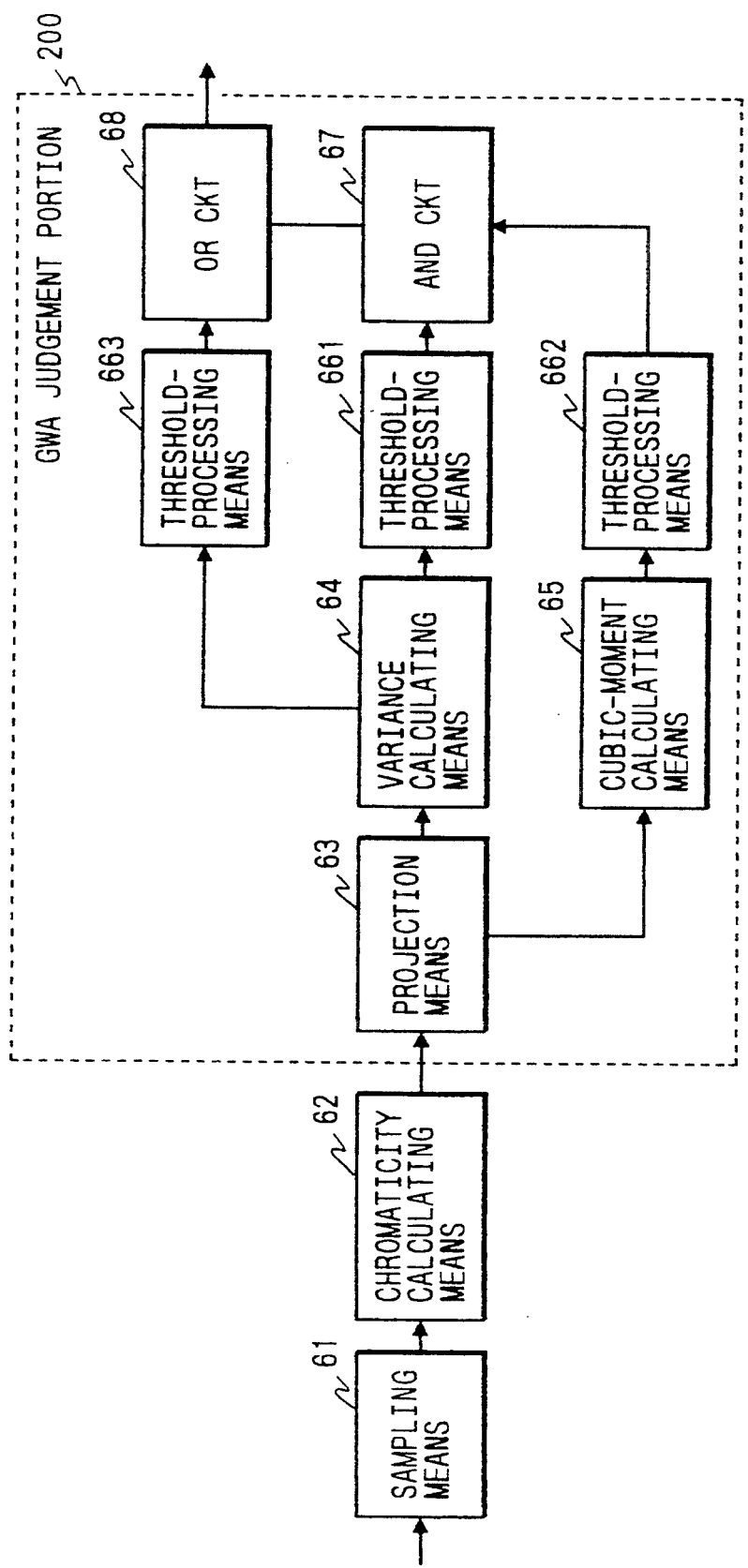
FIG. 10 is a schematic block diagram for illustrating the configuration of a GWA judgement device according to the present invention (hereunder sometimes referred to as a seventh embodiment of the present invention)

FIG. 10 is a schematic block diagram for illustrating the configuration of the seventh embodiment (namely, an image judging device incorporating a color chart judgement device) of the present invention. In this figure, reference numeral 61 designates sampling means for sampling an image signal IS, which is received from a CCD or the like, according to a predetermined suitable sampling rule; 62 chromaticity conversion means for converting the image signal sampled by the means 61 into a chromaticity signal; 63 projection means for projecting a chromaticity represented by a chromaticity signal onto a line extending in the direction indicated by a vector (V1, V2), which is perpendicular to the light-source line, and converting the chromaticity represented by the chromaticity signal into the magnitude of a component in the direction represented by the vector, namely, the displacement from the light-source line; 64 variance calculating means for calculating the image-signal variance SGM of the displacement from the image data represented by the sampled image signals; 65 cubic-moment calculating means for calculating a cubic moment M3 from the displacement Xi represented by a signal obtained by the projection means 63; 661 and 662 threshold-processing means for comparing the image-signal variance with a threshold stored therein and outputting a judgement signal representing a result of the comparison; and 67 an ordinary AND circuit. These composing elements are similar to the corresponding elements of FIG. 6. In addition to these elements, this embodiment is provided with threshold-processing means 663, which is similar to the means 661 and 662, an ORdinary OR circuit 68 and 200 an image judgement portion 200.

Figure 11:
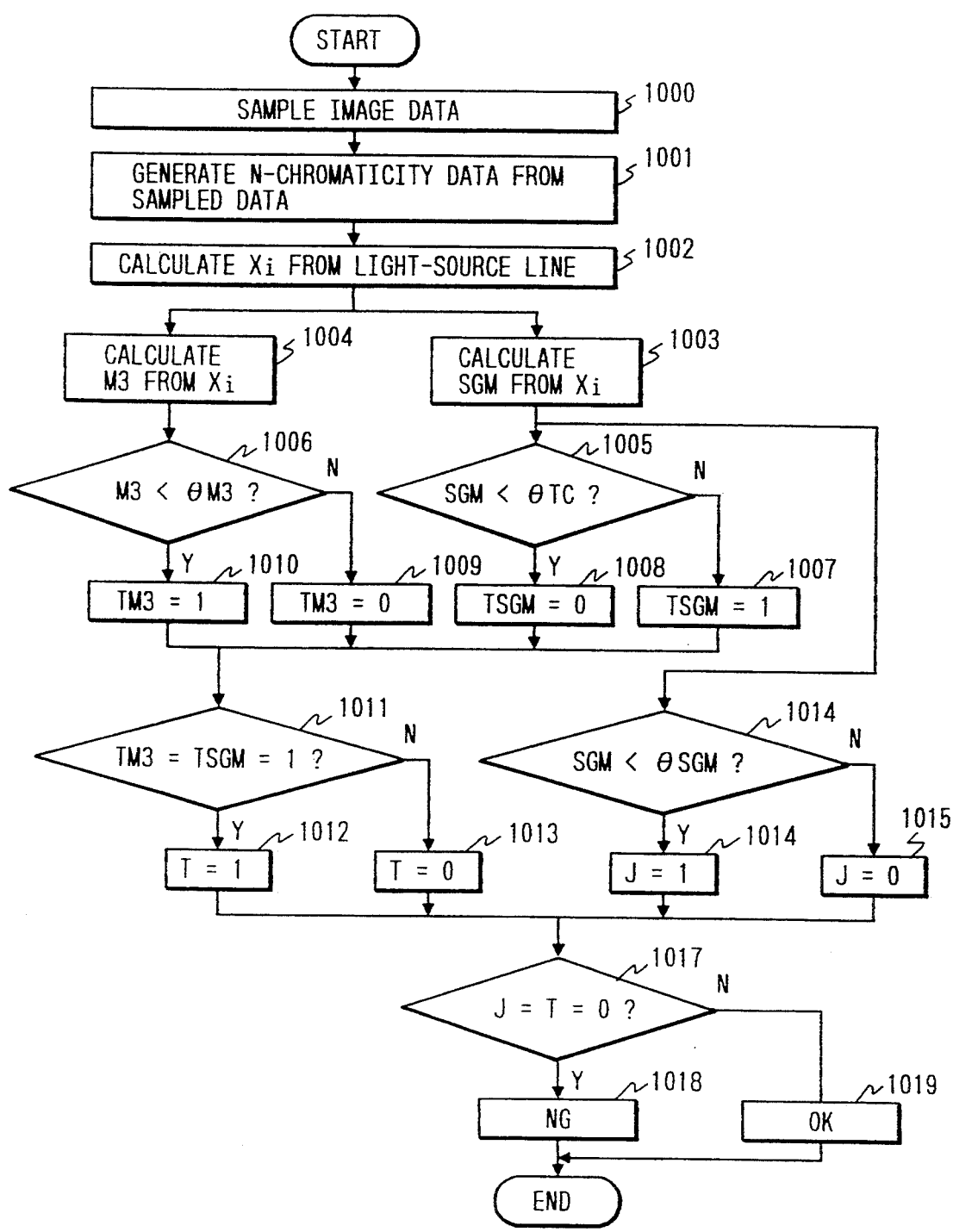
FIG. 11 is a flowchart of a program for illustrating an operation of the GWA judging device (namely, the seventh embodiment) of FIG. 6.

Next, an operation of the device having the above described configuration will be described hereinbelow by referring to FIG. 11.

First, the data IS represented by the image signal output from the CCD or the like is input to the sampling means 61 which converts the received image data at the predetermined suitable sampling-rule. The chromaticity calculating means 62 receives the data represented by the image signal (YYi, BYi, RYi) sampled by the sampling means 61 and converts this data into chromaticity data CSi=(C1i, C2i) represented by a chromaticity signal as follows:

C1i=BYi/YYi; and
C2i=RYi/YYi

The projection means 63 receives the data CSi represented by the chromaticity signal and projects the received data onto the line extending in the direction (V1, V2) perpendicular to the light-source line and converts the received data into the magnitude of the component, namely, the displacement Xi from the light-source line, which is obtained by:

$$Xi = C1i \cdot V1 + C2i \cdot V2$$

Then, the variance calculating means 64 calculates the image-signal variance SGM of the displacement Xi (i=1, . . . , N) obtained from the sampled data of the picture. The cubic moment calculating means 65 receives the displacement Xi from the projection means 63 and calculates the cubic moment M3. Further, the threshold-processing means 661 receives the image-signal variance SGM from the variance calculating means 64 and compares the received variance with the image variance threshold value $\theta$ TC and outputs a color-chart variance judgement signal indicating color-chart variance judgement data $T_{SGM}$ as follows.

If SGM is less than $\theta$ TC, $T_{SGM}=0$ (indicating that the input picture is not a color chart); and Otherwise, $T_{SGM}=1$ (indicating the possibility of a color chart).

The threshold-processing means 662 receives the cubic moment M3 from the cubic moment calculating means 65 and compares the received moment with a cubic-moment threshold value $\theta$ M3 and outputs a color-chart cubic-moment judgement signal indicating color-chart cubic-moment judgement data $T_{M3}$ as follows.

If M3 is less than $\theta$ M3, $T_{M3}=1$ (indicating the possibility of a color chart); and Otherwise, $T_{SGM}=1$ (indicating that the input picture is not a color chart). Furthermore, the AND circuit 67 receives the signals $T_{SGM}$ and $T_{M3}$ from the means 661 and 662, respectively, and carries out the logical AND therebetween and outputs a color-chart judgement signal T representing the color-chart judgement as follows:

T=1 (indicating that the input picture is a color chart); and

T=0 (indicating that the input picture is not a color chart).

The threshold-processing means 663 receives the variance SGM from the variance calculating means 64 and compares the received variance SGM with the threshold value $\theta_{SGM}$ stored therein. Further, the means 668 outputs a GWA judgement signal indicating GWA judgement data J given by:

If SGM is less than $\theta_{SGM}$, J=1 (indicating that an assumption for AWB, namely, GWA holds good (OK)); and Otherwise, J=0 (indicating that GWA does not hold true).

The OR circuit 68 receives the GWA judgement signal indicating the data J and the color-chart judgement signal T from the means 663 and the AND circuit 67, respectively, and performs the logical OR between these signals and outputs the following light-source deduction control signal representing light-source deduction control data C:

C=1 (indicating that the light-source deduction (namely, the result of a deducing of a light source) is good (OK)): and C=0 (indicating that the light-source deduction is not good (NG)).

Thus an image judgement device incorporating a color-chart judgement device according to the present invention is realized.

8. Eighth Embodiment

Hereinafter, the eighth embodiment of the present invention will be described by referring to the drawings.

Figure 12:
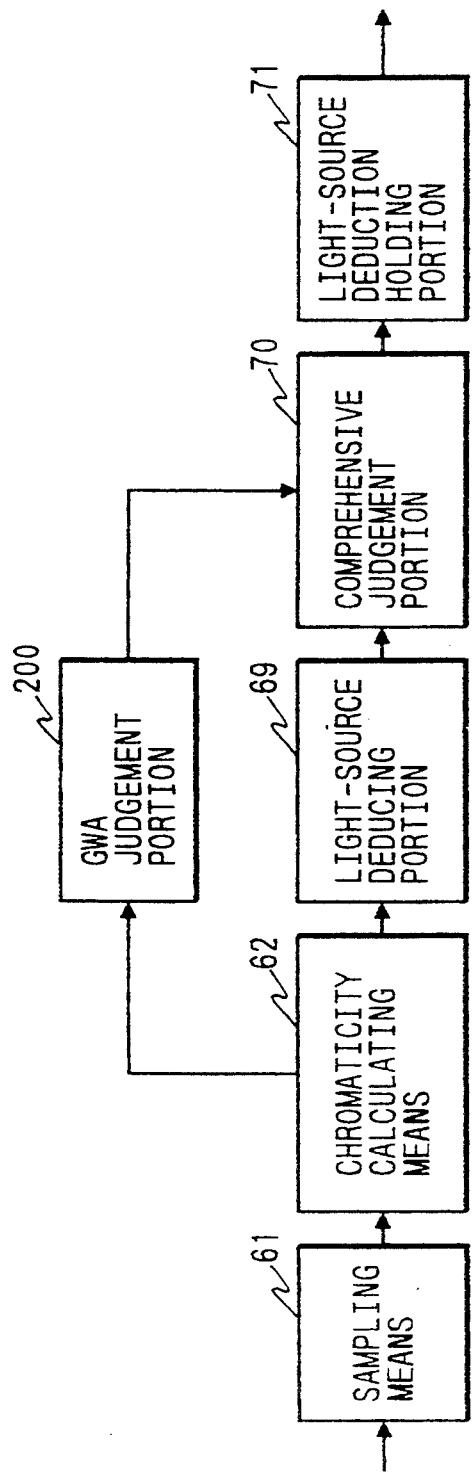
FIG. 12 is a schematic block diagram for illustrating the configuration of a light-source deducing device according to the present invention (hereunder sometimes referred to as an eighth embodiment of the present invention)

FIG. 12 is a schematic block diagram for illustrating the configuration of the eighth embodiment (namely, a light-source deducing device) of the present invention. In this figure, reference numeral 200 designates a GWA judgement portion similar to that of the sixth embodiment; 69 a light-source deducing portion for deducing a light source from the image data sampled by the sampling portion 61; 70 a comprehensive judgement portion for receiving a light-source deduction control signal and a signal indicating the result of the deducing of a light source from the GWA judgement portion 200 and the light-source deducing portion 69, respectively, and for making a comprehensive judgement; and 71 deduction holding portion for receiving the result of the comprehensive judgement from the comprehensive judgement portion 70 and outputting a signal indicating the result of the deducing of the light source, which is held therein in case that the received result of the comprehensive judgement indicates that the judgement is impossible.

Figure 13:
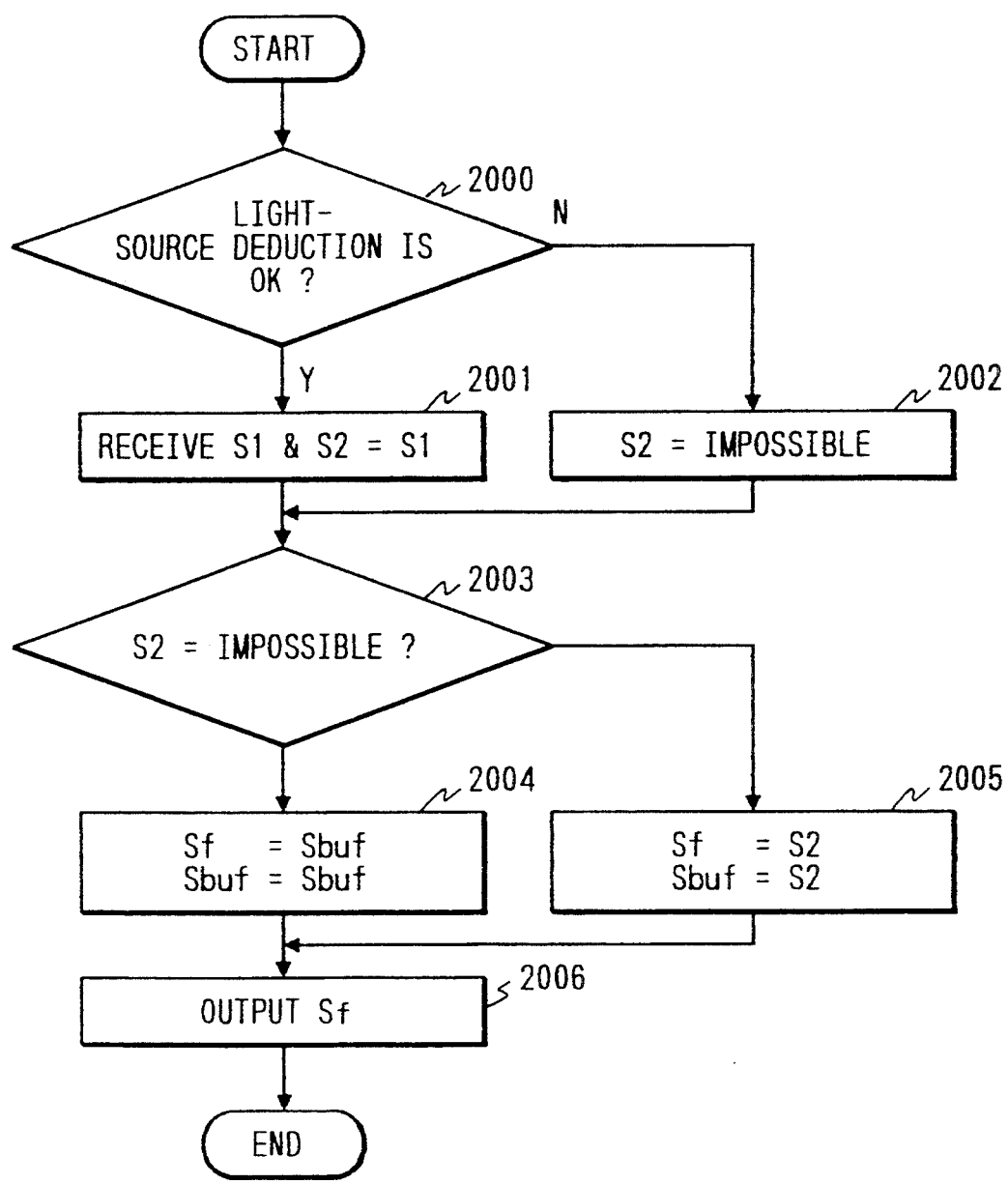
FIG. 13 is a flowchart of a program for illustrating an operation of the light-source deducing device (namely, the eighth embodiment) of FIG. 12.
Figure 14:
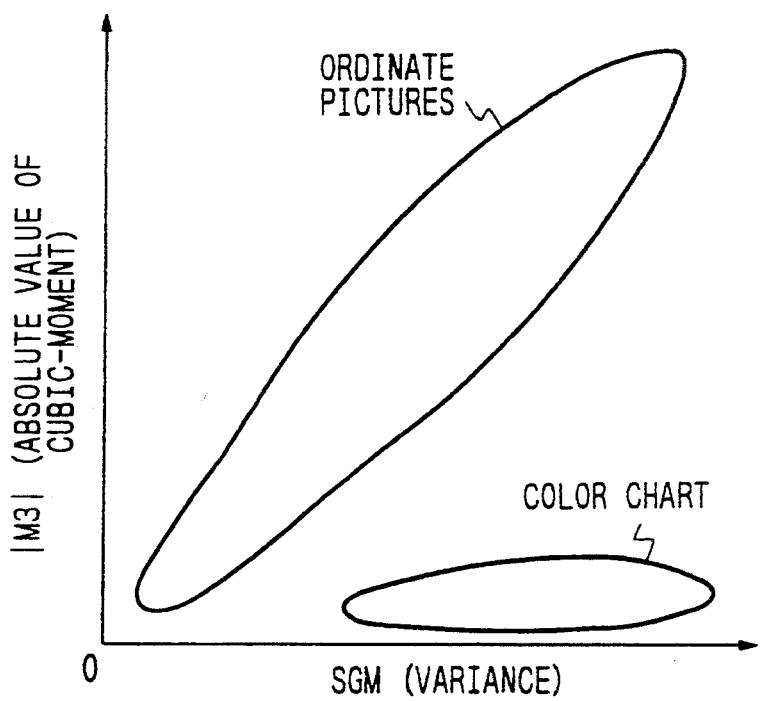
FIG. 14 is a graph for illustrating the relation between the variance and the cubic-moment of each of a color chart and an ordinary picture in order to explain the principle of the present invention.
Figure 16:
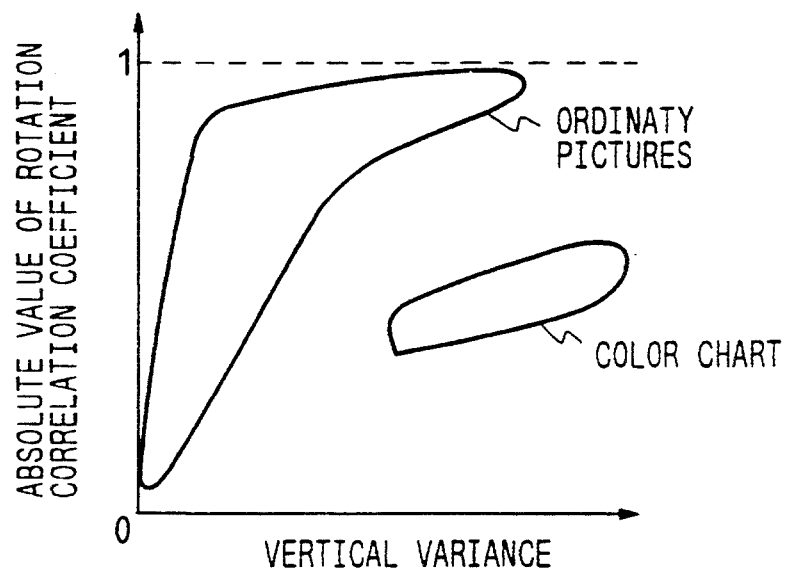
FIG. 16 is a graph for illustrating the relation between the variance and a "rotary correlation coefficient" (to be described later) of each of a color chart and an ordinary picture in order to explain the principle of the present invention.

Next, an operation of the device having the above described configuration will be described hereinbelow by referring to FIG. 13.

The comprehensive judgement portion 70 receives the first-order (light-source) deduction data S1 indicating the result of the deducing of a light source and the light-source deduction control data C from the portion 69 and the GWA judgement portion 200, respectively, and outputs the following second-order (light-source) deduction data S2:

If C=1 (corresponding to OK), S2=S1; and

If C=0 (corresponding to NG), S2=IMPOSSIBLE (indicating that the judgement is impossible).

The deduction holding portion 71 receives the second-order deduction data S2 from the portion 70 and holds or stores the second-order deduction data as preset data Sbuf and outputs final deduction data Sf as defined follows;

If S2$\neq$IMPOSSIBLE, Sf=S2; and Sbuf=S2; and

If S2=IMPOSSIBLE, Sf=Sbuf; and Sbuf=Sbuf.

Finally, an initial processing at the time of starting an operation of the device will be described hereinbelow.

Namely, if a signal output from the GWA judgement portion indicates C=0 (corresponding to NG) at time of starting an operation of the device (namely, at the time of activating the device), an initial processing should be performed. For instance, a first example of such a processing is to set the data C as 1 (namely, C=1 (corresponding to OK) until the variance SGM becomes less than the threshold value $\theta$ at least once since the operation is started. Alternatively, a second example of such a processing is to set a standard default value in the data Sbuf held in the portion 71. This standard default value may depend on the data S1. Alternatively, the final deduction data Sbuf obtained as the result of the last or latest operation may be held in the portion 71 by employing, for instance, a static random-access-memory (SRAM) as the portion 71.

As stated above, in case of this embodiment, it is judged from the variance whether or not GWA holds good. Thereby, the result of the deducing of the light source, which is obtained in case that GWA does not hold (in such a case, an error in deducing a light source is liable to occur), is discarded. Consequently, a light-source deducing device, in which such an error scarcely occurs, can be realized.

Incidentally, the vector (V1, V2) indicating the direction perpendicular to the light-source line may be approximately equivalent to (1, 1). Further, this vector (V1, V2) does not need determining strictly. The precision of the AWB-assumption-judgement changes to some extent according to the axis parameters. However, practical data analysis reveals that the influence of change in precision is not large.

Further, the basis of the calculation of the vertical image-data variance SGM does not depend on what signals (for instance, a RGB signal, Y, R−Y and B−Y signals) indicate image data.

Furthermore, in this embodiment, the vertical variance is calculated after image data is converted to chromaticity data in two-dimensional chromaticity space. However, the variance can be computed by directly using three-dimensional image data by, for example, employing a light-source surface instead of the light-source line.

Additionally, in such a case, an algorithm may be tuned in such a manner to eliminate the effects of specific colors (for example, the color of the sky which has a large effect upon the deduction of the light source). In this case, the variance in the direction along the light-source line comes to has practical significance. Thus it is not necessary to restrict the statistic used for GWA judgement to the vertical variance. Note that the present invention is not limited to this embodiment. Especially, various suitable conditions may be employed as conditions for the judgement.

Hereinafter, the ninth to eleventh embodiments of the present invention will be described with reference to the drawings.

First, the principle of the present invention applied to these embodiments will be briefly described hereinbelow.

As described above, the conventional AWB premises that GWA holds good. However, in case where a large part of a picture to be processed has a specific color of high chroma or saturation (e.g., a close-up shot of a person wearing red clothes), the average color of the entire picture becomes close to the specific color and thus is not achromatic. Thus, GWA does not hold true for any picture to be processed. Therefore, it is necessary for realizing AWB, by which excellent color reproduction is achieved, to judge whether or not GWA holds good for each picture to be processed and to exclude a picture, for which GWA does not hold good, from objects of a deducing of a light source. The inventor of the instant invention has collected many examples of image data and classified the collected image data into a group of image data respectively representing pictures, for which GWA does not hold true (thus, it is liable to make an error in deducing a light source), and another group of image data respectively representing pictures, for which GWA holds true (thus, it is possible to deduce a light source correctly). As the result of analysis of the collected image data, it turns out that the image data of the former group (namely, the image data respectively representing pictures, for which GWA does not hold true) has a large vertical variance of chromaticity data in comparison with the image data of the latter group. In contrast, regarding a horizontal variance of chromaticity data, such a tendency is not found. Therefore, it is concluded that the vertical variance is a parameter effective in judging whether or not GWA holds good. Incidentally, as stated above, the vertical variance is defined herein as a statistic variance of data obtained by projecting chromaticity data onto a line or axis extending in the direction perpendicular to the light-source line. Similarly, the horizontal variance is defined herein as a statistic variance of data obtained by projecting chromaticity data onto a line or axis extending in the direction parallel to the light-source line.

Hence, when the vertical variance is large, it is supposed that GWA does not hold, and an operation of deducing a light source is stopped. Moreover, data obtained as indicating the result of a deducing of a light source at that time is held in the device. Thereby, a light-source deducing device, which can substantially reduce errors in deducing a light source, can be realized.

Such a light-source deducing device, however, has encountered a problem that an operation of deducing a light source is stopped when taking a color chart. As stated above, a color chart is often used in a test of articles of commerce. Thus, it is not desirable that an operation of deducing a light source is stopped In case of taking a color chart. Therefore, a device for discriminating a color chart from other ordinary pictures is demanded.

Meanwhile, an image or picture of a color chart is characterized in the following two respects:
(1) Colors of high chroma are frequent in the color distribution thereof.
(2) Colors of substantially the same chrome and frequency are distributed all over the hues.

As to the feature (1), a large vertical variance is an effective index.

Further, as to the feature (2), a circular-like color distribution in the chromaticity plane is an effective index.

Therefore, if an image having a large vertical variance and a circular color-distribution is detected, it can be judged that the detected image is of a color chart. Consequently, a color-chart discriminating device can be realized.

The inventor of the present invention employs a parameter R, which Is defined hereinbelow, as a parameter to be used for detecting a two-dimensional distribution of data, the shape of which is similar to a circle, in the chromaticity plane. Namely, $$R = C(X, Y)$$

where $C(X, Y)$ is a correlation coefficient between two-dimensional data $(Xi, Yi)$.

Incidentally, $(XI, Yi)$ are generated from two-dimensional data $(xi, yi)$ as follows:

$$"Xi = A_{11}xi + A_{12}yi"$$

$$"Yi = A_{21}xi + A_{22}yi"$$

where $A_{11}, A_{12}, A_{21}$ and $A_{22}$ are elements of a $2 \times 2$-matrix $\underline{A}$ for rotating a coordinate axis in such a manner that what is called an "axis of distribution" becomes oriented 45 degrees away from a horizontal axis of the chromaticity plane. Namely, $$"A_{11} = A_{22} = (1+a)/[2(1+a^2)]^{\frac{1}{2}}"$$

$$"-A_{12} = A_{21} = (1-a)/[[2(1+a^2)]^{\frac{1}{2}}"$$

where $\underline{a}$ designates a gradient or slope of the axis of distribution. The axis of distribution, which is sometimes referred to as a distribution axis in the instant application, is defined as a line, which gives a minimum sum of the squares of the distance from each of points of the two-dimensional data thereto. Further, the gradient $\underline{a}$ thereof is given by:

$$Cov(x, y)a^2 + (V(x) - V(y))a - Cov(x, y) = 0$$

$$2Cov(x, y) + V(x) - V(y) > 0$$

where $Cov(x, y)$ denotes a covariance of the two-dimensional data $(xi, yi)$; $V(x)$ a variance of one-dimensional data $xi$; and $V(y)$ a variance of one-dimensional data $yi$.

The parameter R defined hereinabove will be referred to as a rotation correlation coefficient. Incidentally, note that the axis of distribution defined above is the same as what is called a principal-component-axis.

To calculate the rotation correlation coefficient, the axis of distribution defined above is first extracted or obtained. The axis of distribution indicates in what direction the given two-dimensional data are distributed long and narrowly. Next, the coordinate axis is rotated in such a fashion that the distribution axis is oriented 45 degrees of the horizontal axis (namely, the gradient of the distribution axis is 1). Thereafter, a correlation coefficient between the two-dimensional data is newly calculated in the new coordinate system obtained as the result of the rotation of the coordinate axis. Thus the rotation correlation coefficient is obtained.

The smaller the absolute value of the rotation correlation coefficient becomes, the more the shape of the distribution of the two-dimensional data resembles a circle.

Hereinafter, it will be described why the rotation correlation coefficient represents the degree of flatness.

Correlation coefficient between chromaticities BY and RY represents the degree of the correlation therebetween but does not always represent (or reflect) the degree of flatness. For example, if the chromaticity data are distributed along BY-axis, the degree of flatness is large but the correlation between the data BY and RY is low. Thus the correlation coefficient becomes small. Consequently, the correlation coefficient is not effective as a parameter representing the degree of flatness.

This is due to the fact that a chromaticity coordinate is not a coordinate value consisting of two quantities but is data corresponding a color, which is a two-dimensional quantity intrinsically. Originally, there is no correlation between the data BY and RY. Therefore, a statistic representing a shape of the distribution of two-dimensional data is demanded.

If the distribution axis is well defined, it is possible to "extract" only the shape of the distribution of two-dimensional data. In case of employing the correlation coefficient, the extent of the correlation between the data depends on the direction, in which the distribution axis extends, even if the shape of the distribution is unchanged. Thus, it is difficult to compare only the shapes of the distributions. Incidentally, if the axes of the distributions are made to be in the same direction, the shape of the distribution can be evaluated by using a correlation coefficient.

Therefore, the degree of flatness can be evaluated by first "extracting" the distribution axis, second making the distribution axis incline 45 degrees away from the horizontal axis (incidentally, in such a direction, the correlation between the data BY and RY comes to have the maximum value), and third calculating the correlation coefficient between the data newly. Thus the degree of flatness of the distribution can be evaluated. This is the reason why the rotation correlation coefficient represents the degree of flatness.

Figure 17:
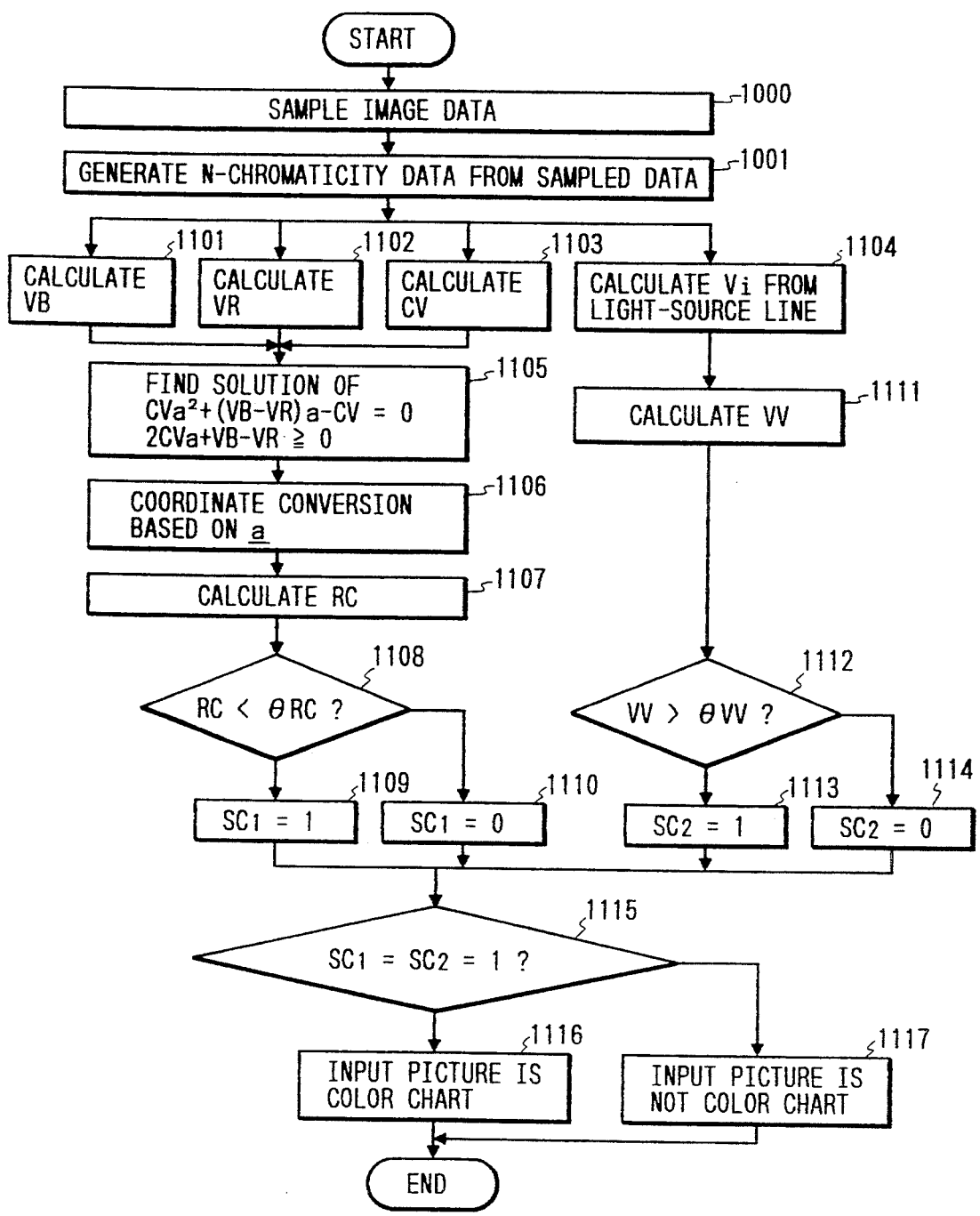
FIG. 17 is a flowchart of a program for illustrating an operation of the color-chart discriminating device (namely, the ninth embodiment) of FIG. 15.

The inventor of the present invention has studied the rotation correlation coefficient of many pictures, each of which has a large vertical variance. According to the result of the study done by the inventor of the instant invention, the absolute value of the rotation correlation coefficient of a picture of a color chart is extremely small in comparison with that of the rotation correlation coefficient of a picture of an ordinary scene. Accordingly, the picture of a color chart can be discriminated from ordinary pictures with extremely high precision by taking both of the vertical variance and the rotation correlation coefficient of the chromaticity data into consideration. Additionally, as illustrated in FIG. 17, there is a large difference in range of the rotation correlation coefficient between the picture of a color chart and that of an ordinary or common scene. Thus a threshold value of the rotation correlation coefficient for discriminating a color chart from ordinary pictures can be set very easily.

Incidentally, a similar processing can be performed by using the rotation correlation coefficient itself in place of the absolute value thereof. However, in case that the absolute value thereof is used, the processing can be effected easier than the case of using the rotation correlation coefficient itself. Hereunder, the absolute value of the rotation correlation coefficient will be referred to simply as the rotation correlation coefficient, for brevity of description. In addition, a color chart can be discriminated by using a mere correlation coefficient between the chromaticity coordinates BY and RY, instead of the rotation correlation coefficient. However, according to the analysis made by the inventor of the present invention, the discrimination precision in such a case is lower than in case of using the rotation correlation coefficient.

Further, the gradient of the distribution axis can be approximately determined by employing the following simple equation instead of the previously described strict equation. Namely, $$a = V(y)/V(x) \times (\text{an appropriate sign})$$

The principle of the present invention to be applied to the ninth to eleventh embodiments has been described hereinabove.

9. Ninth Embodiment

Next, the ninth embodiment of the present invention will be described by referring to the drawings.

Figure 15:
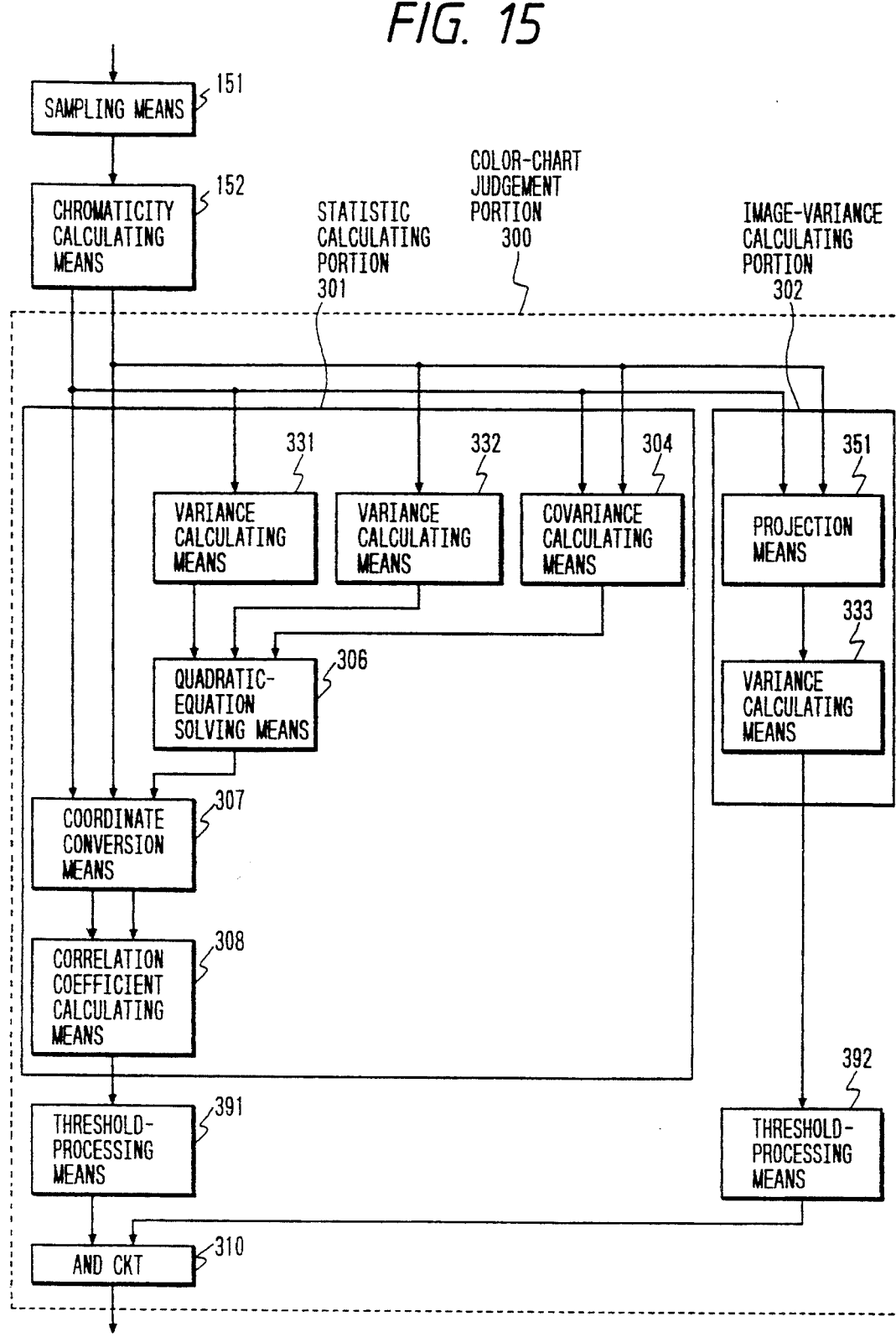
FIG. 15 is a schematic block diagram for illustrating the configuration of a color-chart discriminating device according to the present invention (hereunder sometimes referred to as a ninth embodiment of the present invention)

FIG. 15 is a schematic block diagram for illustrating the configuration of the ninth embodiment (namely, a color chart judgement device) of the present invention. In this figure, reference numeral 151 designates sampling means for sampling an image signal IS, which is received from a CCD or the like, according to a predetermined suitable sampling rule; 152 chromaticity calculating means for converting the image signal sampled by the means 151 into two chromaticity signals; 331 variance calculating means for calculating the variance of one of the chromaticity signals; 332 variance calculating means for calculating the variance of the other of the chromaticity signals; 304 covariance calculating means for calculating the covariance of the chromaticity signals: 351 projection means for projecting the chromaticity represented by the chromaticity signal onto a line extending in the direction perpendicular to the light-source line, and converting the chromaticity represented by the chromaticity signal into the magnitude of a component in the direction, namely, the vertical displacement from the light-source line; 333 variance calculating means for receiving the vertical displacement and calculating the variance of the vertical displacement; 306 quadratic-equation solving means for receiving outputs of the means 331, 332 and 304 and solving a quadratic equation having coefficients represented by the received outputs and outputting a solution of the quadratic equation; 307 coordinate conversion means for converting the chromaticity coordinate calculated by means 152 according to the output of the means 306; 308 correlation-coefficient calculating means for calculating a correlation coefficient from the means 307; 391 and 392 threshold-processing means for comparing the image-signal variance with a threshold stored therein and outputting a judgement signal representing a result of the comparison; 310 an ordinary AND circuit; 300 a color-chart judgement portion, which is a nucleus of the present invention; 301 a statistic calculating portion: and 302 an image-variance calculating portion.

Figure 9:
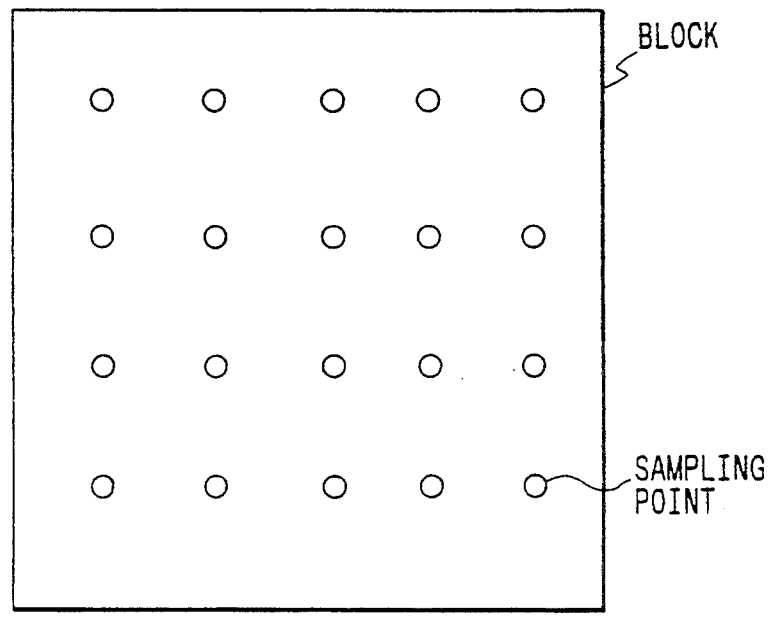

Next, an operation of the device having the above described configuration will be described hereinbelow by referring to FIG. 17. Incidentally, image data IS represented by an input image signal is assumed to be $(Y, R-Y, B-Y)$. Note that this does not mean that the present invention is limited only thereto, First, the data IS represented by image signals output from CCD elements or the like is input to and sampled according to a predetermined suitable rule by the sampling circuit 151. In case of this embodiment, an input picture is partitioned into $m \times n$ blocks as illustrated in FIG. 8 and subsequently a plurality of data points (incidentally, the number of data points is k (a positive integer)) are sampled from each block, as illustrated in FIG. 9, to calculate a block-average $<IS>i$ $(l=1, \ldots, N)$ of the sampled data as follows:

$$<IS>i = \Sigma (Yj, R-Yj, B-Yj)/k$$

Incidentally, N $(=m \times n)$ denotes the number of sampled data; k the number of data points sampled from each block. The chromaticity calculating means 182 receives the data $<IS>i=(YYi, BYi, RYi)$ sampled by the sampling means 151 and converts this data into chromaticity data $Ci=(BYi, RYi)$ represented by a chromaticity signal as follows:

BYI=BYYi/YYi; and
RYi=RYYi/YYi

The variance calculating means 331 calculates the variance VB of the chromaticity coordinates BYi $(i=1, 2, \ldots, N)$ obtained by:

$$VB = <(BYi - <BY>)^2>$$

Incidentally, $<X>$ designates the average of the variable x, namely, is equal to $\Sigma xi/N$. The variance calculating means 332 calculates the variance VR of the chromaticity coordinates RYi $(i=1, 2, \ldots, N)$ obtained by:

$$VR = <(RYi - <RY>)^2>$$

Further, the projection means 351 receives the data Ci represented by the chromaticity signal and projects the received data onto the line extending in the direction, which is indicated by a two-dimensional unit vector (V1, V2) and is perpendicular to the light-source line, and converts the received data into the magnitude of the component, namely, the displacement Xi from the light-source line, which is given by:

$$vi = V_1.BYi + V_2.RYi$$

The variance calculating means 333 receives the vertical displacement vi from the means 351 and calculates the image-signal variance VV obtained by:

$$VV = <(vi - <v>)^2>$$

The quadratic-equation solving means 306 receives the variance VB calculated by the means 331, the variance VR calculated by the means 332 and the covariance CV calculated by the means 304 and calculates the gradient of the distribution axis of the chromaticity signal Ci, namely, finds a solution, which satisfies the following inequality, of the following quadratic equation:

$$CV.a^2 + (VB-VR)a - CV = 0;\text{ and}$$

$$2CV.a + VB - VR \geq 0$$

Then, the coordinate conversion means 307 receives the gradient a obtained by the means 306 and the chromaticity signal indicating the data Ci calculated by the means 152 and performs the following coordinate conversion on the chromaticity signal indicating the data Ci=(BYi, RYi) to obtain converted chromaticity coordinates (BY'i, RY'i):

$$BY'i = A_{1i}.BYi + A_{12}.RYi$$

$$RY'i = A_{2i}.BYi + A_{22}.RYi$$

Further, the correlation coefficient calculating means 608 calculates the absolute value RC of the chromaticity coordinates BY'i and RY'i converted by the means 607 as follows:

$$RC = |Cov(BY'i, RY'i)/[V(BY')V(RY')]^{\frac{1}{2}}|$$

Incidentally, $$Cov(BY'i, RY'i) = <(BY'i - <BY'>)(RY'i - <RY'>)>$$

$$V(BY') = <(BY'i - <BY'>)^2>$$

$$V(RY') = <(RY'i - <RY'>)^2>$$

Note that RC represents the absolute value of the rotation correlation coefficient.

The threshold-processing means 391 compares the absolute value RC calculated by the means 308 with the threshold value $\theta_{RO}$ stored therein and outputs a color-chart correlation coefficient judgement signal indicating the following data $SC_1$:

If RC is less than $\theta_{RC}$, $SC_1 = 1$ (indicating that the input picture may be a color chart); and Otherwise, $SC_1 = 0$ (indicating that the input picture is not a color chart). Furthermore, the threshold-processing means 392 compares the variance VV calculated by the means 333 with the threshold value $\theta$ VV stored therein and outputs a color-chart variance judgement signal indicating the following data $SC_2$:

If VV is less than $\theta$ VV, $SC_2 = 1$ (indicating that the input picture may be a color chart); and Otherwise, $SC_2 = 0$ (indicating that the input picture is not a color chart).

Additionally, the AND circuit 310 performs the logical AND between the data $SC_1$ output from the means 391 and the data $SC_2$ output from the means 392 and outputs a color-chart judgement signal indicating the following data SC:

If SC=1, SC indicates that the input picture is a color chart; and

If SC=0, SC indicates that the input picture is not a color chart.

Thus it is judged from the image signal whether or not the input picture is a color chart.

Incidentally, the vector (V1, V2) indicating the direction perpendicular to the light-source line may be approximately equivalent to (1, 1). Further, this vector (V1, V2) does not need determining strictly. The precision of the color-chart judgement changes to some extent according to the axis parameters. However, practical data analysis reveals that the influence of change in precision is not large.

Further, the basis of the calculation of the variance VV does not depend on what signals (for instance, a RGB signal, Y, R−Y and B−Y signals) indicate image data.

Furthermore, In this embodiment, the variance VV is calculated after image data is converted to the two-dimensional chromaticity coordinates. However, the variance can be computed by directly using three-dimensional image data by, for example, employing a light-source surface instead of the light-source line.

Moreover, various judgement conditions other than the condition described above in the description of this embodiment may be employed. For instance, it is possible that the following data CV is calculated and then is compared with a threshold value and thereafter the color-chart judgement signal is output. Namely, $$CV = \alpha\, RC - \beta\, VV$$

where $\alpha$ and $\beta$ are appropriate coefficients.

As described above, the means 307 makes the distribution axis incline 45 degrees from the horizontal axis, This is because the processing is most effective in case of 45 degrees. Therefore, the angle formed between the distribution axis and the horizontal axis is not limited to 45 degrees. Further, the same effects can be obtained by employing other elements obtained by, for instance, omitting the common coefficient $1/[2(1+a^2)]^{\frac{1}{2}}$ from the respective elements of the matrix A,instead of the elements of the matrix A.

Additionally, in this embodiment, the correlation coefficient is computed after the coordinate conversion. However, the coordinate conversion is not always necessary because the correlation coefficient posterior to the coordinate conversion can be easily obtained from the elements of the 2×2 matrix, the two variances calculated prior to the coordinate conversion and the covariance calculated prior to the coordinate conversion. The calculation time or the number of times of calculation can be reduced by computing the correlation coefficient, which would be obtained posterior to the coordinate conversion, by using such variances and covariance without performing the coordinate conversion.

Incidentally, as described above, the rotation correlation coefficient itself can be used in place of the absolute value thereof. Further, a color chart can be discriminated by using a mere correlation coefficient between the chromaticity coordinates. These can be applied to the tenth and eleventh embodiments.

10. Tenth Embodiment

Next, the tenth embodiment of the present invention will be described by referring to the drawings.

Figure 18:
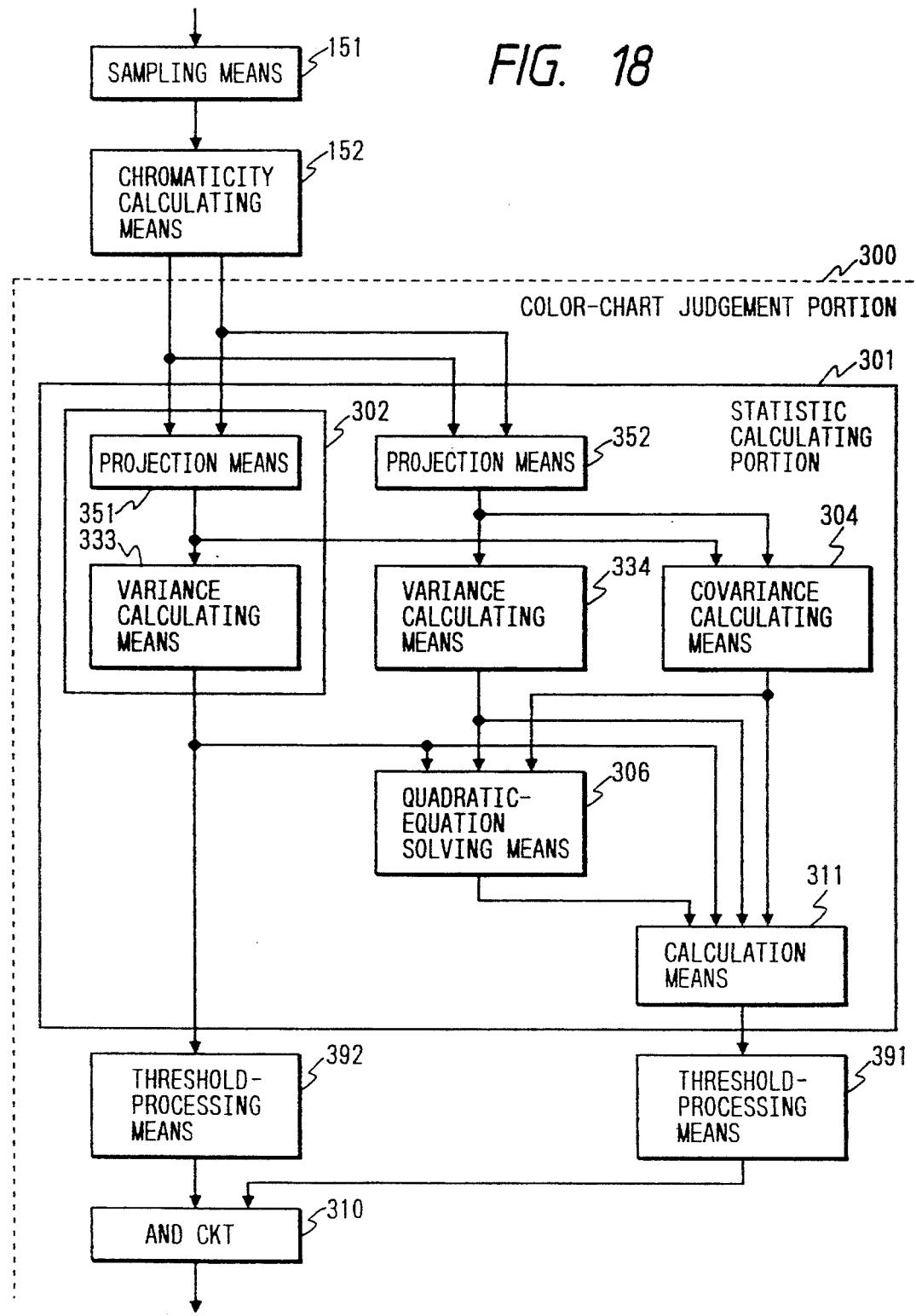
FIG. 18 is a schematic block diagram for illustrating the configuration of a color-chart discriminating device according to the present invention (hereunder sometimes referred to as a tenth embodiment of the present invention)

FIG. 18 is a schematic block diagram for illustrating the configuration of the tenth embodiment (namely, a color chart judgement device) of the present invention. In this figure, reference numeral 151 designates sampling means for sampling an image signal IS, which is received from a CCD or the like, according to a predetermined suitable sampling rule; 152 chromaticity calculating means for converting the image signal sampled by the means 151 into two chromaticity signals; 351 projection means for projecting the chromaticity represented by the chromaticity signal onto a line extending in the direction perpendicular to the light-source line, and converting the chromaticity represented by the chromaticity signal into the magnitude of a component in the direction, namely, the vertical displacement from the light-source line; 352 projection means for projecting the chromaticity represented by the chromaticity signal onto a line extending in the direction parallel to the light-source line, and converting the chromaticity represented by the chromaticity signal into the magnitude of a component in the direction, namely, the parallel displacement from the light-source line; 333 variance calculating means for receiving the vertical displacement and calculating the variance of the vertical displacements; 334 variance calculating means for receiving the parallel displacement and calculating the variance of the parallel displacements; 304 covariance calculating means for receiving the vertical and parallel displacements from the means 351 and 352, respectively, and calculating the covariance of the received displacements; 306 quadratic-equation solving means for receiving outputs of the means 333, 334 and 304 and solving a quadratic equation having coefficients represented by the received outputs and outputting a solution of the quadratic equation; 311 parameter operation means for receiving outputs of the means 311, 333, 334, 304 and 306 and calculating a suitable parameter from the received outputs and outputting the calculated parameter; 391 and 392 threshold-processing means for comparing data indicated by an input signal with a threshold stored therein and outputting a judgement signal representing a result of the comparison: 310 an ordinary AND circuit; 300 a color-chart judgement portion, which is a nucleus of the present invention; 301 a statistic calculating portion; and 302 an image-variance calculating portion.

Figure 19:
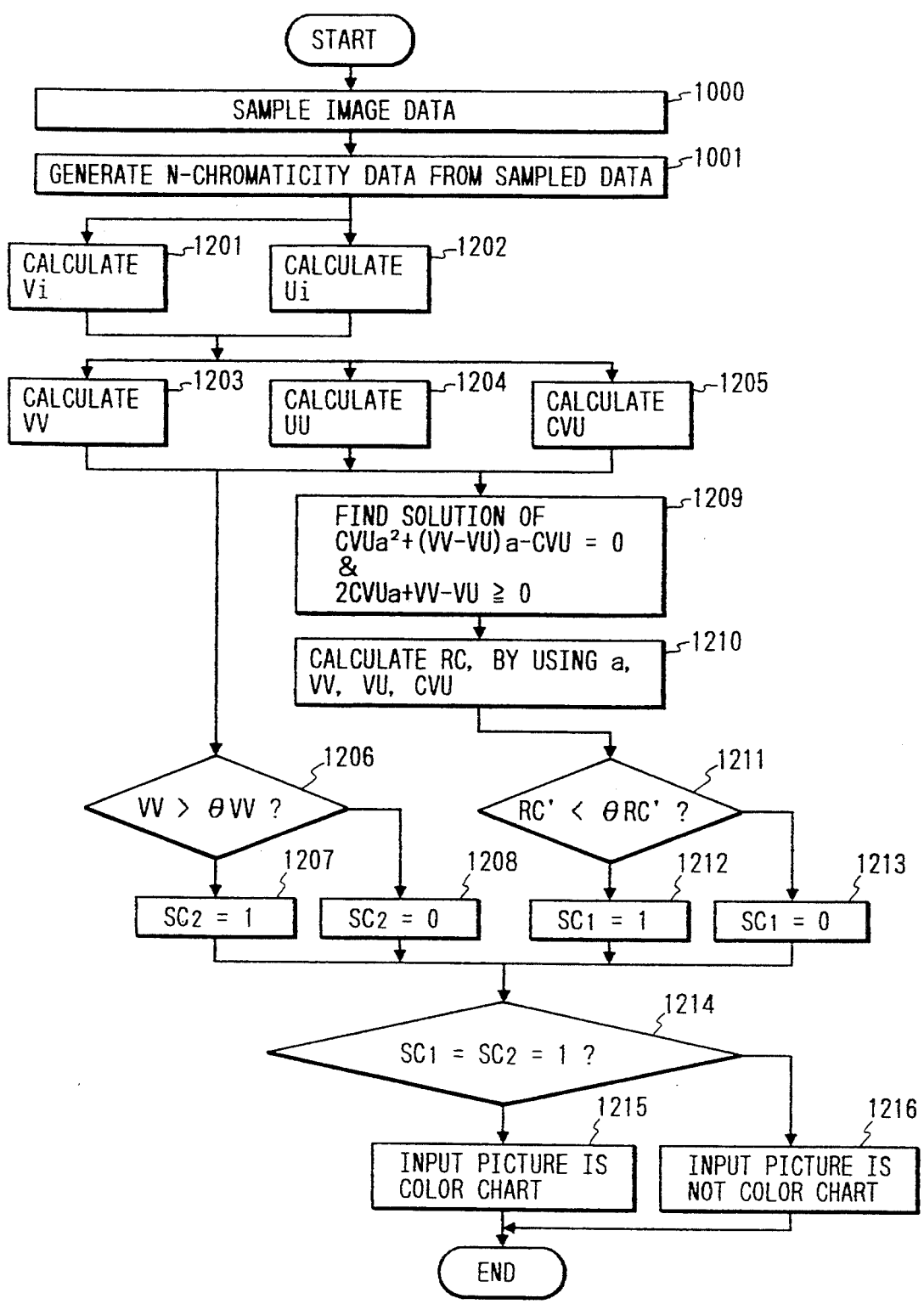
FIG. 19 is a flowchart of a program for illustrating an operation of the color-chart discriminating device (namely, the tenth embodiment) of FIG. 18.

Next, an operation of the device having the above described configuration will be described hereinbelow by referring to FIG. 19.

First, the data IS represented by image signals output from CCD elements or the like is input to and sampled according to a predetermined suitable rule by the sampling circuit 151. In case of this embodiment, an input picture is partitioned into m×n blocks as illustrated in FIG. 8 and subsequently a plurality of data points (incidentally, the number of data points is k (a positive integer)) are sampled from each block, as illustrated in FIG. 9, to calculate a block-average $<IS>_1$ (i=1, ..., N) of the sampled data as follows:

$$<IS>_i = \Sigma\, (Y_j,\ R-Y_j,\ B-Y_j)/k$$

Incidentally, $N = n \times m$; k denotes the number of data points sampled from each block. The chromaticity calculating means 152 receives the data $<IS>_i = (YY_i, BY_i, RY_i)$ sampled by the sampling means 151 and converts this data into chromaticity data $C_i = (BY_i, RY_i)$ represented by a chromaticity signal as follows:
$BY_i = BYY_i/YY_i$; and
$RY_i = RYY_i/YY_i$ Further, the projection means 351 receives the data $C_i$ represented by the chromaticity signal and projects the received data onto the line extending in the direction, which is indicated by a two-dimensional unit vector (V1, V2) and is perpendicular to the light-source line, and converts the received data into the magnitude of the component, namely, the displacement vi from the light-source line, which is given by:

$$vi = V_1.BYi + V_2.RYi$$

Furthermore, the projection means 352 receives the data Ci represented by the chromaticity signal and projects The received data onto the line extending in the direction, which is indicated by another two-dimensional unit vector (V2, −V1) and is parallel with the light-source line, and converts the received data into the magnitude of the component, namely, the displacement ui from the light-source line, which is given by:

$$ui = V_2.BYi - V_1.RYi$$

The variance calculating means 333 receives the vertical displacement vi from the means 351 and calculates the image-signal variance VV obtained by:

$$VV = \langle (vi - \langle v \rangle)^2 \rangle$$

On the other hand, the variance calculating means 334 receives the parallel displacement ui from the means 352 and calculates a parallel image-signal variance VU obtained by:

$$VU = \langle (ui - \langle u \rangle)^2 \rangle$$

The quadratic-equation solving means 306 receives the variance VV calculated by the means 333, the variance VU calculated by the means 334 and the covariance CVU calculated by the means 304 and calculates the gradient of the distribution axis of the chromaticity signal Ci with respect to the direction perpendicular to the light-source line, namely, finds a solution, which satisfies the following inequality, of the following quadratic equation:

$$CVU.a^2 + (VV - VU)a - CVU = 0; \text{ and}$$

$$2CVU.a + VV - VU \geq 0$$

Then, the parameter operation circuit 311 receives the gradient a obtained by the means 306, the variance VV calculated by the means 333, the variance VU calculated by the means 334 and the covariance CVU calculated by the means 304 and performs the following coordinate conversion on the displacement Xi=(vi, ui) by using the elements of the previously described matrix A to obtain converted displacement X'=(v'i, u'i):

$$v'i = A_{11}.vi + A_{12}.ui$$

$$u'i = A_{21}.vi + A_{22}.ui$$

Further, the absolute value RC' posterior to the coordinate conversion is calculated from the variances and the covariance prior to the coordinate conversion as follows:

$$RC' = |Cov(v', u')/[V(v')V(u')]^{\frac{1}{2}}|$$

Incidentally, $$Cov(v', u') = A_{11}A_{21}VV + (A_{11}A_{22} + A_{12}A_{21})CVU + A_{12}A_{22}VU$$

$$V(v') = A_{21}^2 VV + A_{11}A_{12}CVU + A_{12}^2 VU$$

$$V(u') = A_{21}^2 VV + A_{11}A_{12}CVU + A_{22}^2 VU$$

Note that RC' also equals to the correlation coefficient of the displacement $X_1 = (v'_i, u'_i)$, which would be obtained if the following coordinate conversion was performed on the displacement $X = (v_i, u_i)$:

$$v'_i = A_{11}.v_i + A_{12}.u_i$$

$$u'_i = A_{21}.v_i + A_{22}.u_i$$

Incidentally, $$A_{11} = A_{22} = (1+a)/[2(1+a^2)]^{\frac{1}{2}}$$

$$-A_{12} = A_{21} = (1-a)/[2(1+a^2)]^{\frac{1}{2}}$$

Note that RC' represents the absolute value of the rotation correlation coefficient.

The threshold-processing means 391 compares the absolute value RC' calculated by the means 311 with the threshold value $\theta_{RC'}$ stored therein and outputs a color-chart correlation coefficient judgement signal indicating the following data $SC_1$:

If RC is less than $\theta_{RC}$, $SC_1 = 1$ (indicating that the input picture may be a color chart); and Otherwise, $SC_1 = 0$ (indicating that the input picture is not a color chart). Furthermore, the threshold-processing means 392 compares the variance VV calculated by the means 388 with the threshold value $\theta$ VV stored therein and outputs a color-chart variance judgement signal indicating the following data $SC_2$:

If VV is larger than $\theta$ VV, $SC_2 = 1$ (indicating that the input picture may be a color chart); and Otherwise, $SC_2 = 0$ (indicating that the input picture is not a color chart).

Additionally, the AND circuit 310 performs the logical AND between the data $SC_2$ output from the means 391 and the data $SC_2$ output from the means 392 and outputs a color-chart judgement signal indicating the following data SC:

If SC=1, SC indicates that the input picture is a color chart; and

If SC=0, SC indicates that the input picture is not a color chart.

Thus it is judged from the image signal, whether or not the input picture is a color chart.

In case of the ninth embodiment, the calculation of the variance should be performed three times. In contrast, in case of the tenth embodiment, the image variance is calculated only two times by changing the coordinate axes for representing the chromaticity data or coordinates to the axis perpendicular to the light-source line and that parallel to the light-source line. Thus the time or number of times for calculation can be reduced. Moreover, the configuration of the device can be simplified In comparison with the ninth embodiment. Furthermore, in case of the tenth embodiment, the number of times of calculation is decreased by using the relation between the variance and covariance prior to the first-order conversion and those posterior to the first-order conversion, which holds good in general, instead of performing a coordinate conversion. However, the tenth embodiment can be modified in such a manner that instead of utilizing such a relation, the coordinate conversion may be performed similarly as in case of the eighth embodiment.

11. Eleventh Embodiment

Next, the eleventh embodiment of the present invention will be described by referring to the drawings.

Figure 20:
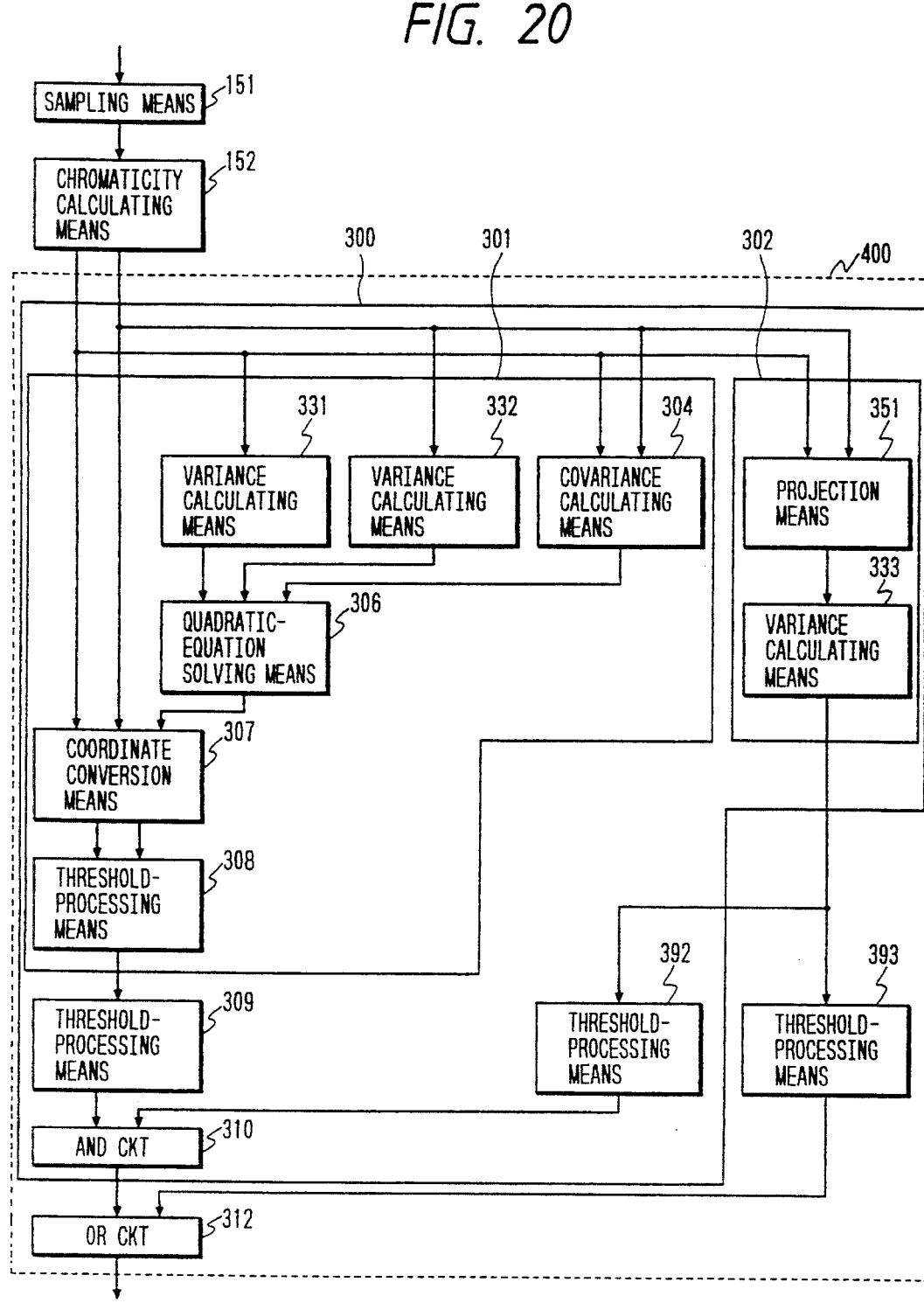
FIG. 20 is a schematic block diagram for illustrating the configuration of a color-chart discriminating device according to the present invention (hereunder sometimes referred to as an eleventh embodiment of the present invention)

FIG. 20 is a schematic block diagram for illustrating the configuration of the eleventh embodiment (namely, a GWA judgement device incorporating a color chart judgement portion) of the present invention. In this figure, reference numeral 151 designates sampling means for sampling an image signal IS, which is received from a CCD or the like, according to a predetermined suitable sampling rule; 152 chromaticity calculating means for converting the image signal sampled by the means 151 into two chromaticity signals; 331 variance calculating means for calculating the variance of one of the chromaticity signals; 332 variance calculating means for calculating the variance of the other of the chromaticity signals; 304 covariance calculating means for calculating the covariance of the chromaticity signals; 351 projection means for projecting the chromaticity represented by the chromaticity signal onto a line extending in the direction perpendicular to the light-source line, and converting the chromaticity represented by the chromaticity signal into the magnitude of a component in the direction, namely, the vertical displacement from the light-source line; 333 variance calculating means for receiving the vertical displacement and calculating the variance of the vertical displacement; 306 quadratic-equation solving means for receiving outputs of the means 331, 332 and 304 and solving a quadratic equation having coefficients represented by the received outputs and outputting a solution of the quadratic equation; 307 coordinate conversion means for converting the chromaticity coordinate calculated by means 152 according to the output of the means 306; 308 correlation-coefficient calculating means for calculating a correlation coefficient from the means 307; 391, 392 and 393 threshold-processing means for comparing the image-signal variance with a threshold stored therein and outputting a judgement signal representing a result of the comparison; 310 an ordinary AND circuit; 312 an ordinary OR circuit; 300 a color-chart judgement portion, which is a nucleus of the present invention: 301 a statistic calculating portion; 302 an image-variance calculating portion; and 400 a GWA judgement portion.

Figure 21:
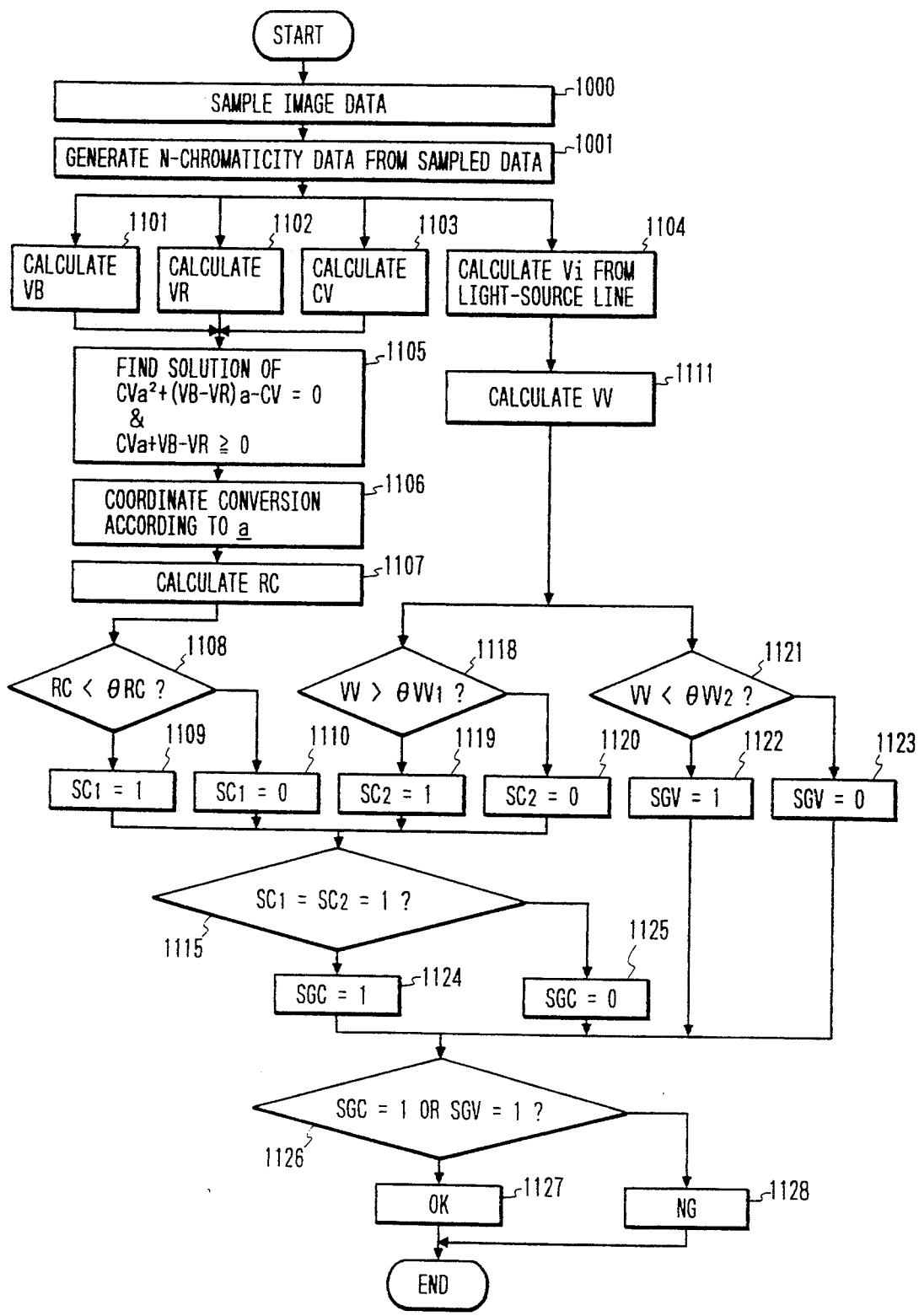
FIG. 21 is a flowchart of a program for illustrating an operation of the color-chart discriminating device (namely, the eleventh embodiment) of FIG. 20.

Next, an operation of the device having the above described configuration will be described hereinbelow by referring to FIG. 21.

First, the data IS represented by image signals output from CCD elements or the like is input to and sampled according to a predetermined suitable rule by the sampling circuit 151. In case of this embodiment, an input picture is partitioned into n×m blocks as illustrated in FIG. 8 and subsequently a plurality of data points (incidentally, the number of data points is k (a positive integer)) are sampled from each block, as illustrated in FIG. 9, to calculate a block-average $<IS>i$ ($i=1, \ldots, N$) of the sampled data as follows:

$$<IS>i=\Sigma (Y_j, R-Y_j, B-Y_j)/k$$

Incidentally, N (=n×m) denotes the number of sampled data; k the number of data points sampled from each block. The chromaticity calculating means 152 receives the data $<IS>i-(YY_i, BY_i, RY_i)$ sampled by the sampling means 151 and converts this data into chromaticity data $C_i=(BY_i, RY_i)$ represented by a chromaticity signal as follows:

$BY_i=BYY_i/YY_i$; and $RY_i=RYY_i/YY_i$

The variance calculating means 331 calculates the variance VB of the chromaticity coordinates $BY_i$ ($i=1,2,\ldots,N$) obtained by:

$$VB=<(BY_i-<BY>)^2>$$

Incidentally, $<X>$ designates the average of the variable x, namely, is equal to $\Sigma x_i/N$. The variance calculating means 332 calculates the variance VR of the chromaticity coordinates $RY_i$ ($i=1, 2, \ldots, N$) obtained by:

$$VR=<(RY_i-<RY>)^2>$$

Then, the covariance calculating circuit 304 calculates the following covariance CV of the chromaticity coordinates $BY_i$ and $RY_i$ ($i=1, 2, \ldots N$) from the data $C_i=(BY_i, RY_i)$ represented by the chromaticity signals, which are obtained from the sampled data of the input picture:

$$CV=<(BY_i-<BY>)(RY_i-<RY>)>$$

Furthermore, the projection circuit 351 receives the data $C_i$ represented by the chromaticity signals and projects the received data onto the line extending in the direction, which is indicated by a two-dimensional unit vector (V1, V2) and is perpendicular to the light-source line, and converts the received data into the magnitude of the component, namely, the displacement vi from the light-source line, which is given by:

$$vi=V_i.BY_i+V_2.RY_i$$

The variance calculating circuit 333 receives the vertical displacement vi from the circuit 351 and calculates the image-signal variance VV obtained by:

$$VV=<(vi-<v>)^2>$$

The quadratic-equation solving circuit 306 receives the variance VB calculated by the circuit 331, the variance VR calculated by the circuit 332 and the covariance CV calculated by the circuit 304 and calculates the gradient of the distribution axis of the chromaticity signal Ci, namely, finds a solution, which satisfies the following inequality, of the following quadratic equation:

$$CV.a^2+(VB-VR)a-CV=0; \text{ and}$$

$$2CV.a+VB-VR \geq 0$$

Then, the coordinate conversion circuit 307 receives the gradient a obtained by the circuit 306 and the chromaticity signals indicating the data Ci calculated by the circuit 152 and performs the following coordinate conversion on the chromaticity signals indicating the data $C_i=(BY_i, RY_i)$ to obtain converted chromaticity coordinates $(BY'i, RY'i)$, by using the elements of the matrix A:

$$BY'i=A_{11}.BY_i+A_{12}.RY_i$$

$$RY'i=A_{2i}.BY_i+A_{22}.RY_i$$

Incidentally, $$A_{11}=A_{22}=(1+a)/[2(1+a^2)]^{\frac{1}{2}}$$

$$-A_{12}=A_{21}=(1-a)/[2(1+a^2)]^{\frac{1}{2}}$$

Further, the correlation coefficient calculating circuit 308 calculates the absolute value RC of the chromaticity coordinates BY'i and RY'i converted by the circuit 307 as follows:

$$RC=|Cov(BYi, RYi)/[V(BY')V(RY')]^{\frac{1}{2}}|$$

Incidentally, $$Cov(BYi, RYi)=<(BYi-<BY>)(RYi-<RY>)>$$

$$V(BY')=<(BYi-<BY>)^2>$$

$$V(RY')=<(RYi-<RY>)^2>$$

Note that RC represents the absolute value of the rotation correlation coefficient.

The threshold-processing circuit 391 compares the absolute value RC calculated by the circuit 308 with the threshold value $\theta_{RO}$ stored therein and outputs a color-chart correlation coefficient judgement signal indicating the following data $SC_1$:

If RC is less than $\theta_{RC}$, $SC_1=1$ (indicating that the input picture may be that of a color chart); and Otherwise, $SC_1=0$ (indicating that the input picture is not that of a color chart). Furthermore, the threshold-processing circuit 392 compares the variance VV calculated by the circuit 333 with the threshold value $\theta VV_1$ stored therein and outputs a color-chart variance judgement signal indicating the following data $SC_2$:

If VV is larger than $\theta VV_1$, $SC_2=1$ (indicating that the input picture may be a color chart); and Otherwise, $SC_2=0$ (indicating that the input picture is not that of a color chart).

Additionally, the AND circuit 310 performs the logical AND between the data $SC_1$ output from the circuit 391 and the data $SC_2$ output from the circuit 392 and outputs a color-chart judgement signal indicating the following data SGC:

If SGC=1, SGC indicates that the input picture is that of a color chart; and

If SGC=0, SGC indicates that the input picture is not that of a color chart.

Then, the threshold-processing circuit 393 compares the variance VV calculated by the circuit 333 with the threshold value $\theta VV_2$ stored therein and outputs a GWA variance judgement signal indicating the following data $SC_2$:

If VV is less than $\theta VV_2$, SGV=1 (indicating that GWA holds good); and

Otherwise, SGV=0 (indicating that GWA may not hold good).

Additionally, the OR circuit 312 performs the logical OR between the data SGC indicated by the signal output from the AND circuit 310 and the data SGV output from the circuit 393 and outputs a GWA judgement signal indicating the following data SG:

If SG=1, SG indicates that GWA holds good; and

If SG=0, SG indicates that GWA does not hold good.

Thus the GWA judgement device incorporating the color-chart discriminating portion is realized.

Incidentally, the color-chart judgement circuit of this embodiment may be replaced with that of the ninth embodiment. Additionally, the axis, which is set for calculating the image variance used to determine the color-chart variance judgement signal, may be different from the axis set for calculating the image variance used to determine the GWA variance judgement signal, may be different from each other.

Next, the twelfth to eighteenth embodiments of the present invention will be described hereinbelow by referring to the drawings.

12. Twelfth Embodiment

Figure 22:
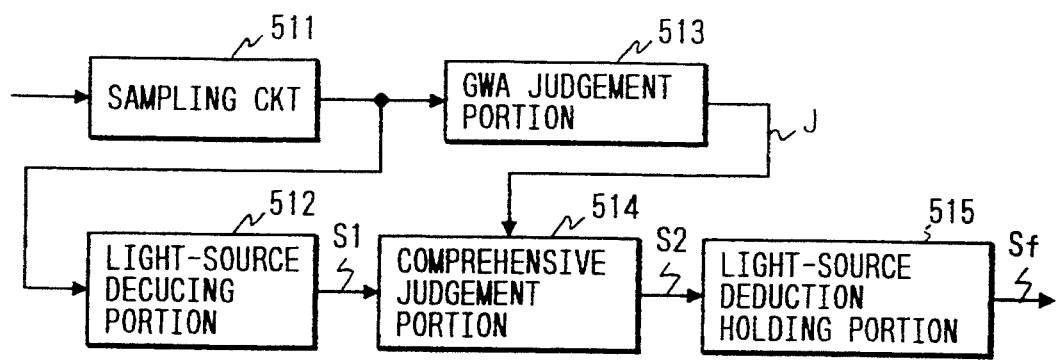
FIG. 22 is a schematic block diagram for illustrating the configuration of still another light-source deducing device according to the present invention (hereunder sometimes referred to as a twelfth embodiment of the present invention)

FIG. 22 is a schematic block diagram for illustrating the configuration of the twelfth embodiment (namely, a light-source deducing device) of the present invention. In this figure, reference numeral 511 denotes a sampling circuit for obtaining image data suitable for deducing a light source from data represented by image signals derived as a result of color separation; 512 a light-source deducing portion for receiving the sampled image data and deducing a light source; 513 a GWA judgement portion for receiving the sampled image data and judging from the characteristics of the distribution of the image data whether or not GWA holds good; 514 a comprehensive judgment portion for receiving first-order deduction data (namely, data indicating a result of deducing a light source) S1 and GWA judgement data J (namely, data indicating a result of judging whether or not GWA holds good) from the portions 512 and 513, respectively, for processing the data S1 according to the data J and for outputting second-order deduction data S2; 515 a light-source deduction holding portion for holding the data S2 output from the portion 514.

Next, an operation of the light-source deducing device having the above described configuration will be described hereinbelow, First, image signals are input to and sampled according to a predetermined suitable rule by the sampling circuit 511. Then, the sampled image data is sent therefrom to the light-source deducing portion 512 and the GWA judgement portion 513. The light-source deducing portion 512 deduces a light source by performing an algorithm for simply averaging image data or for extracting white portions from an input picture and averaging the rest of the input picture. Then, the portion 512 outputs the data S1. On the other hand, the GWA judgement portion 513 judges from the characteristics of the distribution of image data of the input picture whether or not GWA holds true, and outputs a GWA judgement signal indicating the following data J:

If GWA holds good, J=OK; and

Otherwise, J=NO (indicating that GWA does not hold good.

Incidentally, the data J is set as OK until the data J becomes OK at least once since an operation of the device is started (or the device is activated).

Then, the comprehensive judgement portion 514 receives the data S1 and J from the portions 512 and 513, respectively, and outputs the following data S2:

If J=OK, S2=S1; and

If J=NO, S2=IMPOSSIBLE (indicating that the judgement is impossible). The deduction holding portion 515 receives the data S2 from the portion 514 and holds the second-order deduction data as data Sbuf and outputs the following final deduction data (namely, data representing a final result of deducing a light source) Sf:

If S2≠IMPOSSIBLE, Sf=S2; and Sbuf32 S2; and

IF S2=IMPOSSIBLE, Sf=Sbuf; and Sbuf=Sbuf.

Thus, in case of this embodiment, by judging from the characteristics of the distribution of the sample image data, data representing a result of deducing a light source is discarded in case where GWA does not hold good (in such a case, the device is liable to make an error in deducing a light source). Consequently, a light-source deducing device, which hardly makes an error in deducing a light source, can be realized.

13. Thirteenth Embodiment

Figure 23:
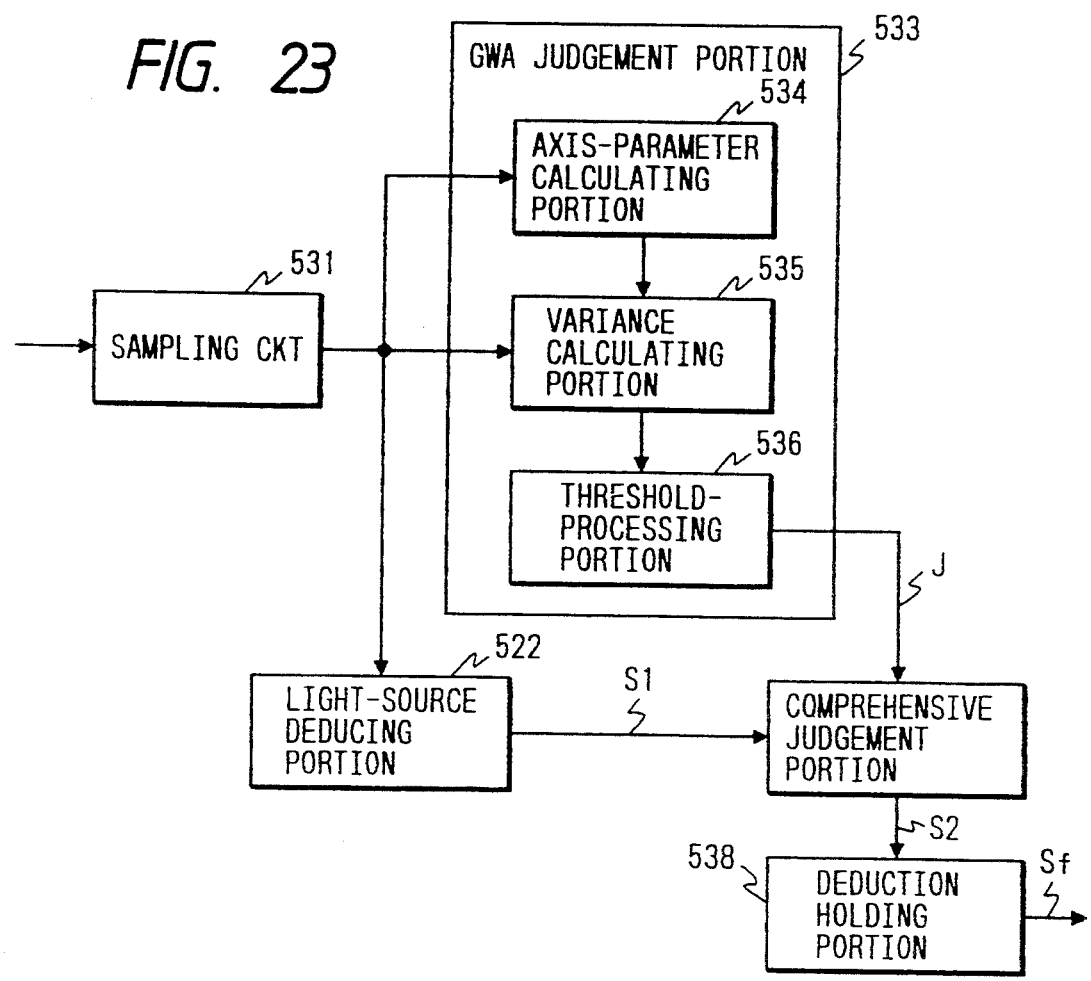
FIG. 23 is a schematic block diagram for illustrating the configuration of yet another light-source deducing device according to the present invention (hereunder sometimes referred to as a thirteenth embodiment of the present invention)

Next, the thirteenth embodiment of the present Invention will be described hereinbelow. FIG. 23 is a schematic block diagram for illustrating the configuration of the thirteenth embodiment (namely, a light-source deducing, device) of the present invention. In this figure, reference numeral 531 denotes a sampling circuit for obtaining image data suitable for deducing a light source from data represented by image signals derived as a result of color separation; 532 a light-source deducing portion for receiving the sampled image data and deducing a light source; 583 a GWA judgement portion for receiving the sampled image data and judging from the characteristics of the distribution of the image data whether or not GWA holds good; 534 an axis-parameter calculating portion for determining the direction, in which a variance axis extends, from the image data; 535 a variance calculating portion for receiving the image data and a signal indicating the direction, in which a variance axis extends, with respect to a blackbody radiation curve of FIG. 5 from the portion 534 and calculating the vertical variance of color signals; and 536 a threshold-processing portion for receiving a signal, which indicates the color variance, from the portion 535 and comparing the color variance with a threshold value stored therein and outputting a signal, which indicates that GWA holds good, in case where the color variance is less than the threshold value, and otherwise outputting another signal, which indicates that GWA does not hold good; 537 a comprehensive judgement portion for receiving first-order deduction data (namely, data indicating a result of deducing a light source) S1 and GWA judgement data J (namely, data indicating a result of judging whether or not GWA holds good) from the portions 532 and 583, respectively, for processing the data S1 according to the data J and for outputting second-order deduction data S2; 538 a light-source deduction holding portion for holding the data S2 output from the portion 537.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 531. Then, the sampled image data is sent therefrom to the light-source deducing portion 532 and to the portions 584 and 535 of the GWA judgement portion 533. The light-source deducing portion 532 receives the input image data IS (namely, (RGB), (Y, R−Y, B−Y) or the like) and sometimes evaluates the data and computes, for instance, an image-data average $IS_{ave}$. Subsequently, the portion 25 compares the average $IS_{ave}$ with data representing the color of a light source stored therein and thereafter outputs data representing a light source having the color, which is most closely allied to the color indicated by the data compared and stored therein, as first-order deduction data S1. On the other hand, the portion 23 of the device 21 receives the input image data IS and sometimes evaluates the data and further calculates the image data variance SGM, which is the vertical variance with respect to the light-source line in a chromaticity plane.

Meanwhile, the threshold-processing portion 24 receives the image-data variance SGM from the variance calculating portion 535 and then compares the variance SGM with the threshold value $\theta$ and outputs a GWA judgement signal indicating GWA judgement data J as follows.

If SGM is less than $\theta$, J=OK (indicating that GWA holds good); and

Otherwise, J=NO (indicating that GWA does not hold good.

Incidentally, J is set as OK (namely, J=OK) until SGM becomes less than $\theta$ at least once since an operation of the device is started. The comprehensive judgement portion 537 receives the first-order deduction data S1 and the GWA judgement signal indicating the data J respectively from the light-source deducing portion 532 and the threshold-processing portion 536 and subsequently outputs a signal indicating a second-order deduction S2 as follows.

If J=OK, S2=S1; and

If J=NO, S2=IMPOSSIBLE (indicating that a judgement is impossible).

The deduction holding portion 538 receives the second-order deduction S2 from the comprehensive judgment portion 587 and outputs a final deduction (namely, a final result of deducing a light source) Sf and holds the second-order deduction S2 as data Sbuf. Namely, If S2 does not indicate that the judgement is impossible (namely, S2≠IMPOSSIBLE), Sf=S2; and Sbuf=S2.

If S2 indicates that the judgement is impossible (namely, S2=IMPOSSIBLE),

Sf=Sbuf; and

Sbuf=Sbuf.

As above described, in case of the thirteenth embodiment, the portion 534 detects the direction, in which the variance axis extends, with respect to the blackbody radiation curve in the chromaticity space. Thus the vertical variance can be calculated with high precision. Further, it is judged from the vertical variance of the image data whether or not GWA holds good. Thereby, results of deducing a light source when GWA does not hold good (in such a case, the device is liable to deduce a wrong light source) are discarded. Consequently, a light-source deducing device, in which an error in deducing a light source hardly occurs, can be realized.

14. Fourteenth Embodiment

Figure 24:
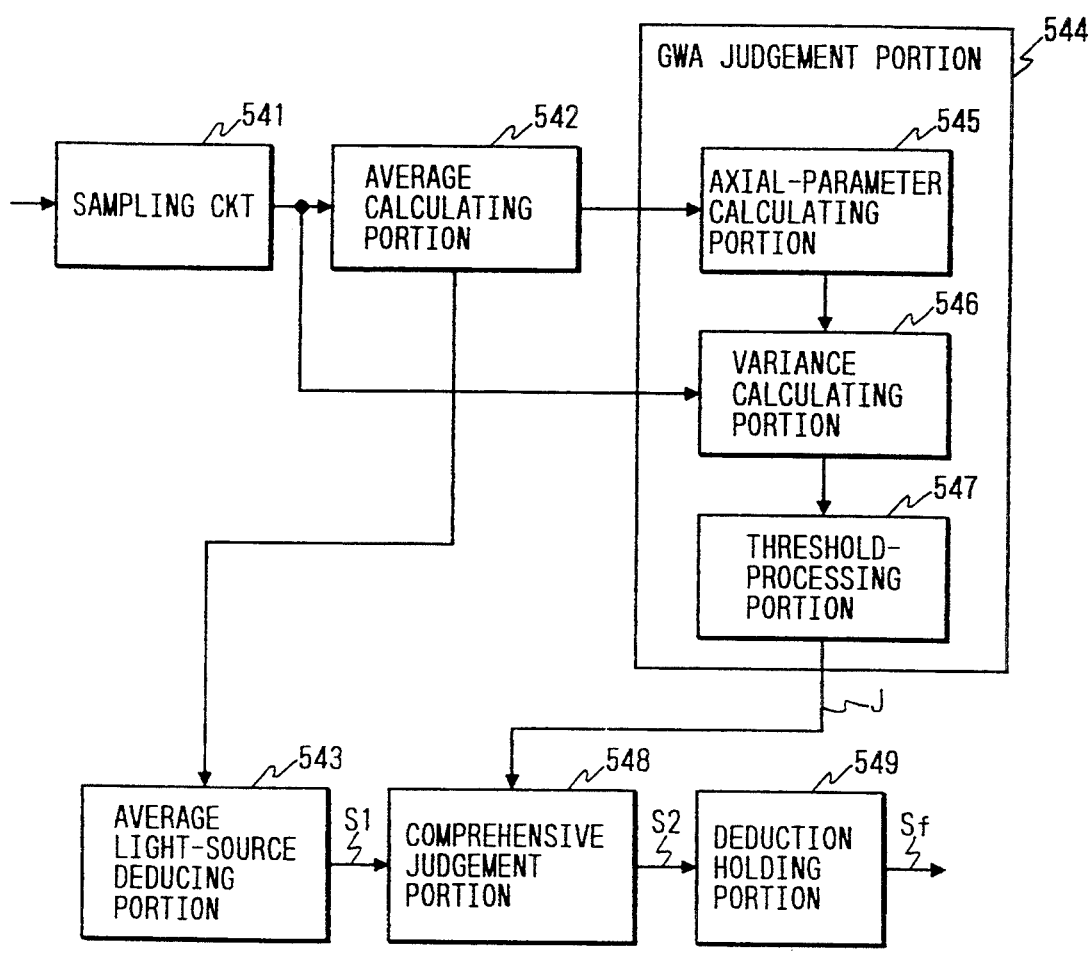
FIG. 24 is a schematic block diagram for illustrating the configuration of a still further light-source deducing device according to the present invention (hereunder sometimes referred to as a fourteenth embodiment of the present invention)

Next, the fourteenth embodiment of the present invention will be described hereinafter. FIG. 24 is a schematic block diagram for illustrating the configuration of the fourteenth embodiment (namely, a light-source deducing device) of the present invention. In this figure, reference numeral 541 denotes a sampling circuit for obtaining image data suitable for deducing a light source from data represented by image signals derived as a result of color separation: 542 an average calculating portion for receiving the Image data and the average IS"ave" of the image data; 543 an average light-source deducing portion for receiving the average IS'-'ave" and deducing a light source; 544 a GWA judgement portion for receiving the average IS"ave" from the portion 542 and judging whether or not GWA holds good; 545 an axis-parameter calculating portion for determining the direction, in which a variance axis extends, from the average IS"ave"; 546 a variance calculating portion for receiving the image data and a signal indicating the direction, in which a variance axis extends, with respect to the blackbody radiation curve of FIG. 5 from the portion 545 and calculating the vertical variance of color signals; and 547 a threshold-processing portion for receiving a signal, which indicates the color variance, from the portion 546 and comparing the color variance with a threshold value stored therein and outputting a signal. which indicates that GWA holds good, in case where the color variance is less than the threshold value, and otherwise outputting another signal, which indicates that GWA does not hold good; 548 a comprehensive judgement portion for receiving first-order deduction data (namely, data indicating a result of deducing a light source) S1 and GWA judgement data J (namely, data indicating a result of judging whether or not GWA holds good) from the portions 543 and 544, respectively, for processing the data S1 according to the data J and for outputting second-order deduction data S2; and 549 a light-source deduction holding portion for holding the data S2 output from the portion 548.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 541. Then, the sampled image data is sent therefrom to the average calculating portion 542. The average calculating portion 542 receives the input image data IS (namely, (RGB), (Y, R−Y, B−Y) or the like) and sometimes evaluates the data and computes, for instance, an image-data average IS"ave". Subsequently, the average light-source deducing portion 543 receives the average IS"ave" from the portion 542 and compares the average IS"ave" with data representing the color of a light source stored therein and thereafter outputs data representing a light source having the color, which is most closely allied to the color Indicated by the data compared and stored therein, as first-order deduction data S1, Further, the axis-parameter calculating portion 545 of the GWA judgement portion 544 detects the nearest point of the blackbody radiation curve to the average IS"ave" received from the portion 542 and outputs an axis-parameter determined In such a manner that a normal drawn from the detected nearest point of the blackbody radiation curve is employed as the vertical variance axis. The variance calculating portion 546 receives the axis-parameter output from the portion 545, as well as the image data IS, and sometimes evaluates the data and calculates the image data variance SGM, which is a vertical variance with respect to the normal drawn from the blackbody radiation curve in the chromaticity space. The subsequent processing to be performed by this embodiment is the same as performed in case of the thirteenth embodiment.

In case of the fourteenth embodiment, the axis-parameter calculating portion 545 detects the nearest point of the blackbody radiation curve to the average IS"ave" received from the portion 542 and outputs an axis-parameter determined in such a manner that a normal drawn from the detected nearest point of the blackbody radiation curve is employed as the vertical variance axis. Thus, more exact vertical variance data can be obtained. Further, results of deducing a light source when GWA does not hold good (in such a case, the device is liable to deduce a wrong light source) are discarded. Thereby, a light-source deducing device, in which an error in deducing a light source hardly occurs, can be realized.

Incidentally, in the thirteenth and fourteenth embodiments, the processing to be performed in the axis-parameter calculating portions 534 and 545 causes a fairly large calculation-load. However, the device may employ a simple and easy means which partitions the chromaticity space into suitable regions and detects a region, In which the image-data average is present, and determines the axis-parameters to be assigned to the detected region, instead of the portions 584 and 545.

15. Fifteenth Embodiment

Next, the fifteenth embodiment of the present invention will be described hereinbelow.

Figure 25:
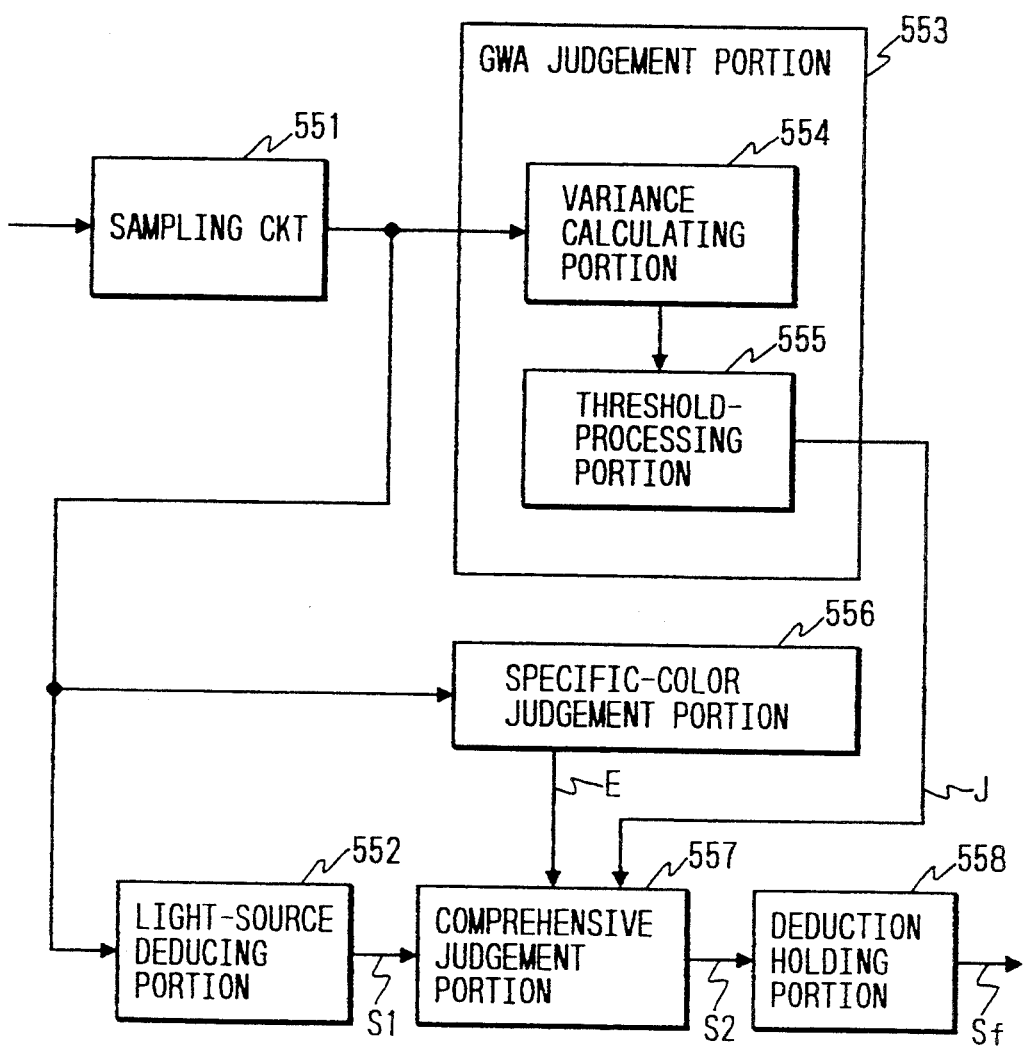
FIG. 25 is a schematic block diagram for illustrating the configuration of a yet further light-source deducing device according to the present invention (hereunder sometimes referred to as a fifteenth embodiment of the present invention)

FIG. 25 is a schematic block diagram for illustrating the configuration of the twelfth embodiment (namely, a light-source deducing device) of time present invention. In this figure, reference numeral 551 designates a sampling circuit for obtaining image data suitable for deducing a light source from data represented by image signals derived as a result of color separation; 552 a light-source deducing portion for receiving the sampled image data and deducing a light source; and 553 a GWA judgement portion for receiving the sampled image data and judging whether or not GWA holds good. The portion 553 is provided with a vertical variance calculating portion 554 for receiving the image data and calculating the variance of color signals and a threshold-processing portion 555 for receiving a signal, which indicates the color variance, from the portion 554 and comparing the color variance with a threshold value stored therein and outputting a signal, which indicates that GWA holds good, in case where the color variance is less than the threshold value, and otherwise outputting another signal, which indicates that GWA does not hold good. Reference numeral 556 denotes a specific-color judgement portion for judging whether or not image data corresponding to a specific color, from which a light source can be directly deduced, is present; 557 a comprehensive judgment portion for receiving first-order deduction data (namely, data indicating a result of deducing a light source) S1, GWA judgement data J (namely, data indicating a result of judging whether or not GWA holds good) and specific-color judgement data E from the portions 552, 553 and 556, respectively, for processing the data S1 according to the data J and for outputting second-order deduction data S2; and 556 a lights-source deduction holding portion for holding the data S2 output from the portion 557.

Next, an operation of the light-source deducing device having the above described configuration will be described hereinbelow.

First, image signals are input to and sampled according to a predetermined suitable rule by the sampling circuit 551. Then, the sampled image data is sent therefrom to the light-source deducing portion 552, the vertical variance calculating portion 554 of the GWA judgement portion 553 and the specific-color judgement portion 556. The light-source deducing portion 552 receives the input image data IS (namely, (RGB), (Y, R−Y, B−Y) or the like) and sometimes evaluates the data and calculates, for instance, the image-data average IS"ave". Subsequently, the light-source deducing portion 552 compares the average IS"ave" with data representing the color of a light source stored therein and thereafter outputs data representing a light source having the color, which is most closely allied to the color indicated by the data compared and stored therein, as the light-source deduction data S1. Further, the vertical variance calculating portion 554 of the GWA judgement portion 558 receives the input image data IS and sometimes evaluates the data and computes the image data variance SGM, which is a vertical variance with respect to the light-source line in the chromaticity space (for example, the chromaticity space represented by two independent variables (R−Y)/Y and (B−Y)/Y as illustrated in FIG. 5). Subsequently, the threshold-processing portion 555 receives the image data variance SGM from the variance calculating portion 554 and compares the received variance with the threshold value $\theta$ and outputs a GWA judgement signal indicating the following GWA judgement data J:

If SGM is less than e, J=OK (indicating that GWA holds good); and

Otherwise, J=NO (indicating that GWA does not hold good).

Incidentally, J is set as OK (namely, J=OK) until SGM becomes less than $\theta$ at least once since an operation of the device is started.

On the other hand, the specific-color judgement portion 558 receives the sampled image data from the circuit 551 and judges whether or not image data corresponding to a specific color, from which a light source can be directly deduced, (for instance, image data included in the sky-blue area of FIG. 5) is present the received image data. Further, the portion 556 outputs a signal representing the following specific-color judgement data E(C) which corresponds to each specific color C:

If image data corresponding to a specific color C is present, E(C)=PRESENT; and

Otherwise, E(C)=ABSENT.

Then, the comprehensive judgement portion 557 receives the data S1, J and E(C) from the portions 552, 555 and 556, respectively, and outputs the following second-order light-source deduction data S2:

In case where E(C)=ABSENT,
if J=OK, S2=S1; and
if J=NO, S2=IMPOSSIBLE (indicating that the judgement is impossible);

In case where E(C)=PRESENT,
when S1 is inconsistent with (E(C)=PRESENT),
if J=OK, S2=S1; and
if J=NO, S2=IMPOSSIBLE: and
when S1 is not inconsistent with (E(C)=PRESENT),
if J=OK, S2=S1; and
if J=NO, S2=S1.

The deduction holding portion 558 receives the data S2 from the comprehensive judgement portion 557 and holds the second-order deduction data S2 as data Sbuf and outputs the following final deduction data Sf:

If S2≠IMPOSSIBLE, Sf=S2; and Sbuf=S2; and
IF S2=IMPOSSIBLE, Sf=Sbuf; and Sbuf=Sbuf.

As described above, the specific-color judgement portion 558 is provided in this embodiment. Thus, even in case where the comprehensive judgement portion 557 judges that GWA does not hold good, a light source can be deduced from image data corresponding to a specific color (e.g., the sky-blue). Moreover, results of deducing a light source when GWA does not hold good (in such a case, the device is liable to deduce a wrong light source) are discarded. Thereby, a light-source deducing device, in which an error in deducing a light source hardly occurs, can be realized.

Incidentally, the comprehensive judgement portion 557 of this embodiment gives priority to the GWA judgement data. However, the comprehensive judgement portion 557 may give priority to the specific-color judgement data.

16. Sixteenth Embodiment

Figure 26:
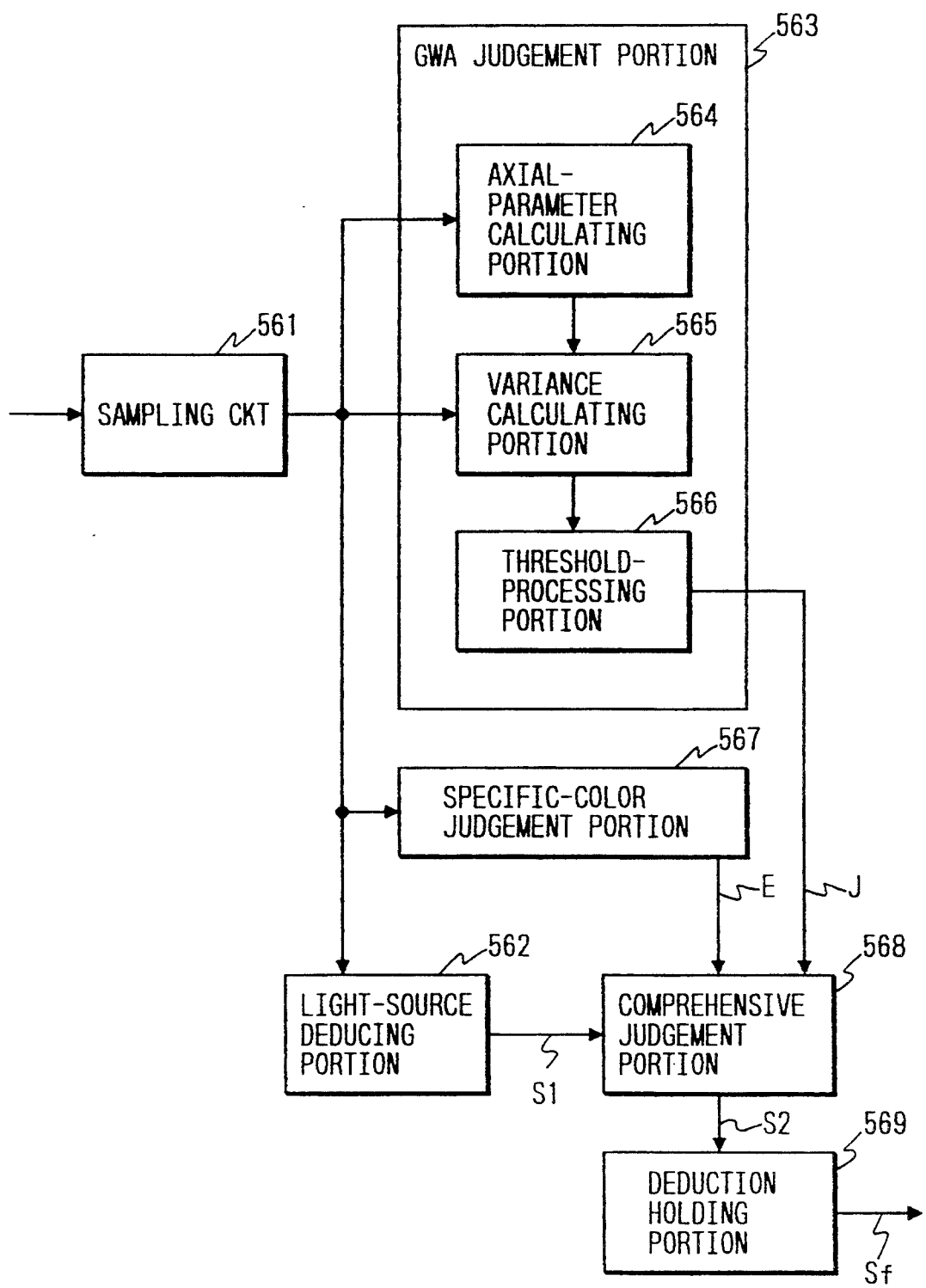
FIG. 26 is a schematic block diagram for illustrating the configuration of an additional light-source deducing device according to the present invention (hereunder sometimes referred to as a sixteenth embodiment of the present invention)

Next, the sixteenth embodiment of the present invention will be described hereinbelow. FIG. 26 is a schematic block diagram for illustrating the configuration of the sixteenth embodiment (namely, a light-source deducing device) of the present invention. In this figure, reference numeral 581 denotes a sampling circuit for obtaining image data suitable for deducing a light source from data represented by image signals derived as a result of color separation; 562 a light-source deducing portion for receiving the sampled image data and deducing a light source; and 568 a GWA judgement portion for receiving the sampled image data and judging from the characteristics of the distribution of the image data whether or not GWA holds good. (incidentally, the portion 563 may be replaced with the like or corresponding portion of the above described embodiments.) Further, the portion 563 is provided with an axis-parameter calculating portion 564 for determining the direction, in which a variance axis extends, from the image data, a vertical variance calculating portion 565 for receiving the image data and a signal indicating the direction, in which a variance axis extends, with respect to the blackbody radiation curve from the portion 564 and calculating the vertical variance of color signals, and a threshold-processing portion 566 for receiving a signal, which indicates the color variance, from the portion 565 and comparing the color variance with a threshold value stored therein and outputting a signal, which indicates that GWA holds good, in case where the color variance is less than the threshold value, and otherwise outputting another signal, which indicates that GWA does not hold good. Reference numeral 567 designates a specific-color judgement portion for judging whether or not image data corresponding to a specific color, from which a light source can be directly deduced, is present; 568 a comprehensive judgement portion provided with neural network simulation means for receiving first-order deduction data S1, GWA judgement data J and specific-color judgement data E from the portions 562, 563 and 567, respectively, for processing the data S1 according to the data J and for outputting second-order deduction data S2; and 569 a light-source deduction holding portion for holding the data S2 output from the portion 568.

Next, an operation of the light-source deducing device having the above described configuration will be described hereinbelow.

First, image signals output from a color separation circuit (not shown) through pickup elements such as CCD elements are input to and sampled according to a predetermined suitable rule by the sampling circuit 561. Then, the sampled image data is sent therefrom to the light-source deducing portion 562 and to the portions 564, 565 and 567 of the GWA judgement portion 563.

The light-source deducing portion 562 receives the input image data IS (namely, (ROB), (Y, R−Y, B−Y) or the like) and sometimes evaluates the data and computes, for instance, an image-data average $IS_{ave}$. Subsequently, the portion 562 compares the average $IS_{ave}$ with data representing the color of a light source stored therein and thereafter outputs data representing a light source having the color, which is most closely allied to the color indicated by the data compared and stored therein, as first-order deduction data S1. Further, the axis-parameter calculating portion 564 of the portion 563 receives the image data and determines the direction, in which a variance axis extends, from the average $IS_{ave}$ and outputs the determined axis-parameter. Then, the vertical variance calculating portion 565 of the GWA judgement portion 563 receives the axis-parameter from the portion 564 and the input image data IS and sometimes evaluates the data and computes the image data variance SGM, which corresponds to a vertical variance with respect to the light-source line in the chromaticity space. Subsequently, the threshold-processing portion 566 receives the image data variance SGM from the variance calculating portion 565 and compares the received variance with the threshold value $\theta$ and outputs a GWA judgement signal indicating the following GWA judgement data J:

If SGM is less than $\theta$, J=OK (indicating that GWA holds good); and

Otherwise, J=NO (indicating that GWA does not hold good).

Incidentally, J is set as OK (namely, J=OK) until SGM becomes less than $\theta$ at least once since an operation of the device is started.

Meanwhile, regarding the processing to be performed in the comprehensive judgement portion 588, it is difficult to determine which of the GWA judgement and the specific-color judgement should be preferential. Probably, it is most preferable to change the order of priorities of the GWA judgement and the specific-color judgement according to circumstances. It is, however, very difficult to make rules for such a treatment. Thus, neural network simulation means (hereunder sometimes referred to simply as a neural network) is employed in the comprehensive judgement portion 568 as an effective measure in such a case.

To use the neural network in the portion 568, the specific-color judgement portion 567 is adapted to receive image data and output the value of an area S(C) corresponding to a specific color C as the judgement data E.

Figure 27:
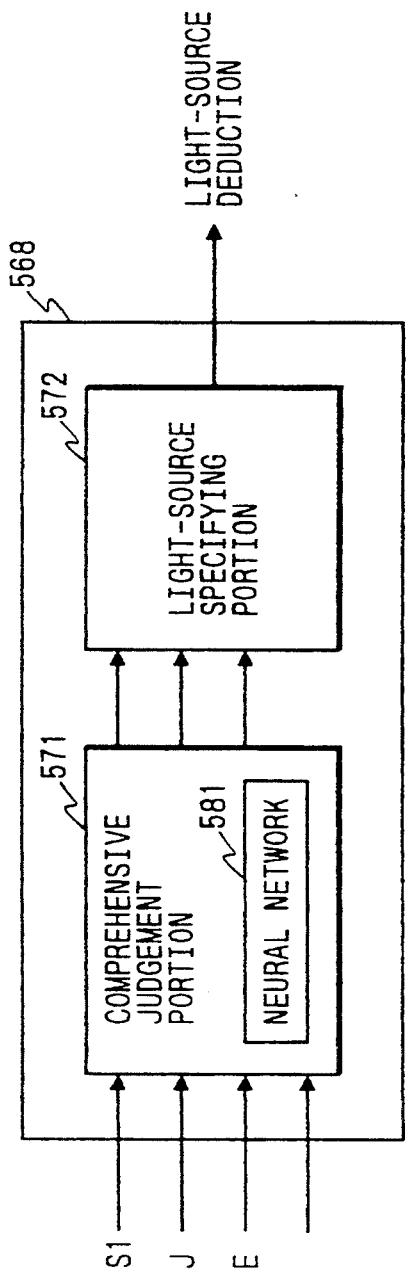
FIG. 27 is a schematic block diagram for illustrating the configuration of a comprehensive judgement portion of the light-source deducing device of FIG. 26.

FIG. 27 is a schematic block diagram for illustrating the configuration of the comprehensive judgement portion 568 of this embodiment. In this figure, reference numeral 571 represents a comprehensive-judgement processing portion formed by a neural network for receiving the data S1, J and E from the portions 562, 563 and 567, respectively, and comprehensively judging or deducing from the received data what a light source is. Reference numeral 572 designates a light-source specifying portion for receiving the result of the comprehensive judgement represented by analog data output from the portion 571, for performing a comparison and a threshold-processing on the received analog data and for output digital data representing the result of deducing a light source (for instance, indicating that the light source is a fluorescent lamp, or that the judgement or deducing of a light source is impossible).

Further, in this embodiment, a multi-layer perception (e.g., a three-layer or four-layer perception) is employed as a neural network. Moreover, an error back propagation algorithm is employed as a learning algorithm for the neural network. As to the details of the perception and the error back propagation, refer to a reference (Rumelhart, D. E., et al., 1986, PARALLEL DISTRIBUTED PROCESSING, MIT Press).

Figure 28:
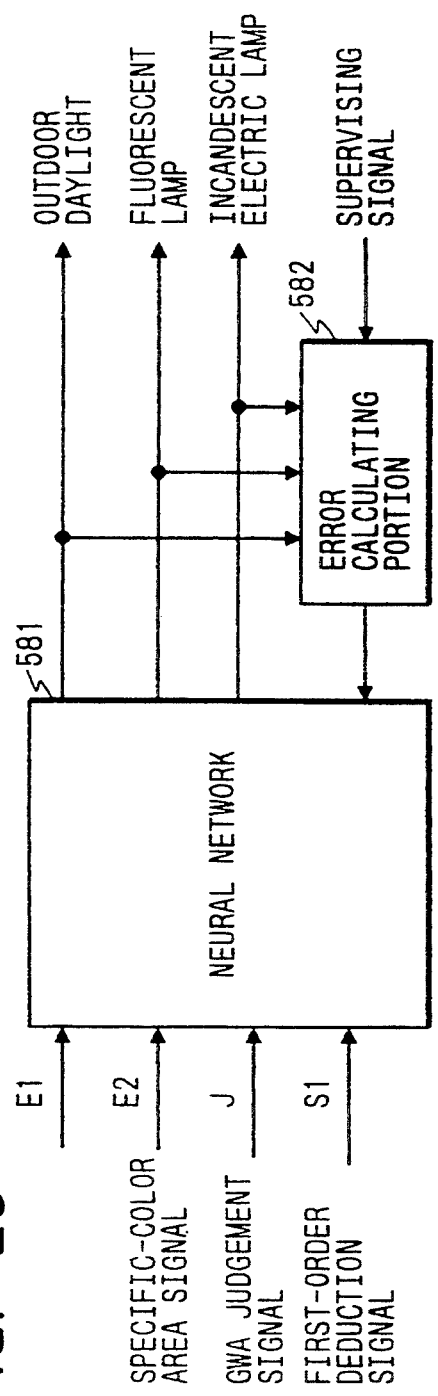
FIG. 28 is a schematic block diagram for illustrating the configuration of a comprehensive judgement processing portion of FIG. 27.

FIG. 28 is a schematic block diagram for illustrating the configuration of the neural network of the portion 571. As shown in this figure, the neural network 581 is adapted to output signals respectively corresponding to light sources (in this embodiment, outdoor daylight when it is fair, a fluorescent lamp and a incandescent electric lamp) when the data E representing an area of a specific color, the GWA judgement data J and the light-source deduction data S1 are input to the neural network 581 from the portions 567, 563 and 562, respectively. Further, each of the signals respectively corresponding to light sources representing data, which indicates whether or not a corresponding light source is the deduced light source. Namely, if the data represented by such a signal is 1 (practically, 0.9 or so), the data indicates that the corresponding light source is the deduced light source. In contrast, if the data represented by such a signal is 0 (practically, 0.1 or so), the data indicates that the corresponding light source is not the deduced light source. Further, supervising signals T, which respectively correspond to the input data such as the first-order light-source deduction data S1 and indicate a light source used for taking a picture, are input to the portion 571. Thus the device comes to know or learn whether or not the result of deducing the light source is correct. If not correct, an error calculating portion 582 calculates from the data indicated by the signal T how the magnitude of an error is. The portion 582 informs the neural network 581 of the calculated error. Thereby, the network 581 can learn by experience the preferable balance in priority between the specific-color judgement and the GWA judgement. Eventually, the device comes to be able to synthetically deduce a light source similarly as a man can.

However, each output of the neural network of the portion 571 is represented by what is called a "sigmoid" function as each output thereof. As the result, each of the outputs of the neural network 581 has an analog value of from 0 to 1 as described hereinbelow as a practical example:

(The data corresponding to the outdoor daylight when it is fair)=0.2;

(The data corresponding to a fluorescent lamp)=0.7; and (The data corresponding to an incandescent electric lamp)=0.4

This is not suitable for the representation of the second-order light-source deduction data S2. Thus, the outputs of the portion 571 undergo a "rectification" operation. For instance, the above described example of the outputs of the portion 571 undergo the following operation:

(1) Detect the output having the maximum value.

In case of the above described example, (The data corresponding to a fluorescent lamp)=0.7

(2) judge the precision of the output by making a comparison between the detected maximum value and a predetermined threshold.

In this case, the threshold is 0.5.

(3) if the detected maximum value is larger than or equal to the threshold, the data having the maximum value is output as indicating the result of deducing a light source; and Otherwise, data indicating that the deduction or judgement is impossible.

In this case, the maximum value (0.7) is larger than the threshold (0.5). Thus the data (indicating that the light source is a fluorescent lamp) is output.

Incidentally, an additional judgement (for instance, whether or not the difference between the maximum value and the second largest value is larger than another predetermined threshold) may be performed.

When the rectified data is output from the portion 568 as the data S2, the deduction holding portion 569 holds the data S2 as data Sbuf and outputs the final deduction Sf as follows:

If S2≠IMPOSSIBLE, Sf=S2; and Sbuf=S2; and
If S2=IMPOSSIBLE, Sf=Sbuf; and Sbuf=Sbuf.

As described above, the comprehensive judgement portion 568 is provided with the comprehensive judgement processing portion 571, which uses the neural network, and the light-source specifying portion S72. Thus a light-source deducing device, which can effect a more appropriate treatment of the priorities of the results of the GWA judgement and the specific-color judgement according to circumstances in comparison with the fifteenth embodiment, is provided. Consequently, the preferable balance in priority between the specific-color judgement and the GWA judgement can easily be achieved.

Further, the neural network may be modified in such a manner to receive the vertical variance SGM instead of the GWA judgement data J.

Incidentally, neural networks may be used in the comprehensive judgement portions of the twelfth to fifteenth embodiments.

Additionally, the learning function is usually unnecessary when the comprehensive judgement processing portion 571 is provided in the light-source deducing device. Therefore, if the neural network has undergone a training, the learning function thereof may be omitted.

Furthermore, results of deducing a light source when GWA does not hold good (in such a case, the device is liable to deduce a wrong light source) are discarded. Moreover, results of the specific-color judgement can be taken into consideration. Thereby, a light-source deducing device, which hardly makes an error in deducing a light source and is widely used, can be realized.

Incidentally, each of the twelfth to sixteenth embodiments is of the type that a light source is deduced by performing an image processing. Thus, another type of a light-source deducing means can be added thereto. For instance, means for deducing a light source according to information on an iris of a camera may be further employed. In such a case, if input picture is very clear and light, the light source may be deduced as the outdoor daylight when it is fair.

17. Seventeenth Embodiment

Figure 29:
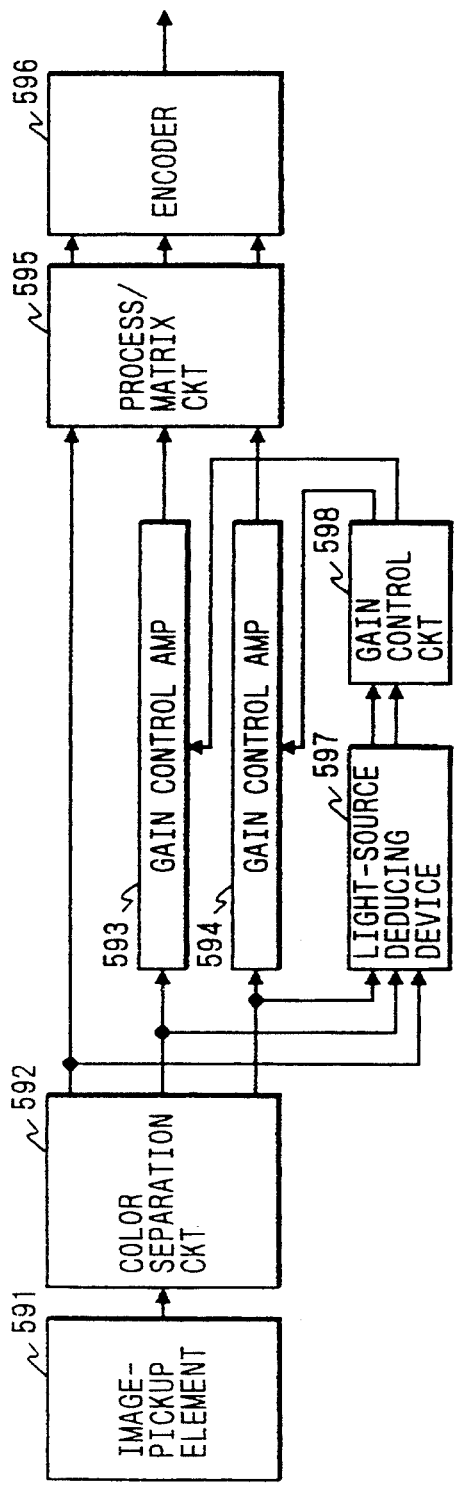
FIG. 29 is a schematic block diagram for illustrating the configuration of a color regulating device according to the present invention (hereunder sometimes referred to as a seventeenth embodiment of the present invention) of a video camera.

Next, the seventeenth embodiment (namely, a white balance control device of a video camera employing the light-source deducing device as above described) of the present invention will be described hereinbelow. FIG. 29 is a schematic block diagram for illustrating the configuration of such a white balance control device of the seventeenth embodiment. In this figure, reference numeral 591 represents an image pickup element such as COD; 592 a color separation circuit for converting image signals obtained by the pickup elements 591 to appropriate color signals (e.g., what is called RGB signals); 593 and 594 gain-control amplifiers for controlling the white balance; 595 a process/matrix circuit for performing a camera-processing such as a gamma correction processing on the color signals and thereafter converting the color signals to a luminance signal Y and color difference signals (R−Y) and (B−Y); 596 an encoder for generating a video signal; 597 a light-source deducing device of one of the second, third, fourth, eighth, twelfth, fifteenth and sixteenth embodiments of the present invention: and 598 a gain-control circuit for controlling the gains of the gain-control amplifiers 593 and 594.

Hereinafter, an operation of the white balance control device, which is constructed as above described, of a video camera will be described. First, the pickup element 591 effects a photoelectric conversion to convert an optical image formed on the surface thereof into an electric signal and thereafter outputs the electric signal to the color separation circuit 592. Then, the circuit 592 converts color signals, which are converted by the element 591, into a color separation signal. The color separation signals generated by the circuit 592 are sent to the light-source deducing device 597 and the process/matrix circuit 595 through the amplifiers 593 and 594. The device 597 samples the color separation signal sent from the circuit 592 by performing the process as previously described. Further, the device 597 deduces the light source and then outputs a signal indicating information representing the deduced light source to the gain control circuit 598. This circuit 598 controls the gains of the amplifiers 593 and 594 according to the information on the deduced light source. Thus the gains of the amplifiers 593 and 594 for controlling the white balance are changed to A1 and A2, respectively, in such a manner that the effects of color rendition caused by the light source is eliminated. Then, the amplified signals are output to the process/matrix circuit 595 therefrom. The circuit 595 performs a processing such as a gamma correction on the color separation signals and subsequently the circuit 595 outputs the resultant signal to the encoder 596. Finally, a video signal is output from the encoder 596.

Incidentally, if necessary, the signals output from the circuit 595 are converted by the encoder 596 into composite video signals. Further, when signals, from which a deducing of a light source is impossible, are input to the circuit 598 from the device 597, the gain control circuit 597 is adapted not to change the gains of the amplifiers 593 and 594.

Thus, in case of this embodiment, the white balance control device is formed by employing the light-source deducing device as above described. Thereby, a white balance control device, which can perform color reproduction correctly even if a large part of an input picture has a specific color, is provided.

In addition, this embodiment can be applied to an electronic image-pickup camera such as an electronic still camera.

18. Eighteenth Embodiment

Figure 30:
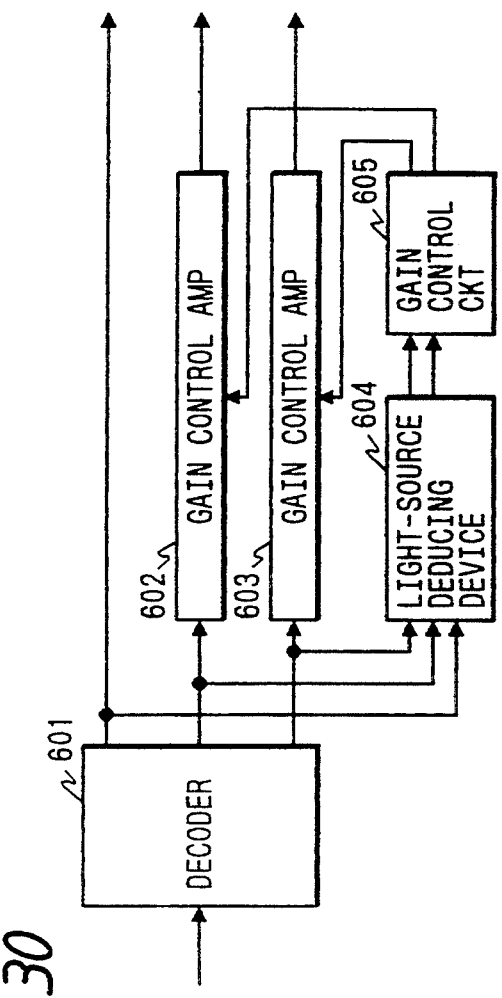
FIG. 30 is a schematic block diagram for illustrating the configuration of another color regulating device according to the present invention (hereunder sometimes referred to as an eighteenth embodiment of the present invention) of a VTR.

Next, the eighteenth embodiment (namely, a color control or regulating device of a VTR employing the light deducing device as above described) of the present invention will be described hereinbelow. FIG. 30 is a schematic block diagram for illustrating the configuration of the eighteenth embodiment (namely, the color regulating device) of the present invention for use in a VTR. In this figure, reference numeral 601 denotes a decoder for converting a video signal to a luminance signal Y and color difference signals (R−Y) and (B−Y): 602 and 603 gain control amplifiers for controlling colors of pictures: 604 a light-source deducing device of one of the second, third, fourth, eighth, twelfth, fifteenth and sixteenth embodiments: and 605 a gain control circuit for controlling the gains of the amplifiers 602 and 603 according to outputs of the device 604.

Hereinafter, an operation of the color regulating device having the above described configuration will be described. First, the decoder 601 converts video signals recorded on a tape into the signals Y, (R−Y) and (B−Y) respectively having the levels SY, S(R−Y) and S(B−Y). These signals are sent to the device 604 and the amplifiers 602 and 603 and a television receiver (TV (not shown)). The device 604 samples NTSC signals sent from the decoder 601 according to the above described process and then deduces a light source correctly and thereafter sends a signal representing information, which indicates the deduced light source, to the gain control circuit 605. The circuit 605 regulates the gains of the amplifiers 602 and 603 according to the information indicating the deduced light source. Thus the gains of the amplifiers 602 and 603 for controlling the white balance are changed to A(R−Y) and A(B−Y), respectively, in such a manner that the effects of color rendition caused by the light source is eliminated, Thus, the levels of the NTSC signals are changed to Y, A(R−Y).S(R−Y) and A(B−Y).S(B−Y). The gain control circuit 605 outputs signals, which do not change the gains of the amplifiers 602 and 603, when signals, from which a deducing of a light source is impossible, are input thereto.

Thus, in case of this embodiment, the color regulating device for a VTR is formed by employing the light-source deducing device as above described. Thereby, a color regulating device, which can perform color reproduction correctly even if a large part of an input picture has a specific color, is provided.

In addition, this embodiment can be applied to an electronic image-pickup camera reproduction device, which further effects electric processing, such as a reproduction device of an electronic still camera.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image judging device, comprising:
   sampling means for obtaining image data suitable for judging quality of an image by sampling image signals obtained by color separation;
   calculation .means for calculating a statistic representing characteristics of a distribution of the sampled image data; and
   judgment means for judging the quality of the image according to the calculated statistic, wherein the calculation means comprises a variance calculating means for calculating a variance of the image data sampled by the sampling means, and wherein the judgement means comprises a threshold-processing means for judging whether or not the calculated statistic is larger than a threshold value.

2. The image judging device according to claim 1, wherein the variance of the image data is a variance of chromaticities represented by the image data in a chromaticity space.

3. The image judging device according to claim 2, wherein the variance of chromaticities represented by the image data in the chromaticity space is a vertical variance of chromaticities represented by the image data with respect to a light-source line employed as an approximation of a blackbody locus in the chromaticity space.

4. The image judging device according to claim 2, wherein the variance of chromaticities represented by the image data in the chromaticity space is a vertical variance of chromaticities represented by the image data with respect to a blackbody locus in the chromaticity space.

5. A color-chart discriminating device, including:
   a sampling portion for sampling image signals according to a predetermined sampling rule;
   a chromaticity calculating portion for converting the sampled image signals into chromaticity signals;
   a statistic calculating portion for calculating a statistic of image signals; and
   a color-chart judgment portion for judging from a statistic of image data represented by image signals whether or not the image data represents a color chart, wherein the statistic calculating portion comprises:
   a cubic-moment calculating portion for calculating a cubic-moment; and
   an image-variance calculating portion for calculating a variance of a distribution of colors represented by the sampled image signals.

6. The color-chart discriminating device according to claim 5, wherein the cubic-moment calculating portion comprises:
   projection means for projecting chromaticities represented by chromaticity signals onto a direction perpendicular to a line approximating a blackbody locus of a color of a light source on a chromaticity plane, which is obtained by using a temperature of the blackbody as a parameter; and
   a cubic-moment computing means for calculating a cubic-moment of displacements, which are magnitudes of components of the protected chromaticities in the direction perpendicular to the line.

7. The color-chart discriminating device according to claim 5, wherein the color-chart judgement portion comprises:
   first threshold-processing portion for comparing a value indicated by an output signal of the cubic-moment calculating portion with a first threshold value stored therein and for outputting a first judgement signal indicating a result of the comparison:
   second threshold-processing portion for comparing a value indicated by an output signal of the image-variance calculating portion with a second threshold value stored therein and for outputting a second judgement signal indicating a result of the comparison; and
   an AND circuit for carrying out a logical AND between the first and second judgement signals output by the first and second threshold-processing means.

8. The color-chart discriminating device according to claim 6, wherein one of the projection means, which generates a signal to be input to the image-variance calculating portion, and another of the projection means, which generates a signal to be input to the cubic-moment calculating portion, have independent parameters.

9. A color-chart discriminating device, including:
a sampling portion for sampling image signals according to a predetermined sampling rule;
a chromaticity calculating portion for converting the sampled image signals into chromaticity signals;
a statistic calculating portion for calculating a statistic of image signals; and
a color-chart judgment portion for judging from a statistic of image data represented by image signals whether or not the image data represents a color chart, wherein the statistic calculating portion comprises:
a cubic-sum calculating portion for projecting chromaticities represented by the chromaticity signals onto a direction perpendicular to a line approximating a blackbody locus of a color of a light source on a chromaticity plane, which is obtained by using a temperature as a parameter, and calculating a cubic-sum of magnitudes of components of the projected chromaticities in the direction perpendicular to the line; and
an image-variance calculating portion for calculating a variance of a distribution of colors represented by the sampled image signals.

10. The color-chart discriminating device according to claim 9, wherein the cubic-sum calculating portion comprises:
projection means for projecting chromaticities represented by chromaticity signals onto a direction perpendicular to a line approximating a blackbody locus of a color of a light source on a chromaticity plane, which is obtained by using a temperature of the blackbody as a parameter; and
a cubic-sum computing means for calculating a cubic-sum of displacements, which are magnitudes of components of the projected chromaticities in the direction perpendicular to the line.

11. The color-chart discriminating device according to claim 10, wherein the color-chart judgement portion comprises:
first threshold-processing portion for comparing a value indicated by an output signal of the cubic-sum calculating portion with a first threshold value stored therein and for outputting a first judgement signal indicating a result of the comparison;
second threshold-processing portion for comparing a value indicated by an output signal of the image-variance calculating portion with a second threshold value stored therein and for outputting a second judgement signal indicating a result of the comparison; and
an AND circuit for carrying out a logical AND between the first and second judgement signals output from the first and second threshold-processing means.

12. The color-chart discriminating device according to claim 10, wherein one of the projection means, which generates a signal to be input to the image-variance calculating portion, and another of the projection means, which generates a signal to be input to the cubic-sum calculating portion, have independent parameters.

13. The color-chart discriminating device according to claim 5, 9, 6, 7, 8, 10, 11 or 12, wherein the image-variance calculating portion comprises:
projecting means for obtaining displacements of the chromaticities from the sampled image data; and
variance calculating means for calculating an image-signal variance from the displacements obtained by the projecting means.

14. A color-chart discriminating device, including:
a sampling portion for sampling image signals according to a predetermined sampling rule;
a chromaticity calculating portion for converting the sampled image signals into chromaticity signals;
a statistic calculating portion for calculating a statistic of image signals; and
a color-chart judgment portion for judging from a statistic of image data represented by image signals whether or not the image data represents a color chart, wherein the statistic calculating portion comprises:
rotation-correlation-coefficient calculating portion for calculating a rotation-correlation-coefficient, which represents an extent to which a distribution of colors represented by the image signals extends along a primary-component-axis; and
image-variance calculating portion for calculating a variance of the distribution of colors represented by the image signal.

15. The color-chart discriminating device according to claim 14, wherein the rotation-correlation-coefficient calculating portion comprises:
first variance calculating means for calculating first variance of the chromaticities represented by the chromaticity signals;
second variance calculating means for calculating second variance of the chromaticities represented by the chromaticity signals;
covariance calculating means for calculating a co-variance of the chromaticities represented by the chromaticity signals;
quadratic-equation solving means for receiving outputs of the first and second variance calculating means and the covariance calculating means and solving and outputting a suitable solution of a quadratic-equation, the coefficients of which are represented by the received outputs;
coordinate conversion means for performing a coordinate conversion on the chromaticity coordinates calculated by the chromaticity calculating means according to an output of the quadratic-equation solving means; and
correlation-coefficient calculating means for calculating a correlation coefficient of outputs of the coordinate conversion means.

16. The color-chart discriminating device according to claim 14, wherein the rotation-correlation-coefficient calculating portion comprises:
first projecting means for projecting chromaticities represented by chromaticity signals onto a direction perpendicular to a line approximating a blackbody locus of a color of a light source on a chromaticity plane, which is obtained by using a temperature of the blackbody as a parameter and obtaining vertical displacements, which are components of the projected chromaticities in the direction perpendicular to the line approximating the blackbody locus;

second projecting means for projecting chromaticities represented by chromaticity signals onto a direction parallel to the line approximating the blackbody locus and obtaining parallel displacements, which are components of the projected chromaticities in the direction parallel to the line approximating the blackbody locus;

first variance calculating means for receiving the vertical displacements from the first projecting means and calculating first variance of the received vertical displacements;

second variance calculating means for receiving the parallel displacements from the second projecting means and calculating second variance of the parallel displacements;

covariance calculating means for receiving the vertical displacements from the first projecting means and receiving the parallel displacements from the second projecting means and calculating a covariance of the vertical and parallel displacements;

quadratic-equation solving means for receiving outputs of the first and second variance calculating means and the covariance calculating means and solving and outputting a suitable solution of a quadratic-equation, the coefficients of which are represented by the received outputs; and computing means for receiving outputs of the first and second variance calculating means, the covariance calculating means and the quadratic-equation solving means receiving outputs computing an appropriate parameter from the outputs of the first and second variance calculating means, the covariance calculating means and the quadratic-equation solving means.

17. A color-chart discriminating device, including:
a sampling portion for sampling image signals according to a predetermined sampling rule;
a chromaticity calculating portion for converting the sampled image signals into chromaticity signals;
a statistic calculating portion for calculating a statistic of image signals; and
a color-chart judgment portion for judging from a statistic of image data represented by image signals whether or not the image data represents a color chart, wherein the statistic calculating portion comprises:
correlation-coefficient calculating portion for calculating a distribution of colors represented by the image signals; and
image-variance calculating portion for calculating a variance of the distribution of colors represented by the image signal.

18. The color-chart discriminating device according to claim 14, 15, 16 or 17, wherein the image-variance calculating portion comprises:
projection means for projecting chromaticities represented by chromaticity signals onto a direction perpendicular to a line approximating a blackbody locus of a color of a light source on a chromaticity plane, which is obtained by using a temperature of the blackbody as a parameter and obtaining vertical displacements, which are components of the projected chromaticities in the direction perpendicular to the line approximating the blackbody locus;
variance calculation means for receiving the vertical displacements from the projection means and calculating a variance of the received vertical displacements.

19. The color-chart discriminating device according to claim 14, 15, 16, 17 or, wherein the color-chart judgement portion comprises:
first threshold-processing means for comparing a value indicated by an output signal of the rotation-correlation-coefficient calculating portion with a first threshold value stored therein and for outputting a first judgement signal indicating a result of the comparison;
second threshold-processing portion for comparing a value indicated by an output signal of the image-variance calculating portion with a second threshold value stored therein and for outputting a second judgement signal indicating a result of the comparison; and
an AND circuit for carrying out a logical. AND between the first and second judgement signals output from the first and second threshold-processing means.

20. The color-chart discriminating device according to claim 18, wherein the color-chart judgement portion comprises:
first threshold-processing means for comparing a value indicated by an output signal of the rotation-correlation-coefficient calculating portion with a first threshold value stored therein and for outputting a first judgement signal indicating a result of the comparison;
second threshold-processing portion for comparing a value indicated by an output signal of the image-variance calculating portion with a second threshold value stored therein and for outputting a second judgement signal indicating a result of the comparison; and
an AND circuit for carrying out a logical AND between the first and second judgement signals output from the first and second threshold-processing means.

21. A gray-world-assumption judgment device comprising:
a color-chart judgment portion for judging whether or not image signals represent a color chart by comparing a vertical variance of image data sampled from the image signals with a vertical variance threshold value and by comparing a rotation correlation coefficient of the image data with a rotation correlation coefficient threshold value, and for outputting a first signal denoting whether or not the image signals represent a color chart;
threshold-processing means for judging whether or not the image signals represent gray by comparing the vertical variance with another vertical variance threshold value, and for outputting a second signal denoting whether or not the image signals represent gray; and
a circuit for outputting a third signal with an indication that the image signals represent a color chart upon receiving a first signal denoting that the image signals represent a color chart, and for outputting the third signal with an indication that the image signals represent gray upon receiving a second signal denoting that the image signals represent gray.

22. A light-source deducing device including:
a light-source deducing portion for deducing a light source from image data sampled from image signals, and for outputting a first signal indicating the deduction of a light source;

a gray-world-assumption judgment portion for judging whether or not the image signals represent gray by comparing a vertical variance of the image data with a vertical variance threshold value, and for outputting a second signal indicating the judgment of whether or not the image signals represent gray; and a comprehensive judgment portion for outputting the first signal indicating the deduction of a light source upon receiving the second signal indicating a judgment that the image signals represent gray.

23. A light-source deducing device including:

a light-source deducing portion for deducing a light source from image data sampled from image signals, and for outputting a first signal indicating the deduction of a light source;

a gray-world-assumption judgment portion for judging whether or not the image signals represent gray by comparing a vertical variance of the image data with a vertical variance threshold value, and for outputting a second signal indicating the judgment of whether or not the image signals represent gray; and a comprehensive judgment portion for outputting the first signal indicating the deduction of a light source upon receiving a second signal indicating a judgment that the image signals represent gray, and for outputting the second signal indicating the judgment that the image signals do not represent gray upon receiving a second signal with an indication of a judgment that the image signals do not represent gray; and a deduction holding portion for holding and outputting the first signal indicating the deduction of a light source upon receiving from the comprehensive judgment portion a first signal with an indication of a deduction of a light source, and for outputting a previously held first signal with a previous deduction of a light source upon receiving from the comprehensive judgment portion a second signal with an indication of a judgment that the image signals do not represent gray.

24. A light-source deducing device including:

a sampling circuit for sampling image data from image signals and outputting sampled image data;

a light-source deducing portion for deducing a light source from the image data, and for outputting the deduction of a light source;

a gray-world-assumption judgment portion for judging whether or not image signals represent gray by comparing a vertical variance of the image data with a vertical variance threshold value, and for outputting gray-world-assumption judgment data representing the judgment of whether or not the image signals represent gray;

a comprehensive judgment portion for outputting the deduction of a light source upon receiving gray-world-assumption judgment data representing a judgment that the image signals represent gray, and for outputting the judgment that the image signals do not represent gray upon receiving gray-world-assumption judgment data representing a judgment that the image signals do not represent gray; and a deduction holding portion for holding and outputting the deduction of a light source upon receiving a deduction of a light source from the comprehensive judgment portion, and for outputting a previously held deduction of a light source upon receiving from the comprehensive judgment portion a judgment that the image signals do not represent gray.

25. A color regulating device for use in an electronic image-pickup camera, the color regulating device having a light-source deducing device as set forth in claim 24.

26. A color regulating device for use in an electronic image-pickup-camera reproduction device, the color regulating device having a light-source deducing device as set forth in claim 24.

27. The light-source deducing device according to claim 24, wherein the gray-world-assumption judgement portion comprises:

a variance calculating portion for calculating a vertical variance of chromaticities represented by the sampled image data with respect to a light-source line in a chromaticity space; and a threshold-processing portion for outputting said gray-world-assumption judgment data, including data indicating that the image signals represent gray if the variance calculated by the variance calculating portion is less than a predetermined threshold, and indicating that the image signals do not represent gray, otherwise.

28. The light-source deducing device according to claim 27, wherein the gray-world-assumption portion includes:

axis-parameter calculating portion for determining a direction for extension of an axis to be used for calculating a vertical variance of the chromaticities represented by the sampled image data with respect to a blackbody locus in the chromaticity space.

29. The light-source deducing device according to claim 28, wherein the gray-world-assumption portion includes:

means for assigning an axis-parameter to each of a plurality of areas, to which the chromaticity space is partitioned, arranged along the blackbody locus, and for determining the axis-parameter corresponding to an area including the average calculated by the average calculating portion.

30. A light-source deducing device comprising:

a sampling circuit for sampling image data from image signals and outputting sampled image data;

an average calculating portion for calculating an average of the sampled image data, and for outputting the average;

an average light-source deducing portion for deducing a light source from the average, and for outputting the deduction of a light source;

an axis-parameter calculating portion for determining a direction of an axis for vertical variance from the average based on a blackbody locus in a chromaticity space, and for outputting the direction of the axis;

a variance calculating portion for calculating a vertical variance from the sampled image data and the direction of the axis, and for outputting the vertical variance;

a threshold-processing portion for outputting a judgment signal indicating that the image signals represent gray upon recognizing that the vertical variance is less than a predetermined vertical variance threshold value, and for outputting a judgment signal indicating that the image signals do not represent gray upon recognizing that the vertical variance is more than the predetermined vertical variance threshold value;

a comprehensive judgment portion for outputting the deduction of a light source upon receiving a judgment signal indicating that the image signals represent gray, and for outputting the judgment signal indicating that the image signals do not represent gray upon receiving a judgment signal indicating that the image signals do not represent gray; and a deduction holding portion for holding and outputting the deduction of a light source upon receiving the deduction of a light source from the comprehensive judgment portion, and for outputting a previously held deduction of a light source upon receiving from the comprehensive judgment portion a judgment signal indicating that the image signals do not represent gray.

31. A light-source deducing device comprising:
a sampling circuit for sampling image data from image signals and outputting sampled image data;
an average calculating portion for calculating an average of the sampled image data, and for outputting the average;
an average light-source deducing portion for deducing a light source from the average, and for outputting the deduction of a light source;
an axis-parameter calculating portion for determining an axis-parameter for vertical variance from the average based on a plurality of areas of partitioned blackbody locus having an axis-parameter in chromaticity space, and for outputting the axis-parameter;
a variance calculating portion for calculating vertical variance from the sampled image data and the axis-parameter, and for outputting the vertical variance;
a threshold-processing portion for outputting a judgment that the image signals represent gray upon recognizing that the vertical variance is less than a predetermined vertical variance threshold value, and for outputting a judgment that the image signals do not represent gray upon recognizing that the vertical variance is more than the predetermined vertical variance threshold value;
a comprehensive judgment portion for outputting the deduction of a light source upon receiving a judgment signal indicating that the image signals represent gray, and for outputting the judgment signal indicating that the image signals do not represent gray upon receiving a judgment signal indicating that the image signals do not represent gray; and
a deduction holding portion for holding and outputting the deduction of a light source upon receiving the deduction of a light source from the comprehensive judgment portion, and for outputting a previously held deduction of a light source upon receiving from the comprehensive judgment portion a judgment signal indicating that the image signals do not represent gray.

32. The light-source deducing device according to any one of claims 27, 28 or 29 further comprising:
a specific-color judgement portion for judging whether or not image data corresponding to a specific color, from which a light source can be directly deduced, is present in the sampled image data, wherein the comprehensive judgement portion receives a result of a first-order result of deducing a light source from the light-source deducing portion and also receives the gray-world-assumption judgement data outputted from the threshold-processing portion and further receiving a result of the judgement from the specific-color judgement portion,
said comprehensive judgement portion processing the first-order result according to the gray-world-assumption judgement data and then making a comprehensive judgment of a light source therefrom and finally outputting comprehensive judgement data indicating a result of the comprehensive judgement.

33. The light-source deducing device according to claim 27, 28, 29, 30 or 31 wherein the comprehensive judgement portion comprises a neural network simulation means.

34. The light-source deducing device according to claim 32, wherein the comprehensive judgement portion comprises a neural network simulation means.

35. The light-source deducing device according to claim 32, wherein the specific-color judgement portion judges whether or not image data corresponding to at least one of a sky-blue and an artificial light-source color, from which a light source can be directly deduced, is present in the sampled image data.

36. The light-source deducing device according to claim 35, wherein the comprehensive judgement portion comprises a neural network simulation means.

37. The light-source deducing device according to any one of claims 30 or 31, further comprising:
a specific-color judgement portion for judging whether or not image data corresponding to a specific color, from which a light source can be directly deduced, is present in the sampled image data, wherein the comprehensive judgement portion receives a result of a first-order result of deducing a light source from the average light-source deducing portion and also receives the judgement signal outputted from the threshold-processing portion and further receiving a result of the judgement from the specific-color judgement portion,
said comprehensive judgement portion processing the first-order result according to the judgement signal and then making a comprehensive judgment of a light source therefrom and finally outputting comprehensive judgement data indicating a result of the comprehensive judgement.

* * * * *